US012811982B2

(12) United States Patent
Bhandaru et al.

(10) Patent No.: US 12,811,982 B2
(45) Date of Patent: Nov. 24, 2026

(54) CLOUD-TO-EDGE WORKLOAD ORCHESTRATION

(71) Applicant: Intel Products IP LLC, Santa Clara, CA (US)

(72) Inventors: Malini Bhandaru, San Jose, CA (US); Kshitij Arun Doshi, Tempe, AZ (US); Ned M. Smith, Beaverton, OR (US); Sunil Cheruvu, Tempe, AZ (US); Anahit Tarkhanyan, Cupertino, CA (US)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/622,080

(22) Filed: Mar. 29, 2024

(65) Prior Publication Data

US 2024/0244088 A1 Jul. 18, 2024

Related U.S. Application Data

(60) Provisional application No. 63/456,310, filed on Mar. 31, 2023.

(51) Int. Cl.
*H04L 29/06* (2006.01)
*G06F 9/50* (2006.01)
(Continued)

(52) U.S. Cl.
CPC ............ *H04L 63/20* (2013.01); *G06F 9/5038* (2013.01); *G06F 9/505* (2013.01); *G06F 9/5077* (2013.01);
(Continued)

(58) Field of Classification Search
CPC ..... H04L 63/20; H04L 9/3247; H04L 63/083; H04L 67/10; G06F 9/5038; G06F 9/505;
(Continued)

(56) References Cited

U.S. PATENT DOCUMENTS

2019/0034235 A1* 1/2019 Yang ..................... G06F 18/241
2020/0272737 A1* 8/2020 Ji ............................ G06F 21/57
(Continued)

OTHER PUBLICATIONS

Govindarajan et al., "Network Aware Container Orchestration for Telco Workloads," 2022 IEEE 15th International Conference on Cloud Computing (CLOUD), Barcelona, Spain, pp. 397-406 (Year: 2022).*
(Continued)

*Primary Examiner* — Morshed Mehedi
(74) *Attorney, Agent, or Firm* — Schwegman Lundberg & Woessner, P.A.

(57) ABSTRACT

Various systems and methods for providing cloud-to-edge workload orchestration described herein. A computing node is configured to receive a distributed workload configuration including security intents; decompose, based on the distributed workload configuration, a workload into a plurality of sub-workloads; identify an infrastructure resource of the plurality of compute nodes to execute a sub-workload of the plurality of sub-workloads; determine that an operating environment of the infrastructure resource satisfies the security intents; bind the sub-workload to the infrastructure resource, wherein the binding produces a token that is presented by the sub-workload to the infrastructure resource, and wherein the token is used to ensure trust among framework layers; and deploy the sub-workload to the infrastructure resource.

20 Claims, 49 Drawing Sheets

(51) Int. Cl.

| | |
|---|---|
| ***G06F 11/30*** | (2006.01) |
| ***G06F 21/54*** | (2013.01) |
| ***G06F 21/57*** | (2013.01) |
| ***G06N 7/01*** | (2023.01) |
| ***H04L 9/32*** | (2006.01) |
| ***H04L 9/40*** | (2022.01) |
| ***H04L 67/10*** | (2022.01) |

(52) U.S. Cl.
CPC .......... *G06F 9/5083* (2013.01); *G06F 9/5088* (2013.01); *G06F 11/3006* (2013.01); *G06F 21/54* (2013.01); *G06F 21/577* (2013.01); *G06N 7/01* (2023.01); *H04L 9/3247* (2013.01); *H04L 63/083* (2013.01); *H04L 67/10* (2013.01); *G06F 2221/033* (2013.01)

(58) Field of Classification Search
CPC .... G06F 9/5077; G06F 9/5083; G06F 9/5088; G06F 11/3006; G06F 21/54; G06F 21/577; G06F 2221/033; G06N 7/01
See application file for complete search history.

(56) References Cited

U.S. PATENT DOCUMENTS

| | | | | |
|---|---|---|---|---|
| 2020/0336322 | A1* | 10/2020 | Asanghanwa | H04L 9/085 |
| 2021/0144517 | A1* | 5/2021 | Guim Bernat | H04L 41/0843 |
| 2022/0239503 | A1* | 7/2022 | Mallikarjuna Durga Lokanath | H04L 9/0891 |
| 2023/0291558 | A1* | 9/2023 | Lin | H04L 9/0894 |
| 2023/0360007 | A1* | 11/2023 | Krishnaswamy | G06Q 20/10 |
| 2024/0160717 | A1* | 5/2024 | Raghuram | G06F 21/33 |

OTHER PUBLICATIONS

Santoro et al., "Foggy: A Platform for Workload Orchestration in a Fog Computing Environment," 2017 IEEE International Conference on Cloud Computing Technology and Science (CloudCom), Hong Kong, China, pp. 231-234 (Year: 2017).*

"Interplanetary File System IPFS", [Online]. Retrieved from the Internet https developers.cloudflare.com web3 ipfs-gateway concepts ipfs , Accessed on Aug. 23, 2023, 3 pgs.

"Google File System Wikipedia Page", [Online]. Retrieved from the Internet https en.wikipedia.org wiki Google_File_System, Accessed on Sep. 30, 2024, 4 pages.

"Informatica MDM Matching High Level Overview", [Online]. Retrieved from the Internet https knowledge.informatica.com s article 523037?language=en_US, May 19, 2022, 2 pages.

"Contents hide Top Overview History Architecture File systems Hadoop distributed file system Other file systems JobTracker and TaskTracker the MapReduce engine Scheduling Fair scheduler Capacity scheduler Difference between Hadoop 1 and Hadoop 2 YARN", [Online]. Retrieved from the Internet URL https web.archive.org web 20230324103432 https en.wikipedia.org wiki Apache_Hadoop, accessed on Mar. 24, 2023, 14 pgs.

"Ceph software", [Online]. Retrieved from the Internet URL https web.archive.org web 20230329213607 https en.wikipedia.org wiki Ceph_software, accessed on Mar. 29, 2023, 10 pgs.

"Secure Asset Transfer Protocol SATP", [Online]. Retrieved from the Internet URL https datatracker.ietf.org doc draft-hargreaves-sat-core , Apr. 11, 2023, 2 pgs.

"Open Policy Agent", [Online]. Retrieved from the Internet URL https web.archive.org web 20230324084103 https www.openpolicyagent.org , accessed on Mar. 24, 2023, 10 pgs.

"Nylas API and Sync Architecture Overview", [Online]. Retrieved from the Internet URL https web.archive.org web 20230323201652 https developer.nylas.com docs the-basics how-nylas-works #nylas-api-and-sync-architecture-overview, accessed on Mar. 23, 2023, 1 pg.

"ISO IEC 19770-22015", [Online].Retrieved from the Internet URL https web.archive.org web 20230324035757 https www.iso.org standard 65666.html, accessed on Mar. 24, 2023, 3 pgs.

Birkholz, H, "Concise Software Identification Tags", [Online]. Retrieved from the Internet https datatracker.ietf.org doc html draft-ietf-sacm-coswid-22, Jul. 19, 2022, 72 pgs.

Desai, Nirmit, "Scalable Hierarchical Locking for Distributed Systems", Journal of Parallel and Distributed Computing, vol. 64, Issue 6, Jun. 2004, 33 pgs.

* cited by examiner

Cloud-Edge Cluster

Local Pre-Emptive Migration

Attestation Load Distribution

CLOUD-TO-EDGE WORKLOAD ORCHESTRATION

PRIORITY CLAIM

This application claims the benefit of priority to U.S. Provisional Patent Application No. 63/456,310, filed Mar. 31, 2023, and titled "CLOUD TO EDGE SECURITY", which is incorporated herein by reference in its entirety.

BACKGROUND

Edge computing, at a general level, refers to the transition of compute and storage resources closer to endpoint devices (e.g., consumer computing devices, user equipment, etc.), in order to optimize total cost of ownership, reduce application latency, improve service capabilities, and improve compliance with compute security or data privacy requirements. Edge computing may, in some scenarios, provide a cloud-like distributed service that offers orchestration and management for applications among many types of storage and compute resources.

Some implementations of edge computing have been referred to as the "edge cloud" or the "fog," as powerful computing resources previously available only in large remote data centers are moved closer to endpoints and made available for use by consumers at the "edge" of the network. The use of edge computing, and the many flavors of distributed or centralized cloud computing, have led to a variety of technical issues involving security, reliability, and resource usage.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
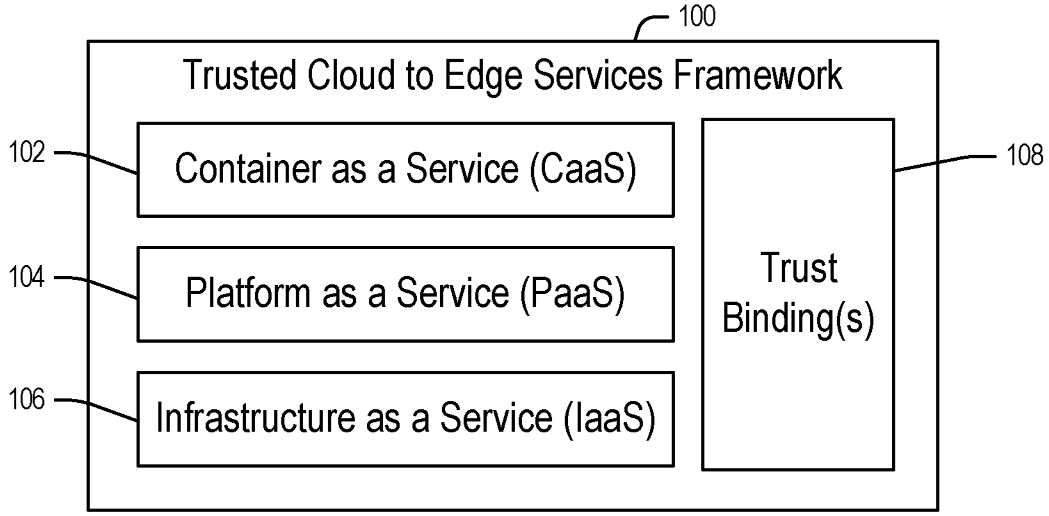
FIG. 1 is a block diagram illustrating a trusted cloud-to-edge services framework, according to an example.

In the following description, methods, configurations, and related apparatuses are disclosed for implementation in a cloud-to-edge (C2E), cloud-native, or other cloud/edge compute-based framework. As used herein, "cloud-to-edge" generally refers to functionality to move workloads and capabilities that were traditionally located in a cloud computing setting towards distributed edge computing locations. Such functionality is particularly applicable to the deployment and execution of elastic workloads (WLs), which involve workloads that are distributed across multiple nodes, migrated, and dynamically coalesced.

Edge computing has introduced scenarios involving elastic workloads where a traditional monolithic workload, which may run on a single Edge node, may be decomposed into two or more sub-workloads that are distributed across multiple Edge nodes. The distributed workload may be partially or fully consolidated or decomposed even further to accommodate the changing resource dynamics of edge-cloud deployments for both stationary and mobile users and user equipment, or stationary and mobile edge nodes. These dynamics creates an environment for elastic edge computing capabilities that include dynamic binding of workloads, resources, and compute.

Trusted Cloud-to-Edge Framework

The use of elastic WLs is designed to provide flexibility to accommodate distribution and dynamism inherent in edge computing. A dynamic C2E framework is needed to ensure that trust within a complex elastic WL infrastructure is preserved throughout the many types of WL configurations and use cases.

Existing container-as-a-service (CaaS), platform-as-a-service (PaaS), and infrastructure-as-a-service (IaaS) capabilities expect that trust is established statically at an initial deployment of a WL, and such capabilities generally will not re-evaluate trust during WL execution. The dynamics of an elastic WL in an C2E deployment, however, change the WL from being a monolithic WL to a distributed WL having dynamic properties that distribute the WL processing across multiple nodes. This is further complicated because nodes may dynamically migrate to other hosting environments at lower framework layers, resulting in broken trust semantics.

The systems and methods described herein implement an elastic WL framework with security and trust capabilities at operational layers involving workload execution environments (e.g., containers, virtual machines, etc.), platforms, and infrastructure, and these layers' associated services (Container-as-a-Service (CaaS), Platform-as-a-Service (PaaS), and Infrastructure-as-a-Service (IaaS)). The following systems and methods introduce a Trust Binding Manager to actively monitor and apply trust bindings between the artifacts at respective layers that require consistent trust properties, while responding to dynamic conditions that otherwise will break trust properties. This enables elastic WL frameworks to establish and preserve intended trust properties of a WL throughout the WL execution and lifecycle despite the occurrence of dynamic changes in resources, location, and data sources/sinks.

A trusted C2E services framework for elastic workloads is adapted as follows to ensure various "anything-as-a-service" (X-aaS) capabilities in a services framework. This is used to establish and maintain trust within the respective framework layers, e.g., CaaS, PaaS, and IaaS, and between C2E framework layering, e.g., CaaS to PaaS, and PaaS to IaaS. The Trust Binding Manager component is used to establish and maintain trust properties for an elastic WL that is implemented using a trusted C2E framework. The C2E framework integrates a Trust Binding Manager component that enables creation, simulation, deployment, and maintenance of trusted elastic WLs following a WL lifecycle.

FIG. 1 is a block diagram illustrating an example of a trusted cloud-to-edge (C2E) services framework 100, according to an example. The trusted C2E services framework 100 includes a Container-as-a-Service (CaaS) layer 102, a Platform-as-a-Service (PaaS) layer 104, and an Infrastructure-as-a-Service (IaaS) layer 106, which are managed by using trust bindings 108.

The CaaS layer 102 creates a uniform abstraction for describing a workload that is independent of a particular platform. A distributed WL may partition the WL into logical sub-workloads that are related by a workflow model where the partial results from one sub-workload may be input to another sub-workload. The workflow may divide WL computations into execution operations that are in a particular sequence or in a particular concurrence. An individual sub-workload should have the same trust semantics as the monolithic WL. Monolithic WL trust may be established as part of an SLA (service level agreement) between the WL tenant and a WL service provider. Elastic WL execution may result in a distributed WL having multiple sub-workloads hosted by many nodes. The WL partitioning and execution workflow may introduce challenges to trust where the expected trust agreed to initially as part of an SLA agreement may disappear due to differences in platform and infrastructure options introduced by PaaS and IaaS framework layers.

Figure 2:
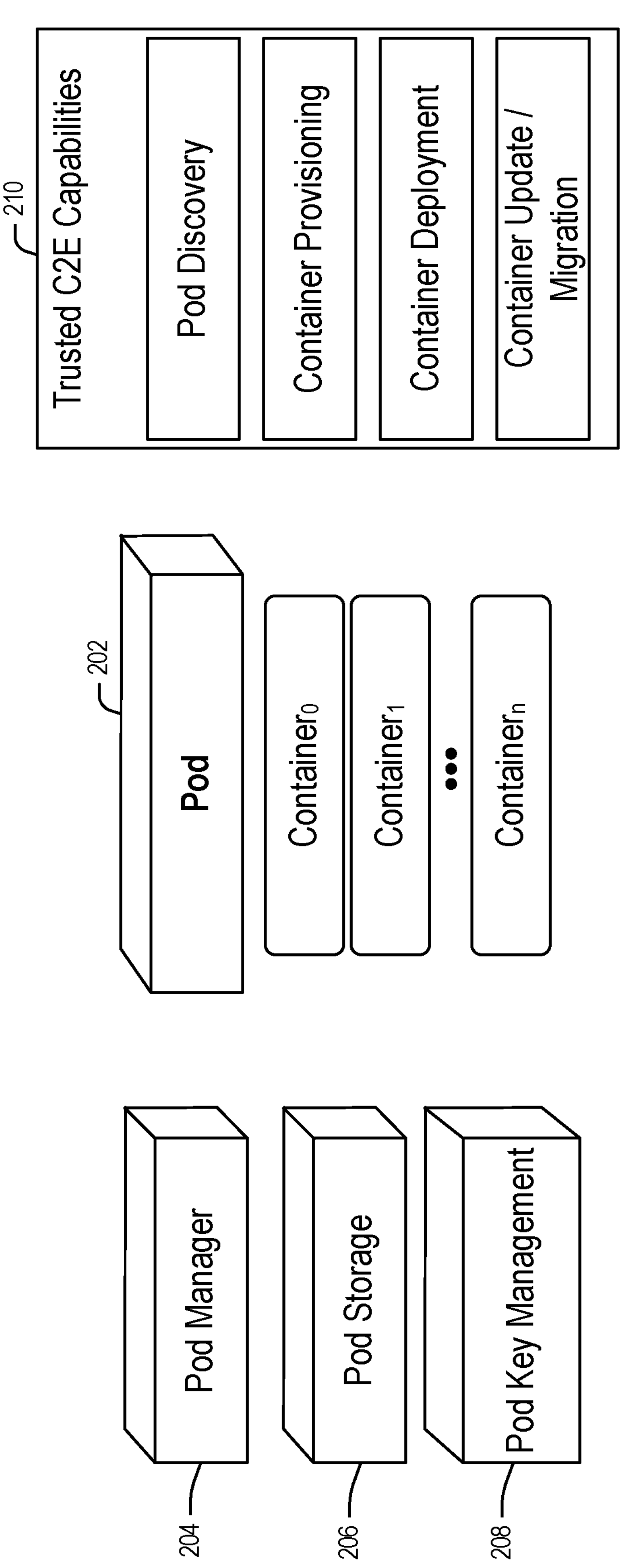
FIG. 2 is a block diagram illustrating the components of a Container-as-a-Service layer, according to an example.

FIG. 2 is a block diagram illustrating the components of an example CaaS layer (e.g., corresponding to layer 102), according to an example. Here, a pod 202 is used to deploy multiple containers (labeled as container 0 to container n). Functionality used in the CaaS layer includes a pod manager 204, pod storage 206, and pod key management 208. The features discussed herein introduce the use of trusted C2E capabilities 210 for the CaaS layer, which include but are not limited to: pod discovery; container provisioning; container deployment; and container update or migration.

Returning to FIG. 1, the PaaS layer 104 creates a uniform platform abstraction that facilitates workload deployment where the sub-workload fragments of a distributed workload execute within one or more virtual and physical platform environments. The PaaS layer 104 abstraction hides hardware, system software, and cloud platform specific artifacts so that the workload designer does not need to adapt the workload to differences found at lower layers. The PaaS layer 104 abstraction also hides trust properties inherent to lower layers resulting in workloads that ignore the risks associated with untrusted hosting environments. In general, PaaS may depend on additional infrastructure layers that may themselves have layer abstractions and packaged as services (e.g., IaaS, hardware-as-a-service (HWaaS), etc.). Workload designers may not be aware of the various deployment options available at infrastructure layers. The services ecosystem may outsource some or all of workload deployment to a services abstraction. Consequently, workload security policies may need to be adapted, translated, and negotiated to the specific security postures at respective infrastructure layers and with respective service providers.

Figure 3:
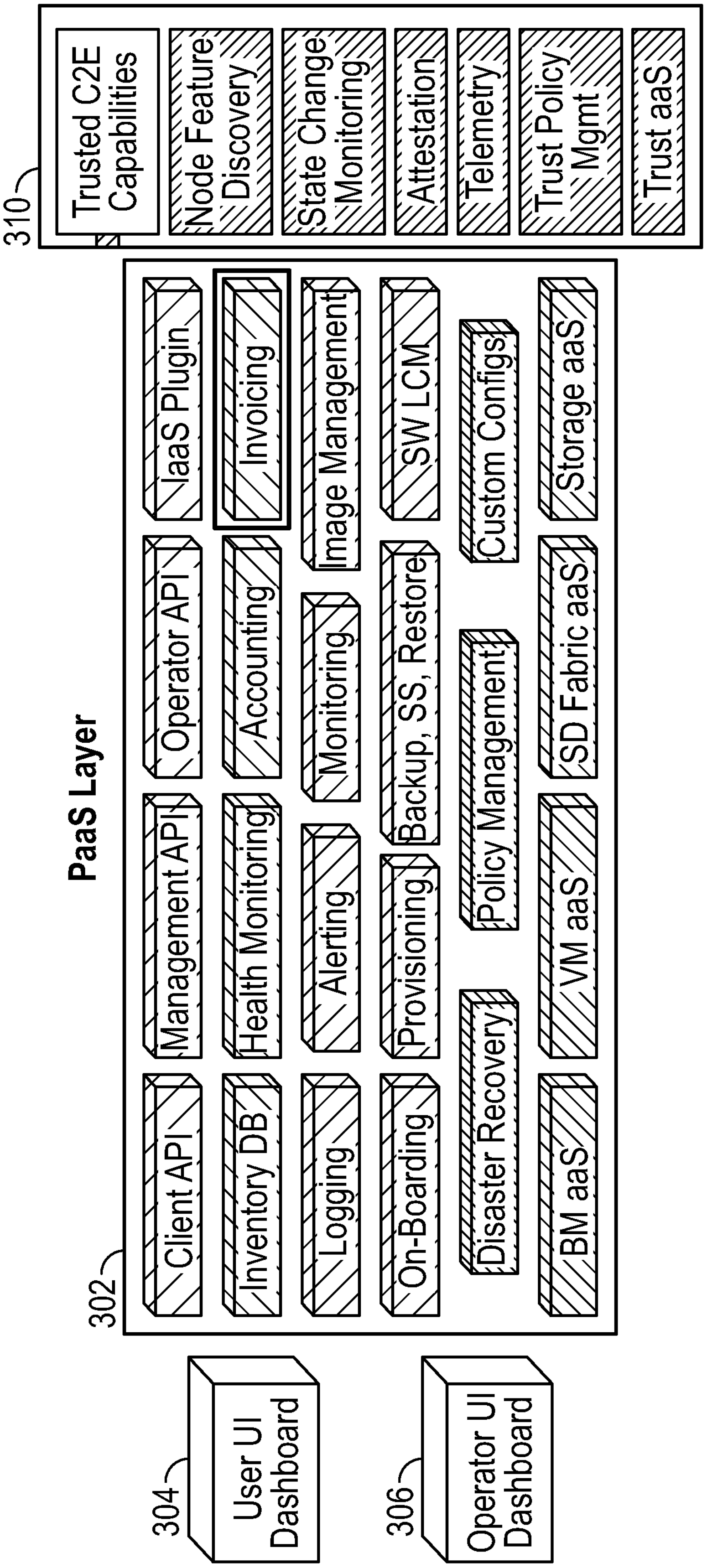
FIG. 3 is a block diagram illustrating the components of a Platform-as-a-Service layer, according to an example.

FIG. 3 is a block diagram illustrating the components of a PaaS layer (e.g., corresponding to layer 104), according to an example. Here, a PaaS layer 302 includes a variety of APIs, functions, and services to host and operate the platform. The PaaS layer 302 is operably coupled with a user (e.g., services user) dashboard UI 304 and an operator (e.g., administrator) dashboard UI 306 to invoke use of these APIs, functions, and services. The features discussed herein introduce the use of trusted C2E capabilities 310 for the PaaS layer, which include but are not limited to: node feature discovery; state change monitoring; attestation; telemetry; trust policy management; and trust services (e.g., in a "trust-as-a-service" or "TaaS" implementation).

Returning to FIG. 1, the IaaS layer 106 creates a uniform interface for allocating WL resources, e.g., compute, memory, storage, and communication that satisfy expected performance and availability requirements as specified by an SLA. The infrastructure has physical security properties such as a hardware root of trust (RoT), secure storage for keys, trusted software, and protection of secret data. Mechanisms for discovering and attesting the trustworthiness properties of the IaaS resources need to be built into the IaaS infrastructure or trust in the upper C2E framework layers cannot be guaranteed.

Figure 4:
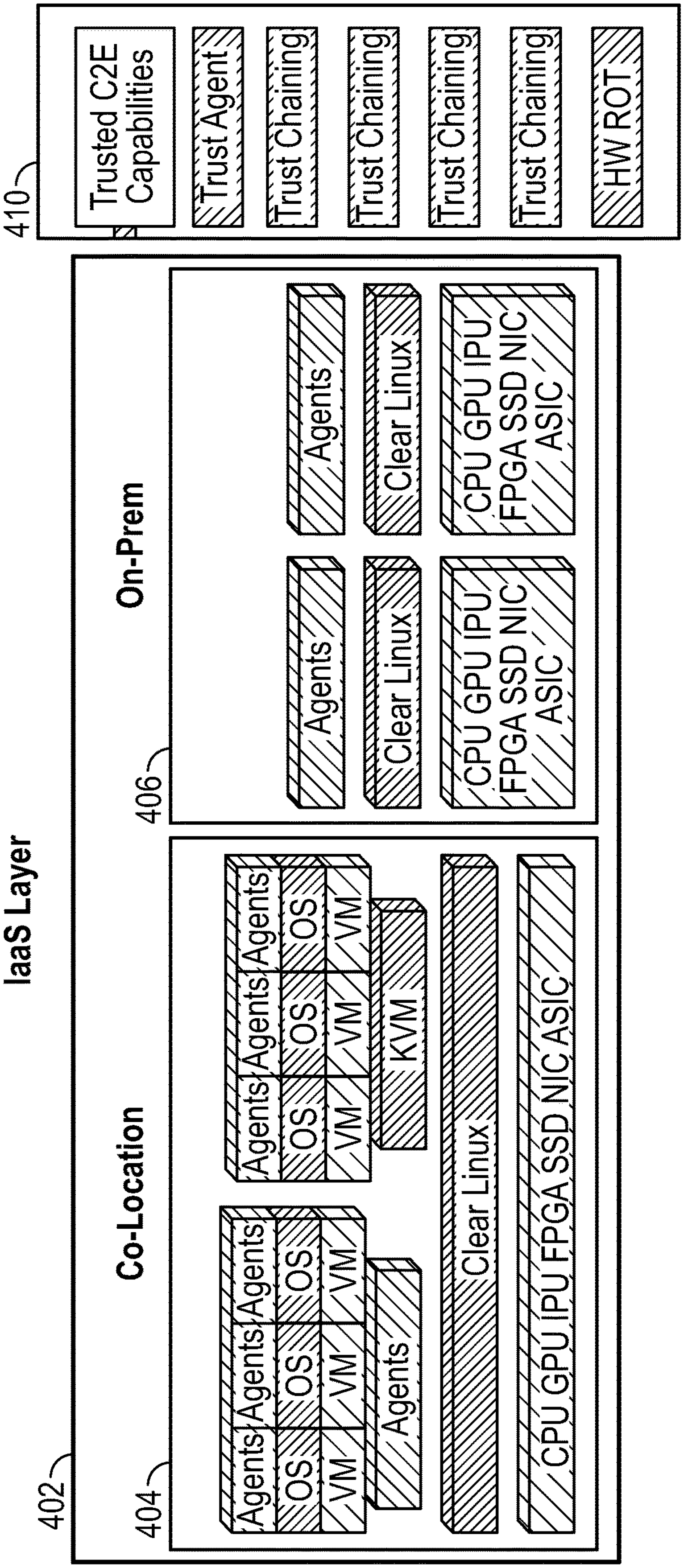
FIG. 4 is a block diagram illustrating the components of an Infrastructure-as-a-Service layer, according to an example.

FIG. 4 is a block diagram illustrating the components of an IaaS layer (e.g., corresponding to layer 106), according to an example. The IaaS layer 402 of FIG. 4 depicts the use of co-located computing resources 404, and on-premise computing resources 406. A variety of types of computing scenarios involving virtual machines, operating systems, and hardware is also depicted. The features discussed herein introduce the use of trusted C2E capabilities 410 for the IaaS layer, which include but are not limited to: a trust agent; trust chaining (including multiple instances of such trust chaining); and a hardware root of trust.

The systems and methods described herein provide CaaS, PaaS, and IaaS layers with trusted computing capabilities that ensures the security and trust properties of the workload are represented and enforced at appropriate CaaS, PaaS, and IaaS layers. With use of the aforementioned trusted C2E capabilities, security and trust can be provided even if every infrastructure layer has an X-aaS abstraction.

Figure 5:
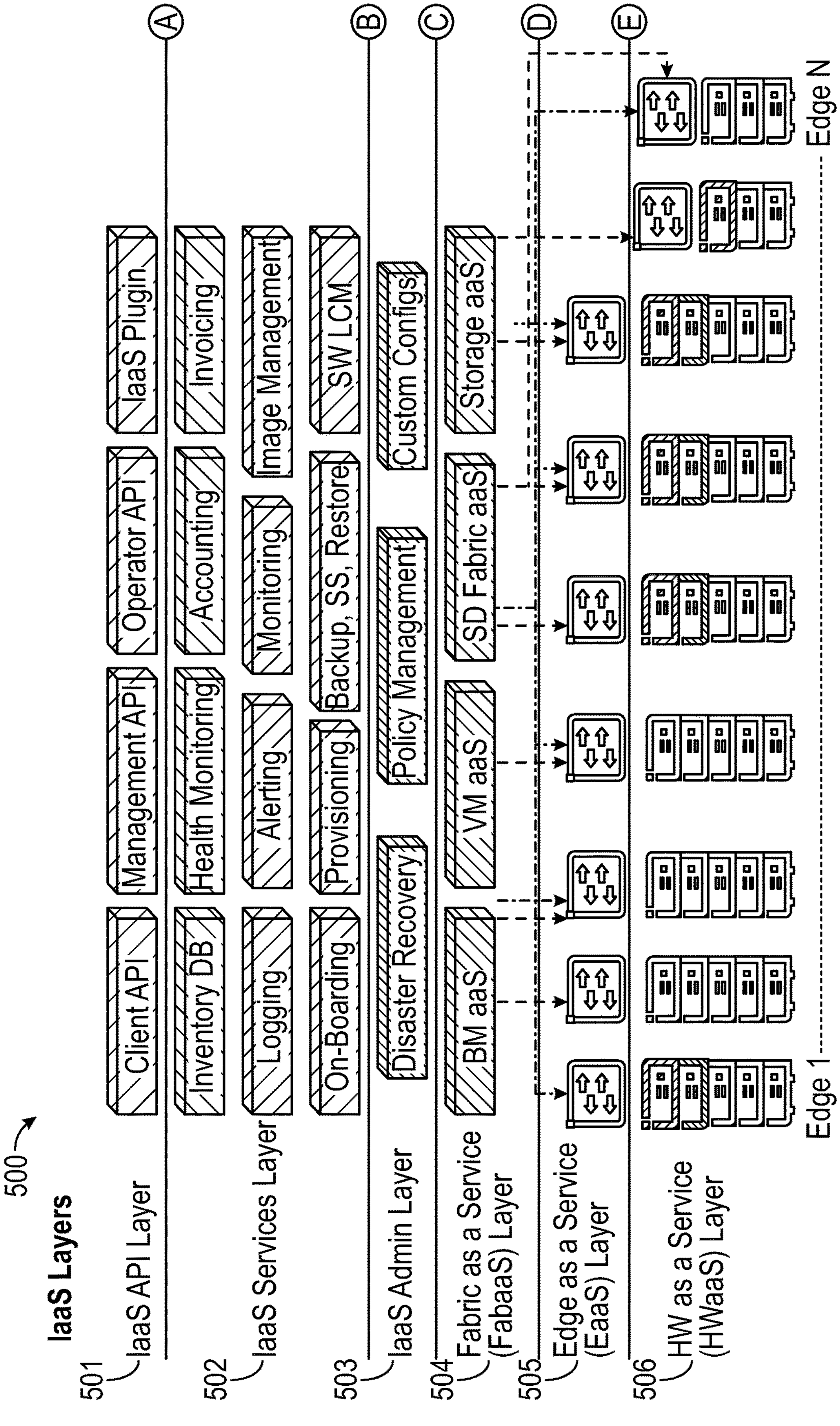
FIG. 5 is a block diagram illustrating various Infrastructure-as-a-Service layers and trust management capabilities, according to an example.
Figure 5:
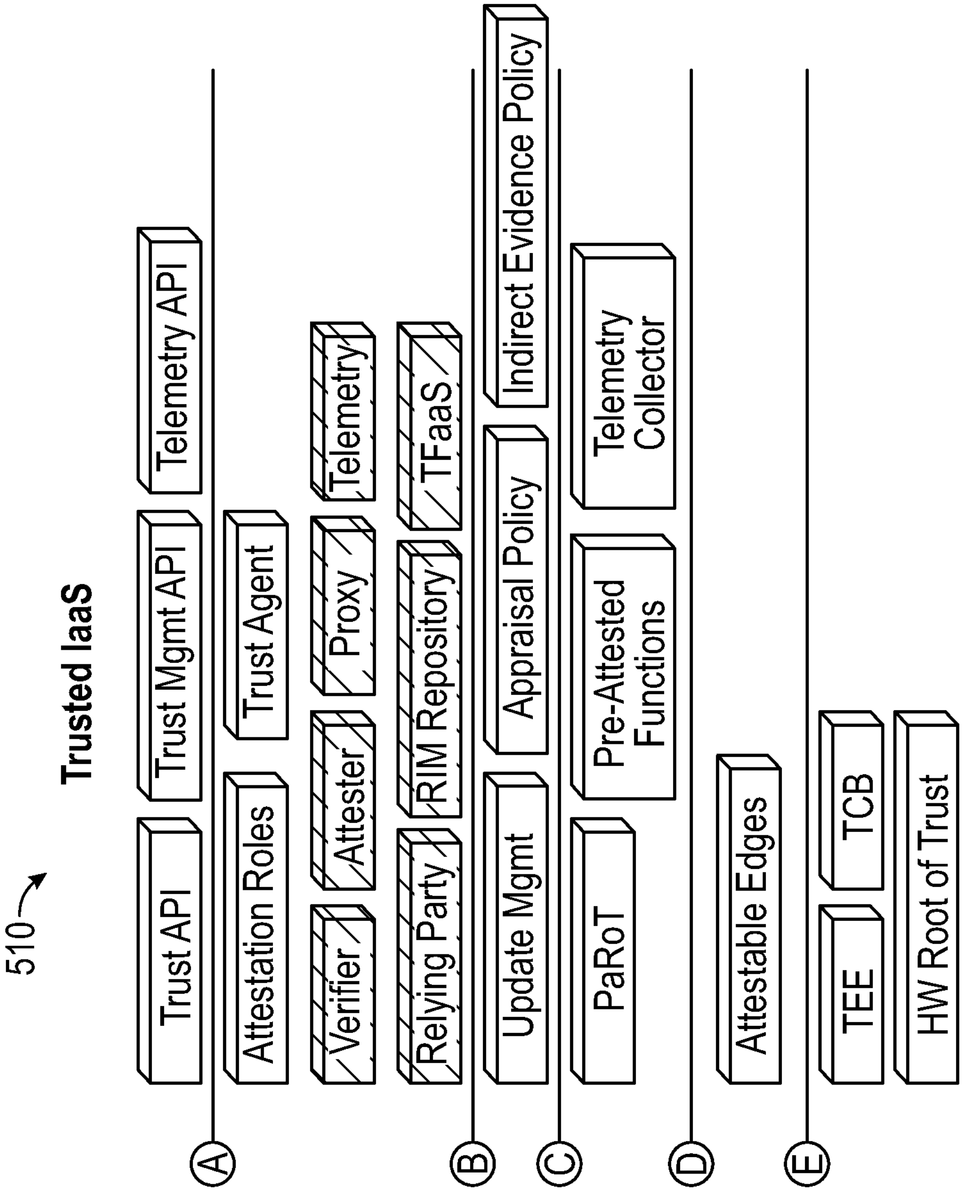

FIG. 5 is a block diagram illustrating additional aspects of IaaS layers and trust management capabilities, according to an example. The IaaS layers 500 depicted in FIG. 5 may include aspects such as: an API layer 501; a services layer 502; an admin layer 503; a Fabric-as-a-Service layer 504; an Edge-as-a-Service layer 505; and a Hardware-as-a-Service layer 506.

The IaaS layers 500 are adapted to provide trusted computing capabilities, using features of a trusted IaaS environment 510 that are supplied by trusted hardware. The relevant trusted computing capabilities include but are not limited to: HW roots of trust, trusted execution environments, edge attestation, attestation evidence collector/lead attester (e.g., Open Compute Project Platform Active ROT, "PA ROT"), pre-attested functions, trusted telemetry collection, update management, appraisal policies, evidence policies, attestation ecosystem roles, and interfaces for the underlying trust, management, and telemetry capabilities.

Figure 6:
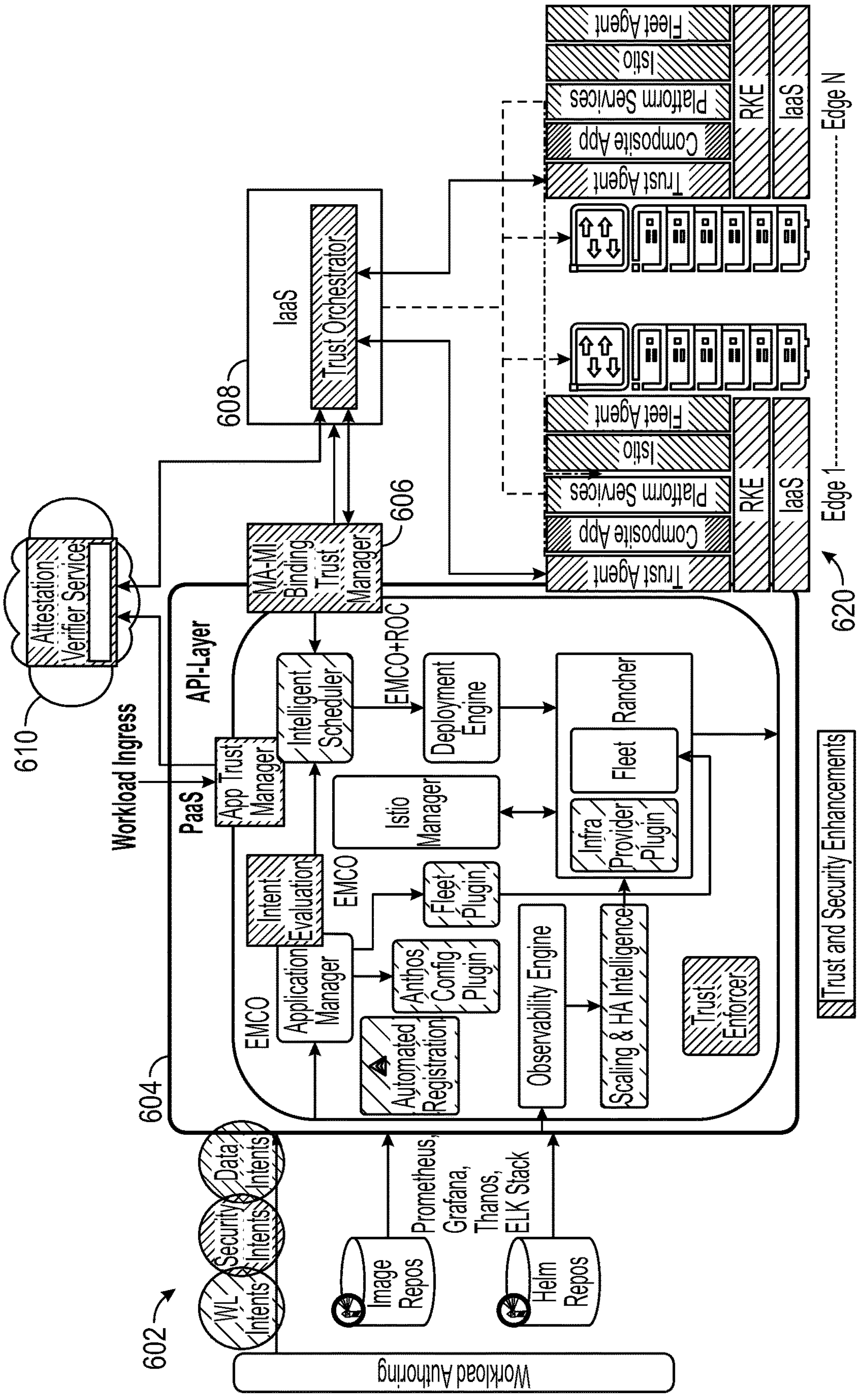
FIG. 6 is a block diagram illustrating a workflow of a workload, according to an example.

FIG. 6 is a block diagram illustrating a workflow of a workload, according to an example. The C2E framework provides trust capabilities that are also integrated in a PaaS layer 604, with the use of a trust binding manager 606. The trust binding manager 606 links trusted resources with trusted containers such that the binding between a container, platform, and resource is verifiable by another entity such as an attestation verifier service 610. This enables an IaaS layer 608 to successfully distribute the workloads to resources at one or more edge computing locations 620.

Trust in the container begins as part of workload authoring where the WL author supplies security intents and other intents metadata 602 that describes the parameters of trust such as expected attestation values and results. Workload authoring may also include elastic WL properties that aid in decomposing a monolithic WL into distributable parts using metadata in the form of WL intents, security intents, and data intents. This metadata may describe expected or allowed WL, module, and data composition/decomposition points as well as data ingress/egress behavior for WL nodes that optimize for remote data hosting with data flow ingress/egress. Additionally, data sensitivities are described by metadata that include policies that describe safe HW and SW environments where sensitive data may be safely and confidentially manipulated such as Intel® SGX/TDX, ARM® TrustZone, AMD® SEV, etc.

Figure 7:
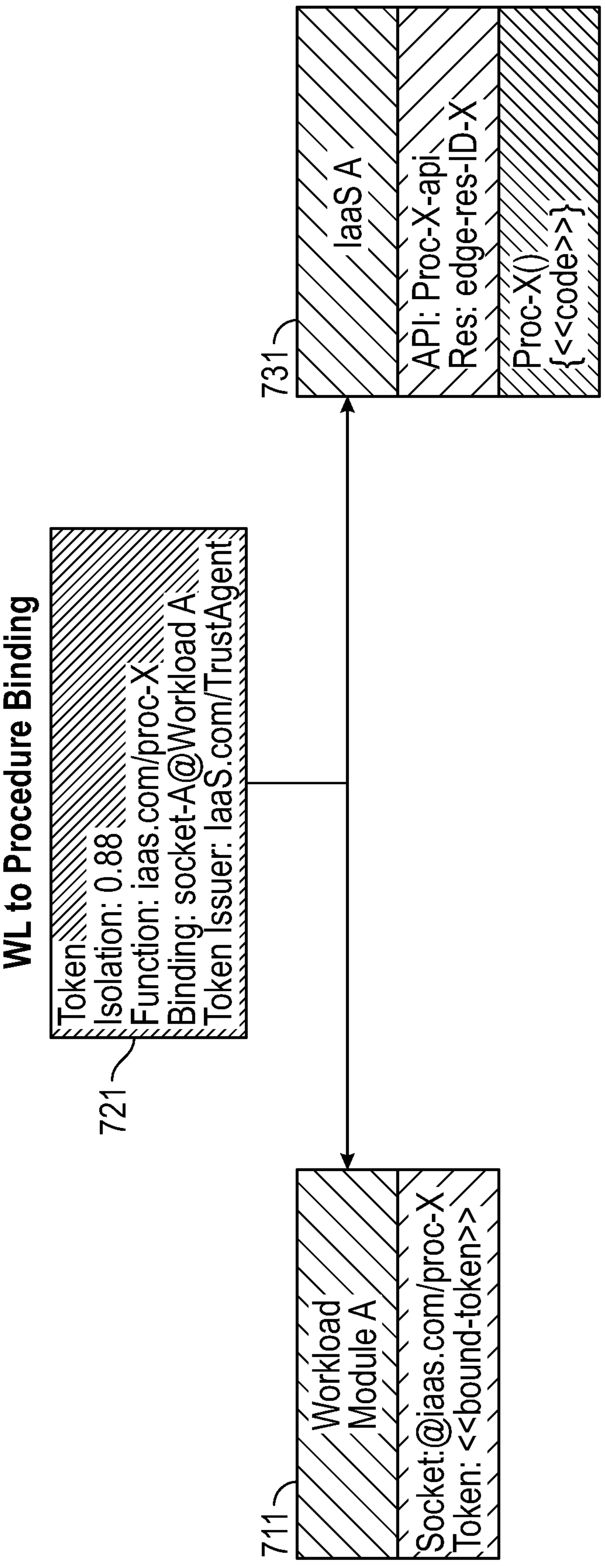
FIG. 7 is a block diagram illustrating a method of binding a workload to a procedure, according to an example.

FIG. 7 is a block diagram illustrating a method of binding a workload to a procedure, according to an example. The workload binding capability is performed by the trust binding manager 606 (e.g., depicted in FIG. 6) and may be facilitated by the security intents metadata 602. The example in FIG. 7 shows a security intents token 721 that describes expected trust properties that should exist between a workload container 711, e.g., 'Module A' and infrastructure resources supplied by IaaS 'A' 731. The example describes a container socket that may be satisfied by a resource exposing a resource interface that supplies the resource, (e.g., edge-res-ID-X) and procedure (e.g., 'Proc-X( )') that exists inside a trusted execution environment (e.g., Intel® TDX trust domain, AMD® SEV-SNP (Secure Encrypted Virtualization, Secure Nested Paging), ARM® Confidential Compute Architecture (CCA), ARM® TrustZone, or IPU).

The trust binding manager 606 ensures that the binding occurs following an expected binding procedure, e.g., website-for-the-iaas-platform.com/proc-X, using an expected container socket, e.g., 'socket-A@Workload-A', with an expected isolation factor, e.g., '0.88'. The binding operation may produce a token that is given to WL A and presented to an IaaS resource hosting a processing unit (e.g., a networked infrastructure processing unit or "IPU") where it is evaluated upon resource access to verify that the binding operation has taken place. The token may expire to ensure the binding operation is periodically reestablished or the token is dynamically regenerated if either the resource environment or the container environment changes in a way that affects trust. The token, or versions or variants of the token, may be used to establish and maintain trust within the respective framework layers, e.g., CaaS, PaaS, and IaaS, and between C2E framework layering, e.g., CaaS to PaaS or PaaS to IaaS.

Agile Pod Creation Following Automated Updates

Elastic WL updates are more sophisticated than traditional cloud or edge WL updates because elastic WLs may be partitioned and distributed dynamically after the orchestrator commissions the WL for execution. Elastic WLs possess metadata that describes the various ways that a WL may be partitioned and distributed such that the global execution objective remains the same after elastic partitioning and distributed hosting. Nevertheless, elastic WLs are subject to updates and patches that correct bugs, close security holes, or provide efficiency, reliability, resiliency, and availability improvements. Updates will comprehend the dynamically applied partitioning and distribution functions that have been applied or updates will likely fail. Otherwise, the partitioning and distribution optimizations may need to be backed out, and then the update can be applied before reapplying the partitioning and distribution operations, which incurs significant deployment cost.

The systems and methods described herein address gaps in workload software and firmware updates, particularly through the application of attestation and stronger platform integrity management. The broader industry is demanding these capabilities (e.g., attested workloads) as part of a "Zero-Trust Architecture", see SP 800-207, Zero Trust Architecture, published by the NIST Computer Security Resource Center (CSRC) which defines a set of requirements and principles for trustworthy enterprise, edge and cloud deployments. In particular, the systems and methods described herein solve the problem of uncoordinated and disruptive updates for elastic WLs by leveraging elastic WL metadata that describes the ways in which a WL may be partitioned and distributed. The metadata is used to design WL update images that align with current deployments. The most appropriate update image is delivered to the currently deployed WL fragment for application/installation. The approaches include elastic WL metadata that is used to construct, distribute, and apply WL updates. The approaches include use of an elastic WL Distribution Manager (WDM), Workload Update Manager (WUM), Pod Update Manager (PUM), and other infrastructure.

If a WL—or pod of containers that implements the WL—is part of an elastic deployment (e.g., replica set), the systems and methods described herein use an API to temporarily disable the workload deployment following the approach: "do not try to adjust the number of active copies." If the instance on the machine that needs an upgrade is paused, the deployment operator would require new resources to recreate the pod elsewhere. After the WL/Pod is upgraded, the WL/Pod in that machine is restarted. This approach saves time, overhead and cost, whereas downloading the pod image elsewhere, allocating resources, setting up IP connectivity, etc. is significant. A respective infrastructure node has a local PUM, and this local PUM interacts with a WUM that coordinates application of updates across the cluster of elastic WL containers and nodes.

Figure 8:
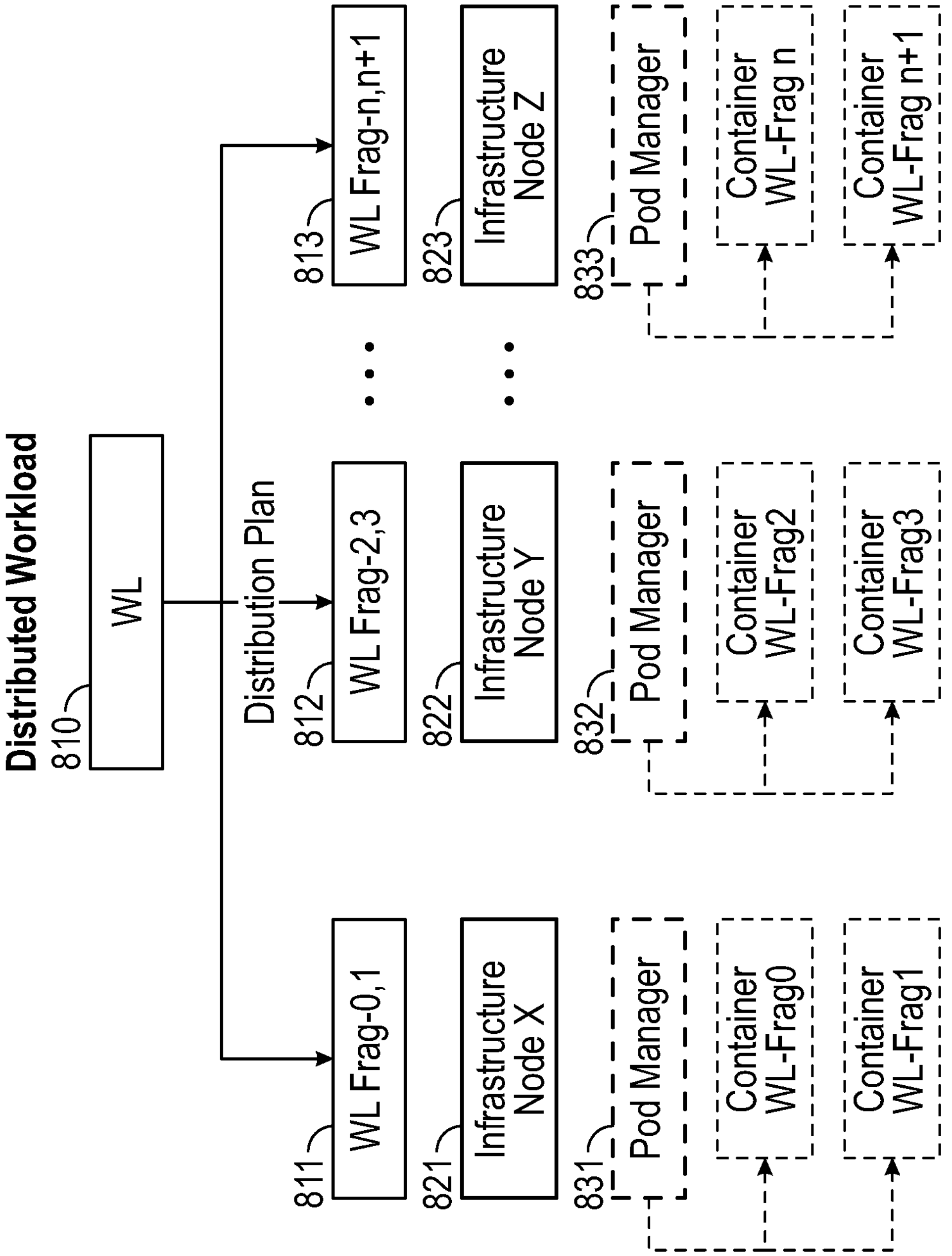
FIG. 8 is a block diagram illustrating an elastic workload distribution plan involving a workload distribution manager interacting with pod managers, according to an example.

FIG. 8 is a block diagram illustrating an elastic WL distribution plan involving a WDM interacting with Pod Managers 831, 832, 833, according to an example. A WL distribution plan may describe the ways in which an elastic workload may be divided into WL fragments 811, 812, 813 such that the overall execution of the monolithic WL 810 is isomorphic to the fragmented WL. The WL fragments 811, 812, 813 may be distributed across edge network resources, such as Infrastructure Nodes X, Y, Z 821, 822, 823. An edge hosting infrastructure may be used to host one or more of the WL fragments 811, 812, 813.

A respective K8S Pod Manager may be used to manage and track multiple WL fragments hosted by a common IaaS partition. For example, an IaaS Node X 821 may host fragments (0, 1) of a WL while Node Y 822 hosts fragments (2, 3) and Node Z 823 hosts fragments (n, n+1) and so forth.

It is understood that the Elastic Infrastructure Node (EIN) may support multi-tenancy where different tenants operate their own pod of containers. Examples described herein also depict a single-tenant scenario.

Figure 9:
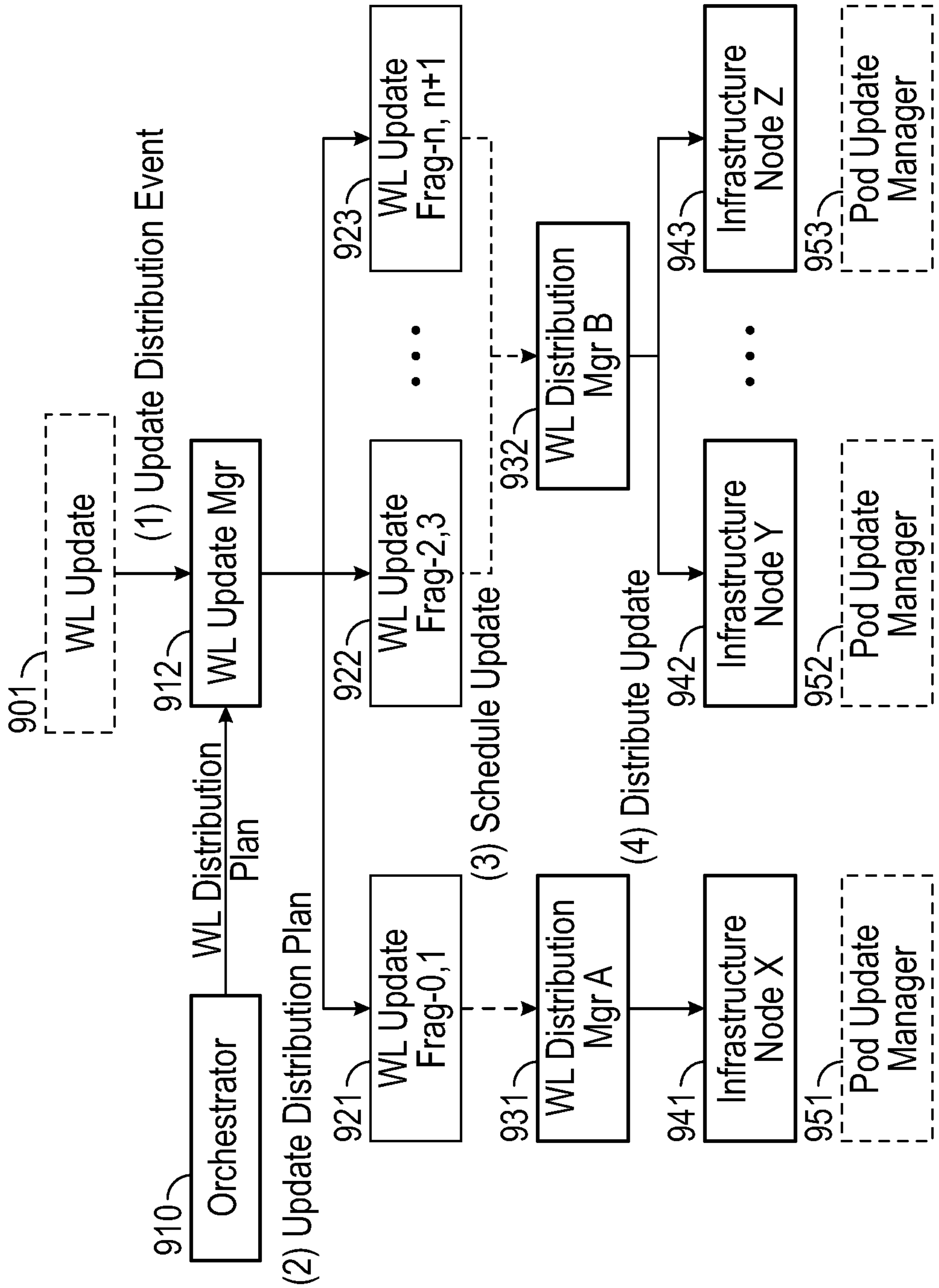
FIG. 9 is a block diagram illustrating an elastic workload update manager, according to an example.

FIG. 9 is a block diagram illustrating an elastic workload update manager, according to an example. The elastic WUM depicted in FIG. 9 includes a WUM 912 that receives a WL distribution plan from a WL orchestrator 910 and a WL update distribution event 901 (Operation 1), which is used to identify the distributed elastic WL nodes to target for update with the fragments 921, 922, 923. An update distribution plan is created and distributed (Operation 2) to affected WL Distribution Managers (WDM 931, 932) that schedule affected nodes for update (Operation 3). The WDMs distribute and otherwise apply the update to affected infrastructure nodes (Node X 941, Node Y 942, . . . , Node Z 943) (Operation 4), where a local pod update manager (PUM 951, PUM 952, PUM 953) completes the update.

Distributed workloads in an elastic WL are images that are in various stages of a deployment lifecycle involving creation, distribution, resource binding, execution, update, coalescence, and retirement. Elastic WLs have elasticity parameters that are described by metadata (e.g., where WL node replicas can exist and where several nodes serve as redundant nodes that may perform parallel execution of a node). Additionally, pipelined execution can exist where the input of one node in an elastic WL cluster is satisfied by the output of another cluster node forming a chain of operations that execute in sequence. Elastic WL data objects may be assigned to one or more WL nodes for shared or exclusive access. A hierarchical lock structure may be used to guarantee sequential and parallel executions can occur simultaneously while still maintaining overall integrity of the elastic workload.

A WL node may have multiple execution states, (e.g., ready to run, running, blocked on hosting resource, blocked on input, blocked on output, blocked on partitioning, frozen, zombie, etc.). The WL node's image therefore can be copied, replicated, stored, encrypted, etc. to comply with node lifecycle, security, resiliency, and durability requirements.

An elastic WL has various lifecycle and execution states that can be represented as one or more file images. A "pod" filesystem therefore can be used that allows WL images to be manipulated by a distributed filesystem interface (e.g., IPFS, GFS, HDFS, Ceph) where a distributed filesystem hierarchy contains WL images as serialized Pods, Containers, Workloads, Distributed Workloads, etc. that map to objects in an Elastic Workload Filesystem (EWFS). As used herein, an EWFS refers to any cloud- or edge-distributed filesystem containing serialized WL images. The EWFS configuration may be described by metadata such as SWID or CoSWID that models a filesystem abstraction, where a distributed filesystem is also described by a filesystem abstraction. Here, different nodes in an elastic cluster can occupy a namespace in a filesystem hierarchy and the various elastic workload lifecycle states may be represented as files or sub-directories of the EWFS filesystem namespace. The EWFS metadata may be used to specify an expected deployment configuration, deployment status context, deployment lifecycle archive, and elastic workload data distribution model.

The elastic WL configuration enables performance improvements while being cyber-resilient. Elastic WL telemetry and AI/ML algorithms may add greater context for leveraging WL archives that quantify WL lifecycle overhead (e.g., pause/restart vs. decommission/recommission). For example, the elastic WL equivalent of a suspend-resume state “S3” in an operating system process suspend/resume may record resource utilization, latency, network bandwidth and so forth. Thus, the overhead that is associated with WL lifecycle transitions can be analyzed, when these measurements are available for analysis and optimization of WL microservices.

Figure 10:
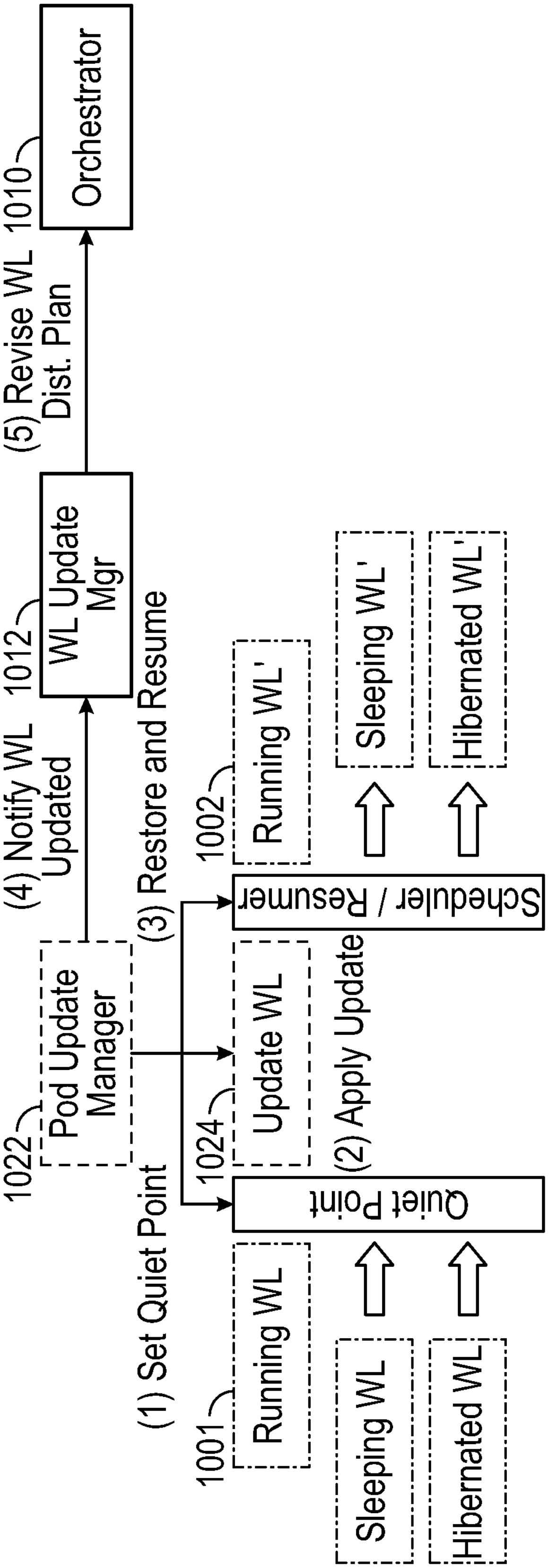
FIG. 10 is a block diagram that illustrates a save-restore workflow, according to an example.

FIG. 10 is a block diagram that illustrates a save-restore workflow, according to an example. Here, WL security islands combined with failsafe protocols create safe enclaves in edge deployments that may facilitate secure and reliable infrastructure upgrades. Further, a WL's self-management capability can be used to implement ‘save-restore’ or ‘save-restore-reinit-resume’ workflows.

As depicted in FIG. 10, a running WL 1001 receives a request to update a distributed WL node with a new WL image triggering the setting of a quiet point (Operation 1). The quiet point applies to WL images in other operational states such as sleep or hibernate. Workloads that are blocked on a quiet point move to a safe operational state such as pending transactions, cached writes, and inner loop execution context. The WL update 1024 may be applied by the Pod Update Manager (PUM 1022) (Operation 2). Subsequently, the updated WL resumes processing the WL (as running WL' 1002) and the saved state is restored to resume processing (Operation 3). In the case of sleeping or hibernated WL states, these states can be returned to with use of a sleeping or hibernated WL' image. After successful application of the update (or error state), the PUM 1022 notifies the Workload Update Manager (WUM 1012) regarding the update status (Operation 4). The WUM 1012 may further notify an Orchestrator 1010 where notifications from across the elastic edge may be assessed (Operation 5). Distributing WL update operations improves scalability of elastic (distributed) WLs because the distributed WL does not need to be coalesced to a central node to apply an update then re-distribute the WL. The Orchestrator nevertheless maintains a central and consistent view of update application using notifications and the WL metadata.

Using Simulated Test Flows for Workload Binding

Traditional workload simulation environments create a test framework that employs test automation controls. These test automation controls are designed to exercise a workload given a synthetic data set and prescribed test case functions and deployment parameters. Workload execution may be instrumented and logged to validate expected intermediate results. Workloads operate with an expectation of ready access to resources.

This existing approach is insufficient for testing elastic workloads in simulation due to elastic resource requirements and competition for resources as workloads fragment, proliferate, and compete for limited resources. Elastic workloads are comprised of both executable flow and data sources or data sinks where workflow logic targets data repositories for sourcing or syncing persistent data. The systems and methods described herein provide a simulation environment that addresses these challenges.

As stated, existing workload simulation solutions do not exercise the functionality and resource management limitations anticipated when deploying elastic workloads. The problem with deploying elastic workloads into production networks that do not simulate and test resource starvation, oversubscription, and availability given workload elasticity dynamics means that the production network is at risk of workload failure, slow down, security, or resiliency events. Such risks are particularly possible as new or updated elastic workloads are introduced to Edge and Cloud-connected Edge networks, resulting in increased operational costs, failure to meet service level agreements, damage to resources, and even physical harm.

The implementation described herein leverages existing workload simulation building blocks with a simulated infrastructure resource supply and elastic intents. These intents can be used to enable multiple systems under test to compete for a simulated finite set of resources as elastic intents are used to direct workloads to fragment and distribute across the simulated resource infrastructure. Multiple distribution and coalescence scenarios can be exercised while also manipulating resource availability profiles that fully exploit the effects of elasticity for a given set of elastic workloads. This also enables testing of elastic workload behaviors in simulation before subjecting them to production deployments where risks of misbehavior are multiplied.

Figure 11:
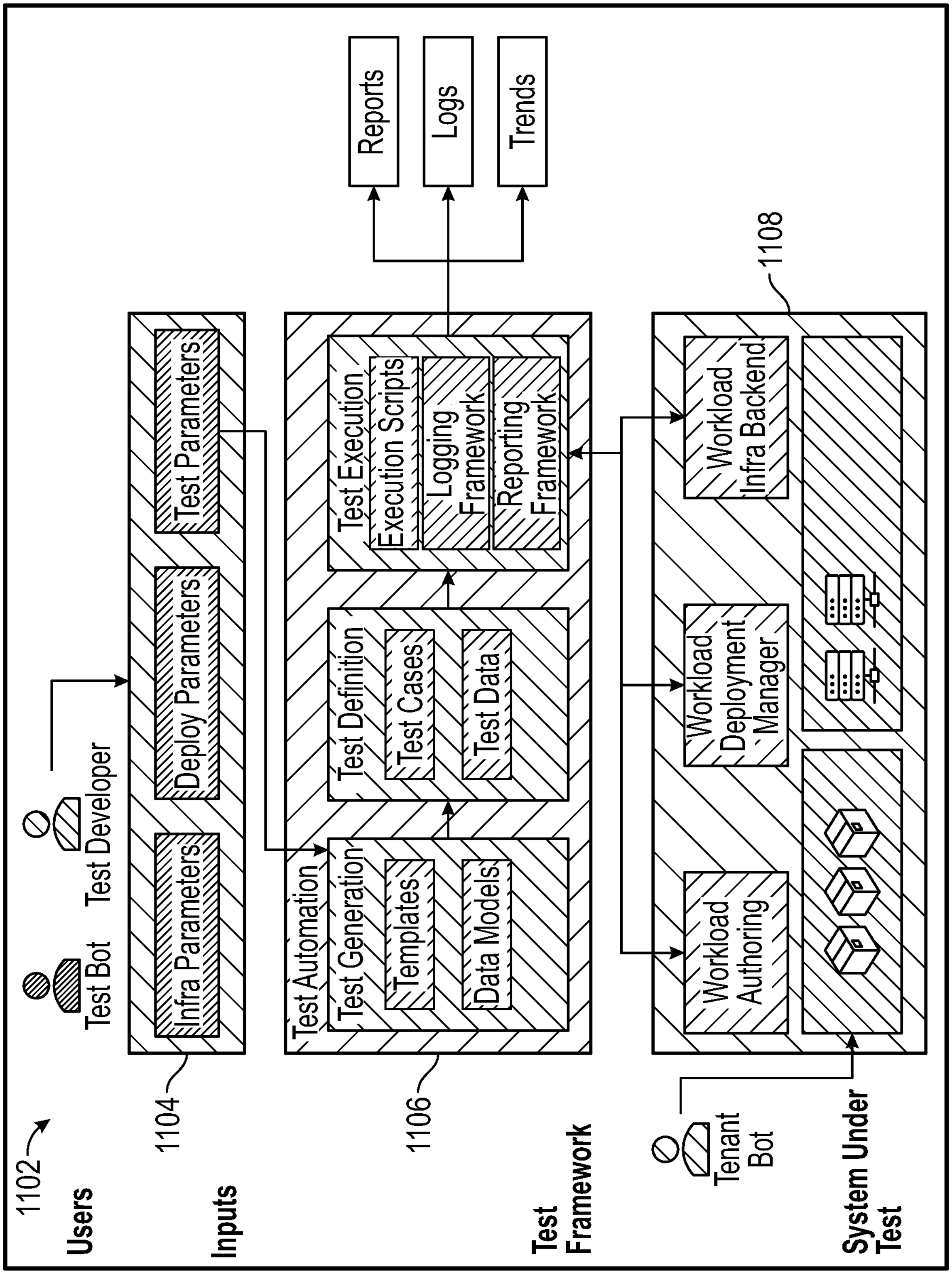
FIG. 11 is a block diagram illustrating a classical workload testing infrastructure, according to an example.

FIG. 11 is a block diagram illustrating a classic workload testing infrastructure, according to an example. Existing WL testing infrastructure automates a singleton WL for predetermined test case operation according to a prescribed test scenario. In this test scenario, users 1102 establish inputs 1104, to automate a test with a test framework 1106. The test framework 1106 is then used to generate respective scripts for a system under test 1108. The test scenario is repeatable, as WL execution follows a predetermined flow that uses resources according to the same prescribed pattern and according to a testing iteration. In this setting, regression profiles can identify anomalies in performance, resource utilization, and functional capabilities. Security testing can be performed by running pre-deployment scans on software and configuration settings. However, test scenarios may not simulate real-world use cases for elastic workloads that must handle resource starvation, adversarial competition, and disaster recovery in simulation.

Simulation of elastic workload operations prior to real-world deployment is important to ensure robust continuous operation. Such simulation requires a representation of all resources for the target system under test (SUT) environments such that they may bind to the elastic workload nodes that may further be distributed and fragmented as part of workload elasticity. The resource simulation framework specifies resource allocation profiles and WL node assignment and how resources are bound to WL nodes. Binding may further require attestation that ensures WL security sensitivity requirements can be met by a resource allocation and assignment.

Simulation is also important for critical infrastructure deployments to ensure that use of new or modified WLs do not introduce failures. A key component to the improved implementation is the use of metadata that describes the simulation environment, the simulated workload, and the resource profile. The simulation environment orchestrates the orchestrator, resource managers and other control surfaces in the elastic workload environment. The simulation environment also leverages the workload metadata that specifies security, resiliency, and distribution intent (called ‘intents’) that is used for normal operation of an elastic workload.

Figure 12:
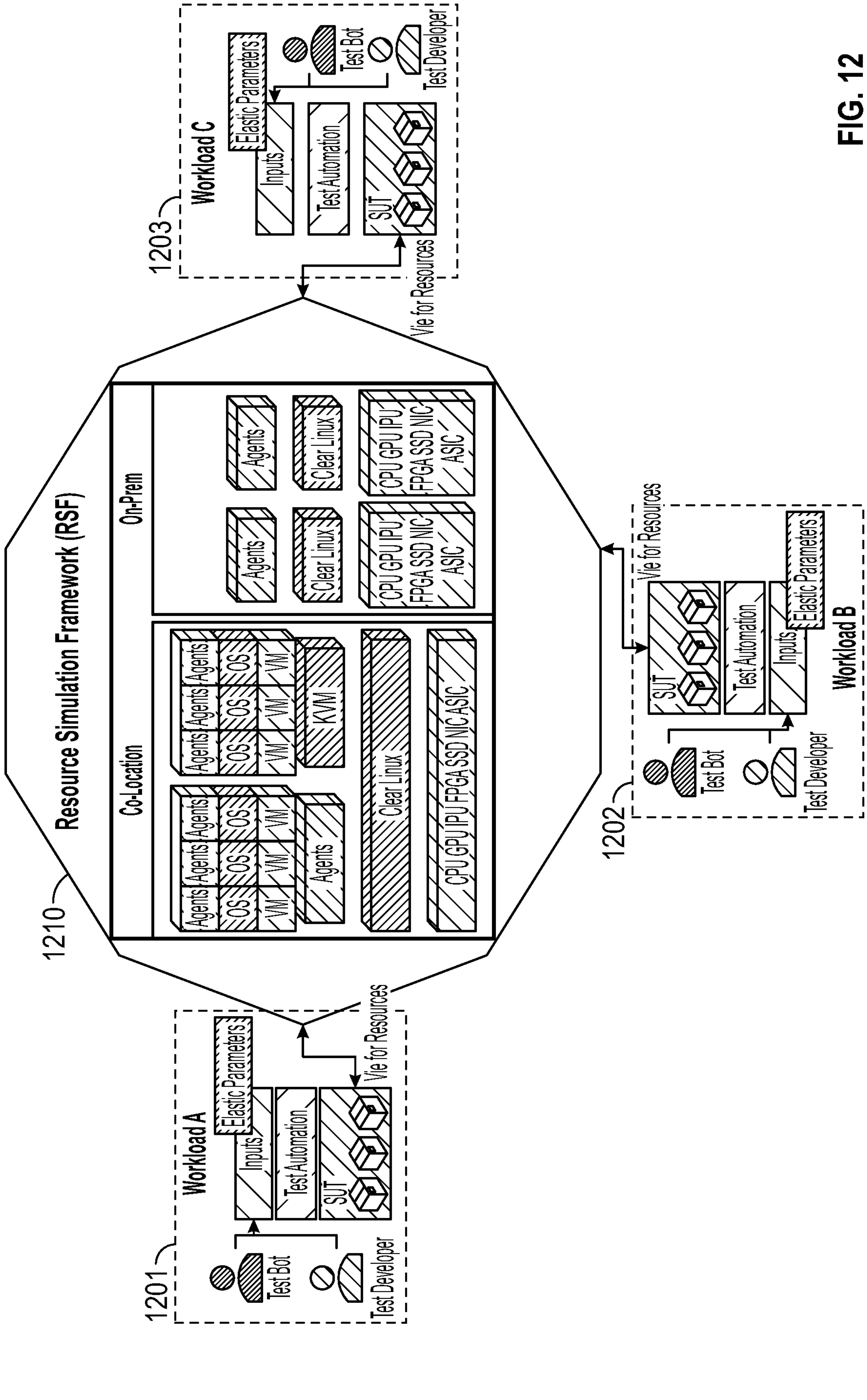
FIG. 12 is a block diagram illustrating an elastic workload testing and resource simulation framework, according to an example.

FIG. 12 is a block diagram illustrating an elastic workload testing and a resource simulation framework (RSF 1210), according to an example. The elastic WL testing configuration and RSF 1210 builds on existing WL testing infrastructures but also handles multiple workloads (WLs 1201, 1202, 1203) vying for the same set of (simulated) resources.

The WLs 1201, 1202, 1203 may be unrelated in terms of their collaboration objectives, or they may be in competition for assets (e.g., goods and services—not just resources). For example, WL A 1201 in a supplier network might estimate a supply of 100 cameras is needed, while WL B 1202 may require 200 cameras. If WL C 1203, a camera supplier, can produce 250 cameras, there is a net deficit of 50 cameras. If the test objective is to determine whether WL A 1201 behavior can dynamically adapt to a new change in available resources, WL goods and services, etc., then the simulation environment will accommodate multiple simultaneous workloads.

Simulation itself is a workload that may iteratively model the most basic and important resource bindings, followed by resource fragmentation and re-binding as elastic WLs fragments are distributed. This modeling is followed by resource starvation, sharing, over subscription, failover, and so forth. Although Kubernetes (K8S) testing frameworks consider CPU, memory, and disk as important resources to track and manage, existing K8S testing frameworks do not fully support advanced distributed resource contention scenarios or scenarios.

The resource simulation framework is highly scalable to use common resource behavior profiles that model and simulate starvation, distribution, fragmentation, oversubscription, failover etc., including with models that can cover a spectrum of use cases and deployments. Additionally, resource profiles may be used in the following framework to model multiple trusted resources as a way to exercise the full flexibility of elastic intents (especially where WL fragmentation and distribution might not stop at a single pod/cluster). Such WL fragmentation and distribution may result in multiple clusters that organically form around data lakes, availability of acceleration farms, or mobile trajectories common to Multi-access Edge Computing (MEC).

In further examples, the resource simulation framework may monitor resource utilization across various WL clusters to eliminate clusters that do not meet KPIs or latency requirements (e.g., such as due to data lake access latency, set to a high bar policy). Additionally, the WL KPI test metrics (e.g., CPU utilization) may be combined with cybersecurity attributes (e.g., redundancy), including to incorporate a toolbox for cyber-resilience testing (e.g., Mitre's 'Att&ck' toolbox) and produce an audit report containing a cybersecurity gap analysis. Toolbox extensibility may include Digital Twin (DT) support where platform implementations that support DT features may instantiate mirror copies of a WL node resulting in additional pressure on overall resources.

In still further examples, the resource simulation framework may define a simulation pod "SimPods" abstraction where an elastic WL is fragmented and distributed to form a 'pod'—similar in concept to a K8S pod—where pod behavior is the focus of simulation. The simulation objective then can be performed to optimize resource allocation and assignment according to the SimPod.

System Firmware and Software Update and Relaunch Processes

Elastic C2E workloads may be continuously integrated and deployed (e.g., with continuous integration and continuous delivery/continuous deployment (CI/CD) software practices). Security vulnerability events (e.g., Common Vulnerabilities and Exposures (CVEs)) may be reported that render portions of attested elastic workloads unsecure despite having contradictory attestation results. CVE detection, correction, and redeployment of elastic workloads is challenging due to the dynamic nature of elastic workloads because the elastic workload can be distributed across multiple nodes, migrated, and coalesced again dynamically independent of workload orchestrator knowledge. The following implementation uses a cloud-edge cluster manager and late binding of workloads and workload data to execution resources to implement workload elasticity properties. This implementation enables CVE notifications and re-attestations to be applied as part of a dynamic 'top-half' and 'bottom-half' binding operation.

Existing solutions rely on CVE notifications to software supply chain developers and operators who then review software inventories to determine if any deployed products are affected by a CVE. This approach requires careful records and diligence on behalf of the software vendors to determine if a released binary actually is affected by a CVE. This approach does not scale because elastic workloads are dynamically partitioned according to metadata that is embedded in the workload, making it nearly impossible for an operator to predict which deployed nodes are affected by a CVE at any given time.

The implementation described herein integrates attestation with elastic workload deployments using orchestrators for top-half workload deployments, and cluster resource managers that provide bottom-half resource management. In the bottom-half resource management, the binding of resources to a workload (or elastic workload fragment) is subject to attestation and CVE assessment. The elastic workload is designed using a metadata scheme that identifies the possible ways that the workload might be dissected during deployment to optimize available resources. The metadata may be used to assess a CVE and determine which workload fragment in a deployment is affected.

Workload migration and update mechanisms are repurposed to seamlessly apply CVE-driven countermeasures that patch/update workload fragments in replica or digital twins that may undergo a loss of operational integrity as a result of applying the countermeasure. The replica workload fragment may be used to migrate a functioning workload fragment from a vulnerable node to a non-vulnerable node seamlessly and without requiring the distributed workload to be coalesced. This enables elastic workloads that have been partitioned and optimized for maximum resource efficiency to remain operational in their optimized form, while still being able to detect and apply CVE resolutions.

Figure 13:
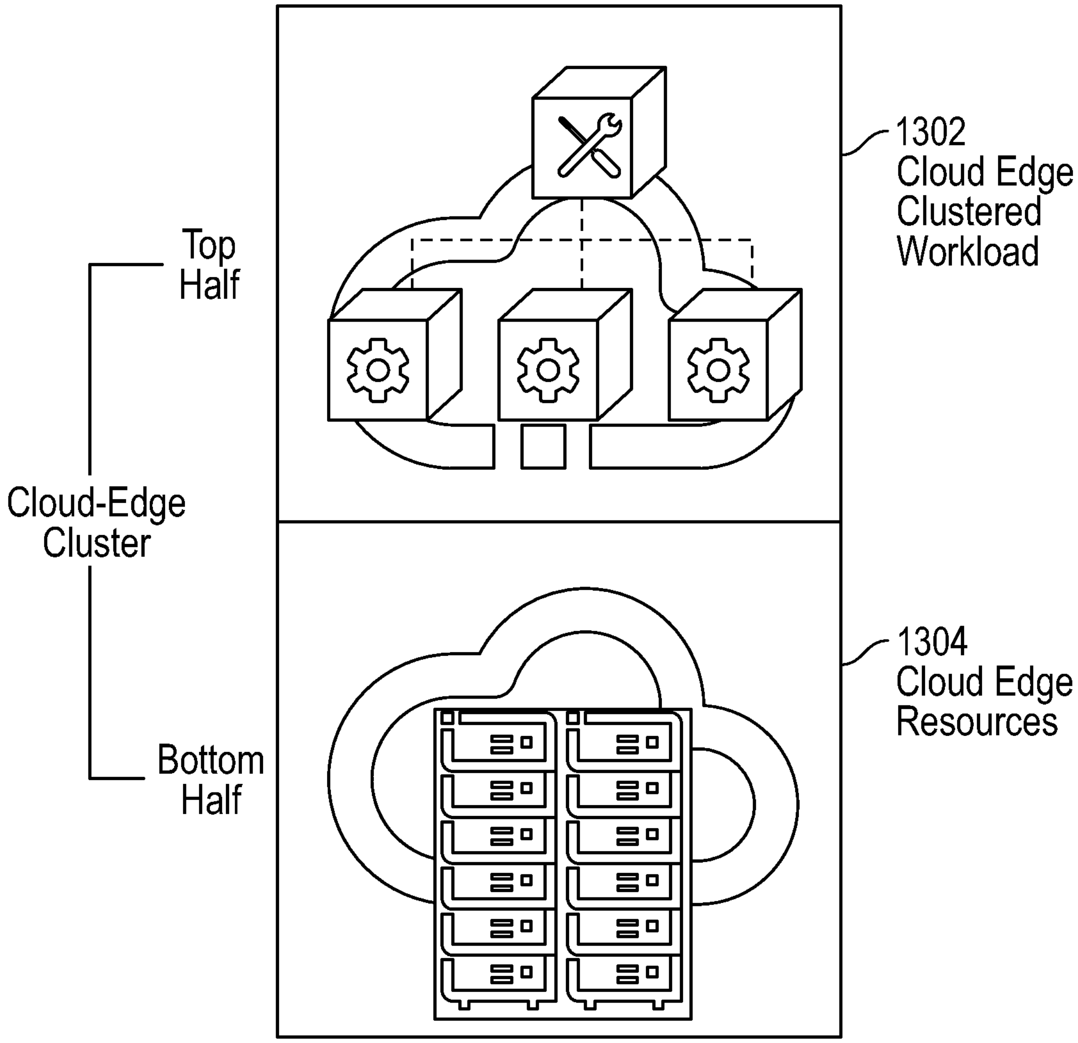
FIG. 13 is a block diagram illustrating a cloud-edge cluster, according to an example.

FIG. 13 is a block diagram illustrating a cloud-edge cluster, according to an example. The cloud-edge cluster shows a typical C2E deployment having a top half 1302 with one or more C2E Workloads and a bottom half 1304 with one or more resources (e.g., CPU, storage, memory, sensing, etc.) that are bound to the top-half workload. A workload can be monolithic or divided into distributed workload parts (e.g., with respective parts performing a portion of the monolithic workload). The workload data may be merged or integrated with the workload execution or may be accessed remotely upon demand or may be cached to minimize network latency overhead. Cached data may be updated as needed and write-through caching may be used to ensure data consistency.

The top half 1302 is bound to bottom half 1304 resources as part of a C2E Cluster deployment. Initial deployment may allocate a set of top half nodes that are scheduled to run using bottom half resource nodes. Binding activity may involve attestation of the resources by the top half 1302 prior to binding to a bottom half 1304 or attestation (e.g., WL/data provenance evaluation) of the top-half workload and data by a bottom-half node prior to binding. Binding may be facilitated by orchestration or resource manager nodes.

After binding, the resultant cloud-edge node may begin processing the workload. Distributed workloads may produce output that is consumed by a peer cloud-edge node originating from the same monolithic workload. Peer cloud-edge nodes that act as consumers or producers of other peers may attest the peer prior to consuming WL inputs from a peer or prior to sending WL outputs to a peer. Mutual attestation ensures the peers are indeed peers and that they are bound to resources that satisfy an overarching and consistently secure workload policy.

Figure 14:
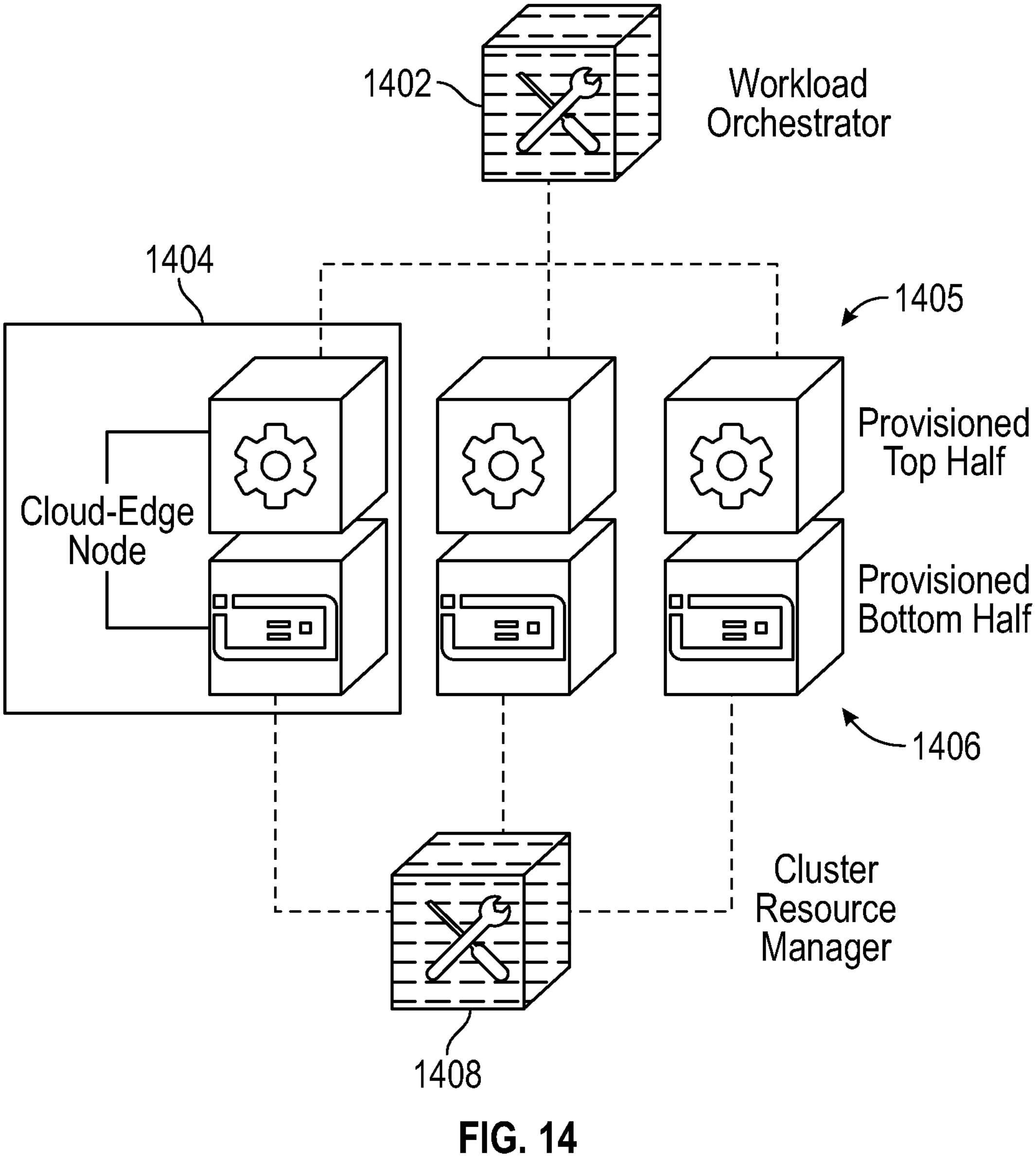
FIG. 14 is a block diagram illustrating a cloud-edge cluster after provisioning a distributed workload, according to an example.

FIG. 14 is a block diagram illustrating a cloud-edge cluster after provisioning a distributed workload, according to an example. After provisioning all peer nodes in a distributed workload, the operational cluster is depicted in FIG. 14 and includes one or more cloud-edge nodes (e.g., node 1404) where a top-half workload 1405 (or partitioned workload) is bound to a bottom-half resource 1406 (or set of resources). The top-half workload 1405 may be orchestrated by an orchestration agent 1402 (e.g., Helm, Rancher) that may interface with a top-half workload 1405 (e.g., K8S pod manager). Additionally, the provisioned bottom-half resource 1406 may have a cluster resource manager 1408 that oversees operation resource utilization and optimization. The cluster resource manager 1408 may assign/de-assign resources (e.g., CPU, memory, storage, IPU/DPU/XPU, etc.) as needed to meet workload QoS requirements and to optimize power or performance.

Figure 15:
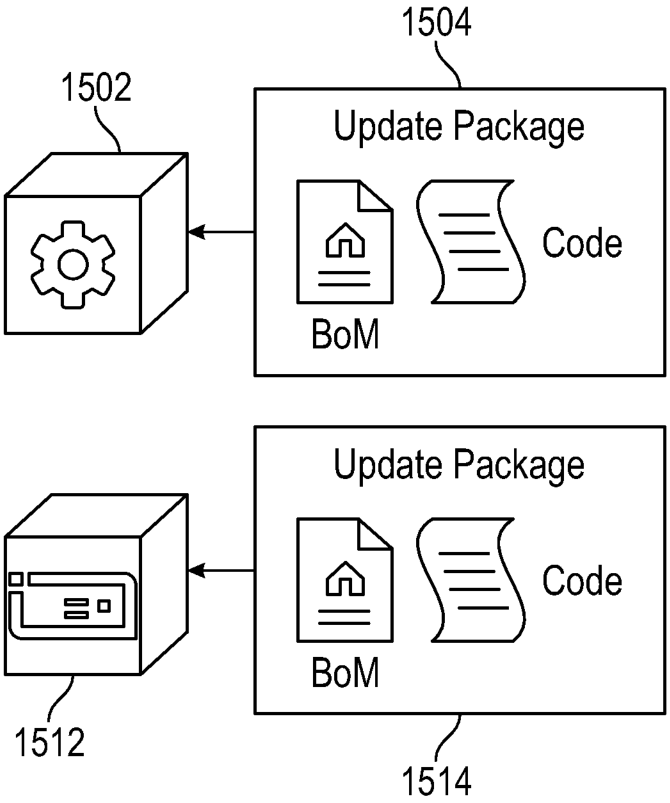
FIG. 15 is a block diagram illustrating updated packages for top and bottom half components in a distributed edge cluster, according to an example.

FIG. 15 is a block diagram illustrating updated packages for top and bottom half components (e.g., a top-half migration target 1502 and a bottom-half migration target 1512) in a distributed edge cluster, according to an example. The top-half update package 1504 may include a Bill of Materials (BOM) describing software, firmware, drivers, or hardware components. The BoM may include attestation reference values for matching attestation evidence, endorsed values that represent attributes and properties of the component known to the component vendor, supplier, or deployment agent. The bottom-half update package 1514 may contain updated firmware, software, settings, configuration parameters, calibration parameters, policies or other information related to applying the update. It may also contain attestation verification policies and resource descriptions that identify resources that are equivalent or similar that may substitute for other resources that may differ in terms of vendor, model, version, etc.

The top-half update package 1504 also may contain updated workload code, settings, configuration parameters, quality-of-service policies, key performance indicators, metrics, data source, data sink parameters, etc. It may contain attestation information in the form of reference values, endorsed values, device identity certificates and other information used to attest the workload and to verify peer workloads.

An orchestration agent or cluster resource manager may be used to perform migration operations to update a deployed C2E cluster node. For example, a deployed workload may be modified to add, remove, or change workload behavior. Similarly, deployed resources may be updated to install or replace hardware modules, device drivers, system software, framework software.

When updates are applied, they may invalidate current attestation and trust contexts. Hence, application of an update can affect the risk management posture of the workload or operational resources even if there is no change to behavior or data. Some or all of the operational prerequisites (such as attestation) may need to be redone after applying an update. This process of updating and re-attesting an updated C2E cluster node is referred to as Continuous Evaluation (CE). When various components of a C2E cluster node are attested separately (e.g., workload, operating system, firmware, hardware, etc.), an update applied to one component may invalidate the attestation for the entire C2E cluster node. However, with component-level attestation, an update to one component may cause a re-evaluation of that component and a new attestation to be issued for the updated component. This new attestation may be integrated with other component-level attestations for the C2E cluster node. Whether workload migration is required may be controlled by attestation, security, trust, operational, or other intents.

If the workload has availability requirements that disallows halting the workload to apply the update and re-initialize the trust context, but retains the requirement to maintain robust trust context, the C2E cluster node may employ an update migration method designed to minimize workload disruption. Prior to the update package being installed, a new cluster node is provisioned, and the update package applied to the new node. In the case where a top-half workload node is to be updated, a new workload node may be provisioned and updated. Similarly, a bottom-half resource node may be provisioned, and update applied. The newly provisioned node may be attested and verified according to attestation procedures.

The update process involves migrating the currently executing workload (or resource) node to the newly provisioned node. There are two forms of migration, remote and local. Remote migration involves C2E nodes that are hosted on different physical platforms, while local migration is applied to logical or virtual contexts on the same physical platform.

Figure 16:
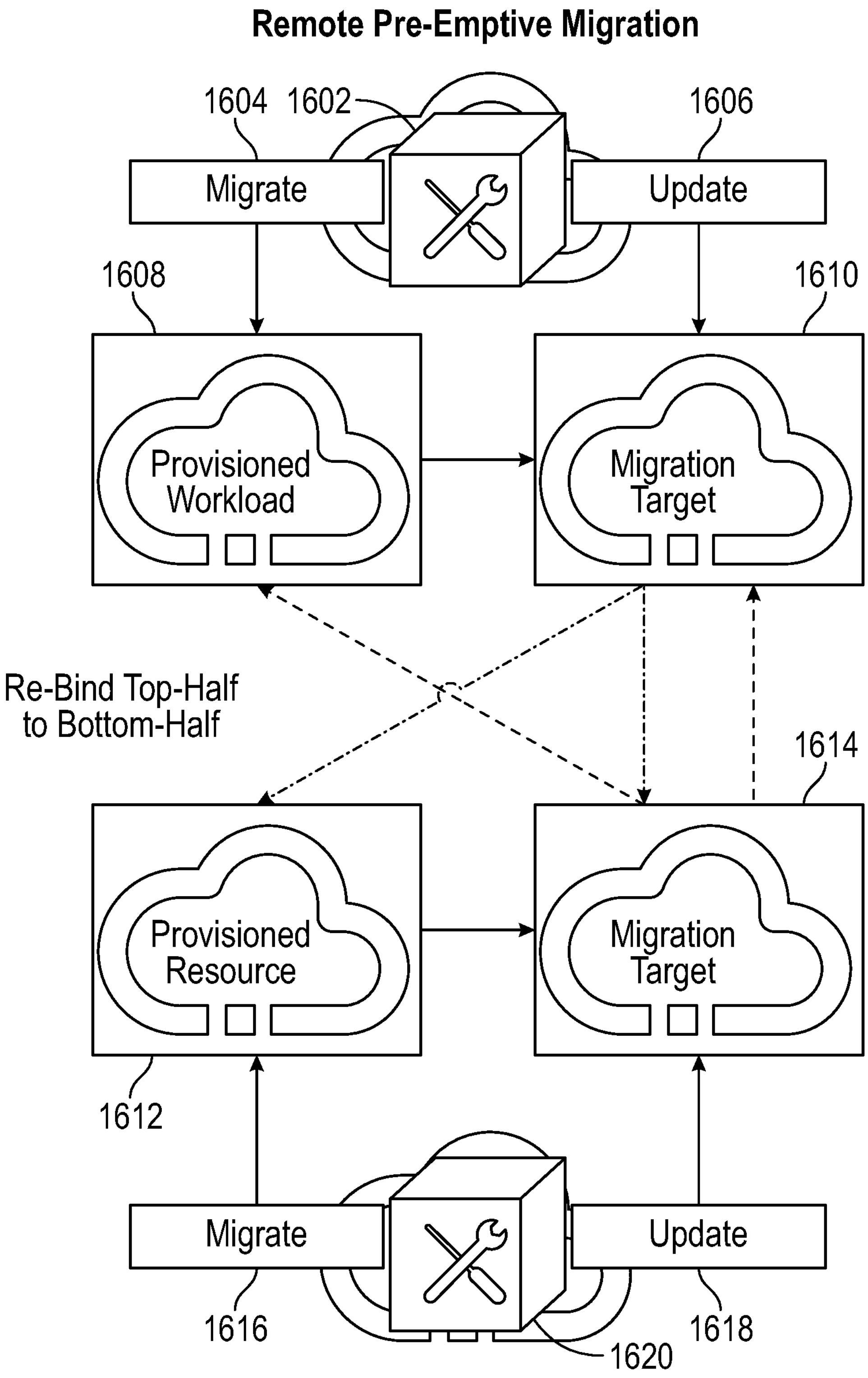
FIG. 16 is a block diagram illustrating remote cloud-to-edge node migration, according to an example.

FIG. 16 is a block diagram illustrating remote cloud-to-edge node pre-emptive migration, according to an example. Specifically, this diagram shows remote proactive migration in response to an available update. When an update to a top-half component 1602 is available, a new workload node can be allocated where the affected workload container is replicated and the replicant is updated with update operations 1606. The replicated container becomes a migration target 1610 to which the existing provisioned workload 1608 is migrated, based on migration operations 1604. Migration operations 1604 may include copying workload context, settings, connections, data, and memory state to the migration target 1610. After which, the migration target 1610 may be attested to account for the updated software, settings, and configuration.

Similarly, an update to the bottom-half component 1620 may proactively allocate a migration target 1614 that is a clone of the provisioned resource 1612 to which the update is applied (with update operations 1618). After the update operations 1618, the bottom-half target may be attested to account for measurement changes resulting from applying the update. The top-half migration target 1610 and the bottom-half migration target 1614 are re-bound to re-establish an attested trust relationship between the two halves (depicted by diagonal lines in FIG. 16). For example, the bottom-half target may contain an attesting environment that can measure the top-half migration target 1610. Alternatively, an orchestration agent or attestation service provider may invoke attestation agents in top/bottom half targets to perform a similar attestation function, resulting in attestation evidence linking the top and bottom half (trust dependency) targets. Alternatively, the update is applied to either the top-half or the bottom-half target resulting in migration of only the top (or bottom) half target. Nevertheless, trust dependency is re-established with the non-migrated component (depicted by diagonal lines in FIG. 16).

After re-attestation occurs, the connection state may need to be reestablished between top and bottom half entities. Information consumed by the top-half from the bottom-half is contingent on the trust dependency context. If the trust context is disrupted, the data and control planes are also disrupted. Reestablishment of a control/data plane context may include reestablishment of connection state. For example, if a Transport Layer Security (TLS) or Security Protocol and Data Model (SPDM) connection existed before, the session keys may be renegotiated. The protocol key exchange may call for inclusion of Attestation state in session key generation or may log session handshake messages showing the attestation state, or session state (such as a session MACing key) may include attestation state. Session reestablishment refreshes the session state to reflect the trust impact from having applied the updates.

Figure 17:
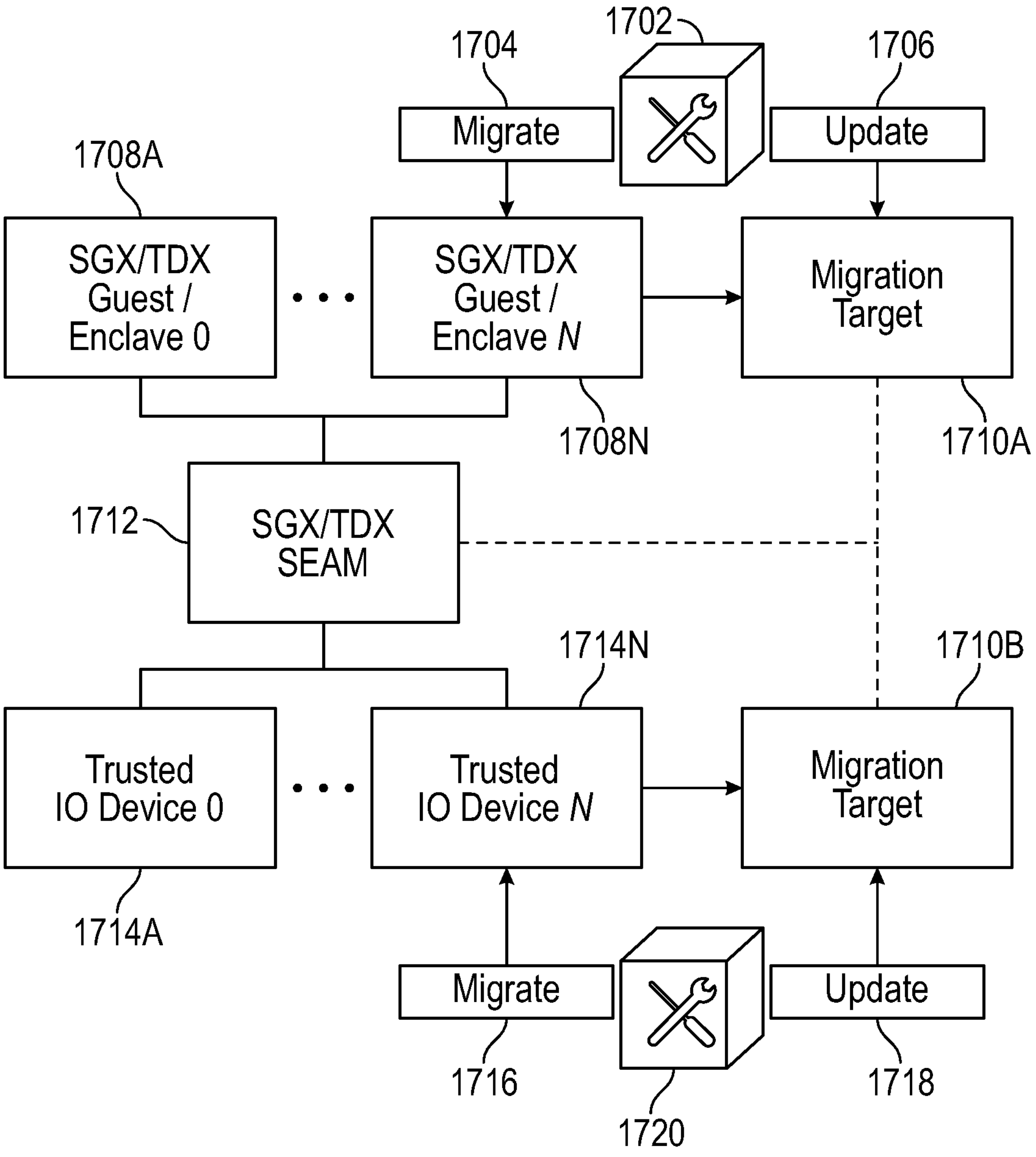
FIG. 17 is a block diagram illustrating local pre-emptive migration, according to an example.

FIG. 17 is a block diagram illustrating local pre-emptive migration, according to an example. In this scenario, a top-half guest or secure enclave 1708A to 1708N (e.g., provided by an Intel® SGX/TDX, AMD® SEV-SNP (Secure Encrypted Virtualization, Secure Nested Paging), ARM® Confidential Compute Architecture (CCA), or ARM® TrustZone environment) communicates to bottom half IO devices 1714A to 1714N through a Secure-Arbitration Mode (SEAM) component or another similar security-services module 1712.

When updates 1720 are applied at a bottom-half resource to update an IO device, a new IO device driver context (virtual IO device) is created that has an update 1718 applied, such as an updated driver. The previous driver or IO device remains operational during this process started with a migration 1716. The new (updated, virtual) device 1710B establishes a new connection to the security-services module 1712 which may include attestation of the new device 1710B. The security-services module 1712 advertises availability of the new device to the guests. The guests that depend on the IO device may, at their convenience, open a connection to the new device 1710B and close the connection to the previous device. The data on the device remains available and consistent across both virtual devices as a property of virtualization abstraction.

Updates 1702 that are applied to the top-half guest or secure enclave 1708A to 1708N may impact trust dependency on lower layer IO devices. A proactive migration 1704 may apply to top-half nodes as well. A new migration target 1710A (guest or secure enclave) is created with a clone of the guest/enclave to be migrated, and then the update 1706 is applied. The migration target 1710A creates a new connection to the security-services module 1712 which multiplexes with the IO devices. The old enclave/guest migrates workload and data to the migration target 1710A and begins using the target's attested connection to the security-services module 1712. Migration of the workload and data may be further facilitated by virtualizing the workload and data into memory that is shared across old and new target. The updated and attested part of the workload are held separately.

When the node completes migration, the attested state of the new node reflects the update. When the node interacts with a peer node that requires knowledge of the node's attestation state, the new node may re-attest to an orchestrator, attestation service or the peer node directly to obtain an attestation token representing the updated state. Previously minted tokens are discarded in favor of the most recently issued token. Tokens may expire requiring periodic reissuance.

This implementation uses intent-based declarative operations that describe the various ways an elastic workload can be partitioned and distributed. Thus, the precise resource requirements for a WL partition are readily available to orchestrators or cluster resource managers for dynamic distribution or coalescence operations.

In further examples, the elastic workload infrastructure may be diverse in terms of hardware and software BoM that are used. The CVEs may be prioritized based on rank (e.g., ranking of an impact if compromised for a given vulnerability) and this rank may assist in the upgrade strategy that is applied across the orchestration and deployment infrastructure. This may leverage residual compute resources to minimize operational runtime impact on the upgrade process by providing recommendation to the backend services. A small amount of partitioned capacity may be reserved in respective nodes so that the workload can be migrated to its optimized partitioned capacity first (without having to drain the workload or migrate it long distance), and then restored to full capacity after a CVE fix is applied and rebooted.

Manifest standards contain BOM lifecycle intents where updates and patches are tracked by a BoM. A challenge is the older images do not know about newer images that superseded them. However, newer images may contain references to older images (in the BoM) such that a cluster resource manager can trace the lineage and determine if a CVE applies to an older revision of a workload fragment. An update service may be needed that maintains a database of update dependencies such that older images that are not aware of newer images can be searched efficiently. A publish/subscribe system could be used to multi-cast lifecycle notifications so that workload fragments are aware of the most current images and which lifecycle states apply for current configurations. Other secure environments (such as Intel® TDX, AMD® SEV-SNP (Secure Encrypted Virtualization, Secure Nested Paging), ARM® Confidential Compute Architecture (CCA), or ARM® TrustZone) may be used as a more secure hosting environment for elastic workloads that uses an IO resource. The IO resource driver or firmware may be updated by its device vendor or an administrative service provider that is not controlled by the workload orchestrator or cluster manager. The update may change the attested and assessed trust context resulting in a stale attestation result. Secure execution applications may want to prevent updates so they can optimize on a particular KPI vector while retaining a known attestation result. However, elastic cloud-to-edge may not have a central orchestrator that maintains attestation and update consistency. Elastic workload intents may describe the artifacts of the workload that should be negotiated in terms of how to effectively trade-off attestation integrity with operational availability.

Operational intents, attestation intents, software bill of material intents, security intents, or other policies (e.g., SLA or SLO) may be used by orchestration or resource manager nodes to assign workloads to resources, bind top and bottom halves, migrate workloads, monitor nodes, or perform other workload lifecycle operations. Intents, such as security intents, dimensions, and cores, which are described below, may be used in combination with intents that specify a minimum, maximum, target, or range of a cost, billing, bandwidth availability, compute availability, latency, or the like.

A CVE may differentiate between an exterior and interior impact. By applying a patch to a component outside the workload (BoM of Platform) may be effective way to mitigate the threat (e.g., by applying a software firewall) or patching may be applied within the workload (BoM of WL) to correct a vulnerability (e.g., by closing a buffer overflow).

If there is an increasing CVE backlog, a backlog threshold (e.g., a minimum rate of burning backlog is greater than rate of new CVEs including weighted severity) may define a grace period with policy-based rules where the update can be safely applied. Cyber Resiliency is affected in that a Cyber-Resilient Triad exists where the workload, data, and host node encounter independent CI/CD/CE processes, but the triad is reconciled by metadata intents that allow the CVE impact to be traced to a specific workload fragment and resource that contains the vulnerability. Through CE, the workload fragment or resource may be evaluated, updated/patched, re-attested, and re-deployed.

Trust Coordination Across Computing Elements in an Edge to Cloud Continuum

Distributed compute and networking have evolved into a hyper-connected compute continuum with the introduction of various C2E approaches. C2E approaches are expected to be adopted by many industry participants, including cloud service providers (CSPs), communications service providers (CoSPs), and enterprise providers. C2E approaches enable the transition from vertically integrated, industry-specific solutions to horizontal platforms where all compute nodes can execute workloads, produce, and consume data.

Figure 18:
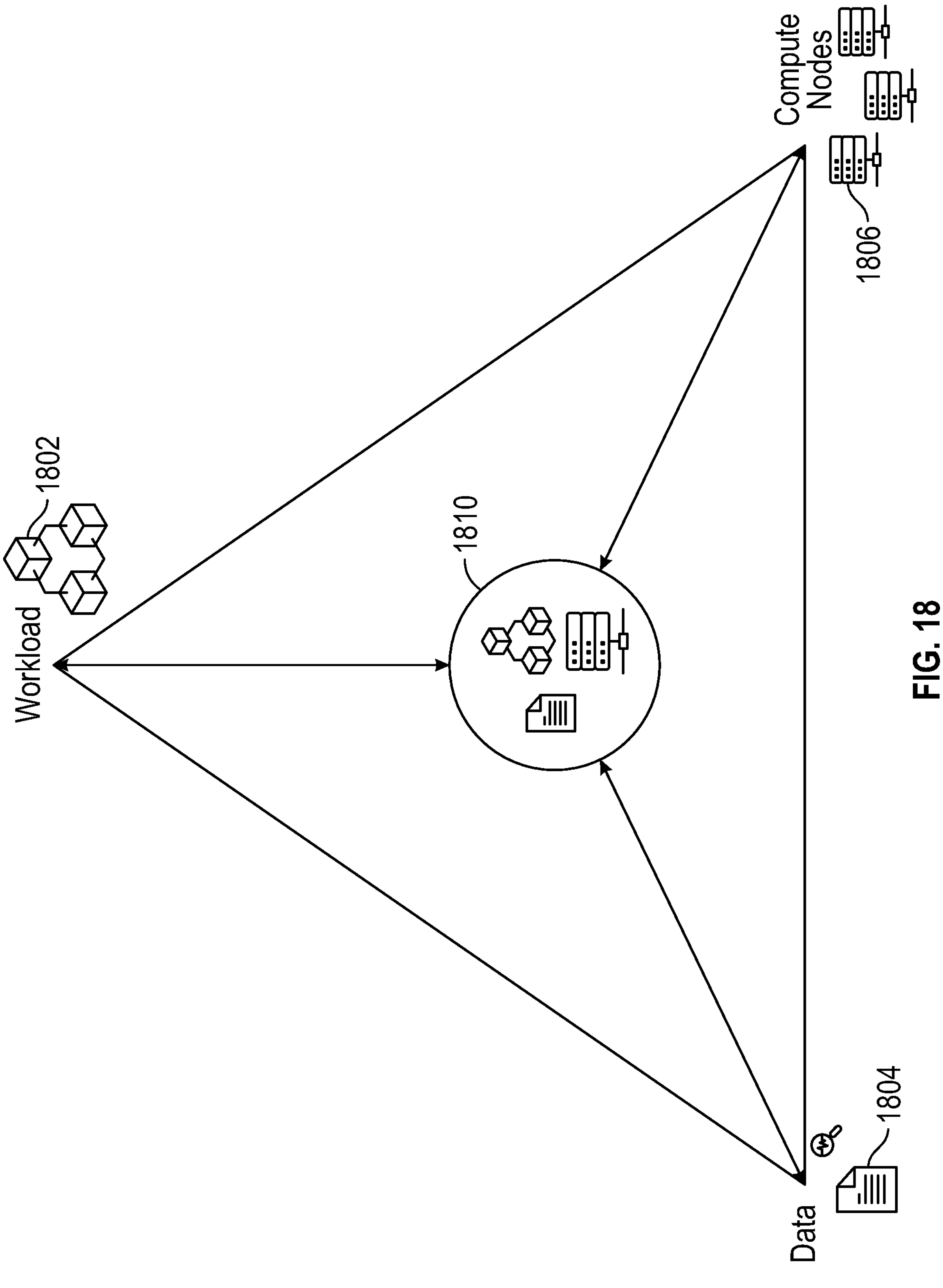
FIG. 18 is a diagram illustrating the elements of a hyperconnected compute continuum, according to an example.

FIG. 18 is a diagram illustrating the elements of a hyperconnected compute continuum, according to an example. Three elements primarily participate in the hyper-connected compute continuum: workloads 1802, data 1804, and compute nodes 1806. Security is a key contributing factor for compute elasticity in C2E deployments 1810 that use these elements, to ensure the capability to move work-loads across the different end points of execution.

Industry participants may have the view that unreliable security hinders C2E operations. Security requirements cannot be addressed without establishing trust between the elements of the compute continuum. Protecting edge components with intrinsic security of applications, data and infrastructure is also a concern. This complex technical problem, driven by multi-party supply chains and customer interactions, also needs to be scalable.

Existing attempts for trust establishment have been based on siloed, vertical attestation for a compute node or workload (e.g., Intel® SGX attestation, Secure Boot using Trusted Platform Module (TPM), DICE, or SPIRE). Accordingly, there are not suitable Data Provenance attestation solutions available, and existing approaches are limited to per-app or per-microservice implementations. For example, consider the use of OPA (Open Policy Agent), which is an open source, general-purpose policy engine that unifies policy enforcement across a software stack. It provides a high-level declarative language to specify policy as code and APIs to offload policy decision-making. However, OPA lacks the aggregation of the assertions and ability to reassess the assertions (metadata) runtime.

There are other deficiencies with existing approaches for trust establishment. For instance, implementations follow needs, which may create lag in deployments. Further, there is fragmentation and redundancy among many approaches, resulting in failure-prone implementations. There are also implementation inefficiencies, such as hard-coded policies, which are difficult to maintain. Thus, existing implementations often have a lack of consistency, use an ad hoc format, are standard-adverse, are difficult to scale (being embedded in other code/product), and are difficult to secure (and if they are embedded, they may need additional technical solutions).

The following addresses aspects of multi-party trust coordination, to provide trustworthiness from the exchange of metadata, evaluation of metadata per policies, and decision making. This trust coordination is applicable to complex C2E compute environments that enable multiple parties to provide heterogeneous metadata and associated policies and entity capabilities. Further, the following also provides approaches to collect, analyze, make decision, and reassess the trustworthiness assertion based on policies and entity capabilities.

Figure 19:
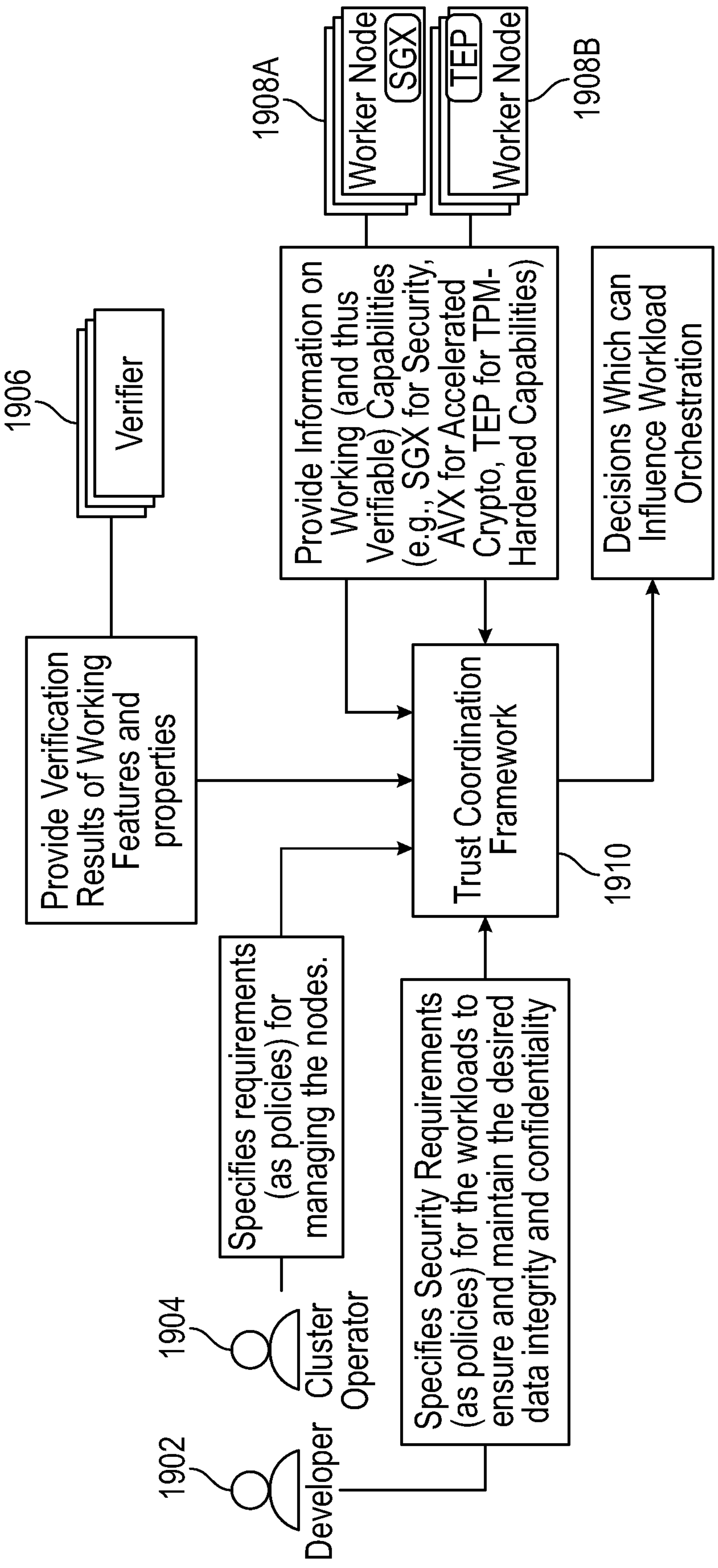
FIG. 19 is a diagram illustrating trust coordination, according to an example.

FIG. 19 is a diagram illustrating trust coordination, according to an example. As observed by reviewing FIG. 19, there are many problems and challenges in solving trust coordination. A developer 1902 may specify security requirements (in policies) for workloads, whereas a cluster operator 1904 may specify requirements (in policies) for managing nodes which operate the workload. Multiple policies contribute metadata relating to security (e.g., relating to the policies, requirements, working capabilities, and software properties). However, this metadata is often heterogeneous (e.g., is not bound to a particular software or hardware technology). Additionally, a verifier 1906 may be invoked to obtain verification results of working features and properties. Additionally, a worker node 1908A or 1908B may use different technologies and provide information on working (and thus verifiable) capabilities.

Systems and methods described herein provide for trust coordination across heterogenous elements in an C2E setting, with use of a trust coordination framework 1910. This framework 1910 provides a mechanism for processing of heterogeneous multi-party metadata that includes collection, analysis (reasoning) and dynamic reassessment of policies over metadata. The framework 1910 simplifies evaluation of relevant metadata and policy management, and makes or assists decisions that influence workload orchestration. The framework 1910 relieves reliant services (e.g., dependent services) from the complexity of handling metadata and policies (in terms of quantity, size, and heterogeneity), such as by SGX attestations, TPM attestations (like in Keylime), software supply chain assertions, data provenance assertions, etc. The framework 1910 also consolidates metadata and policy handling in a single instance for multiple relying services. The framework 1910 also minimizes code maintenance of relying services to update metadata formats and policies.

Compared to a singular attestation approach, the following trust coordination implementation will enable specific requirements of entities such as devices, workloads, or data instances to support assertion policies. For example, the trust coordination implementation can introduce new methods, protocols and interfaces for registration, and the exchange and query of assertions and for registration and evaluation of policies (e.g., APIs available to the edge and cloud customers to specify or select an attestation policy when they want to run a sensitive workload in the cloud that requires protection from software and hardware exploits).

Figure 20:
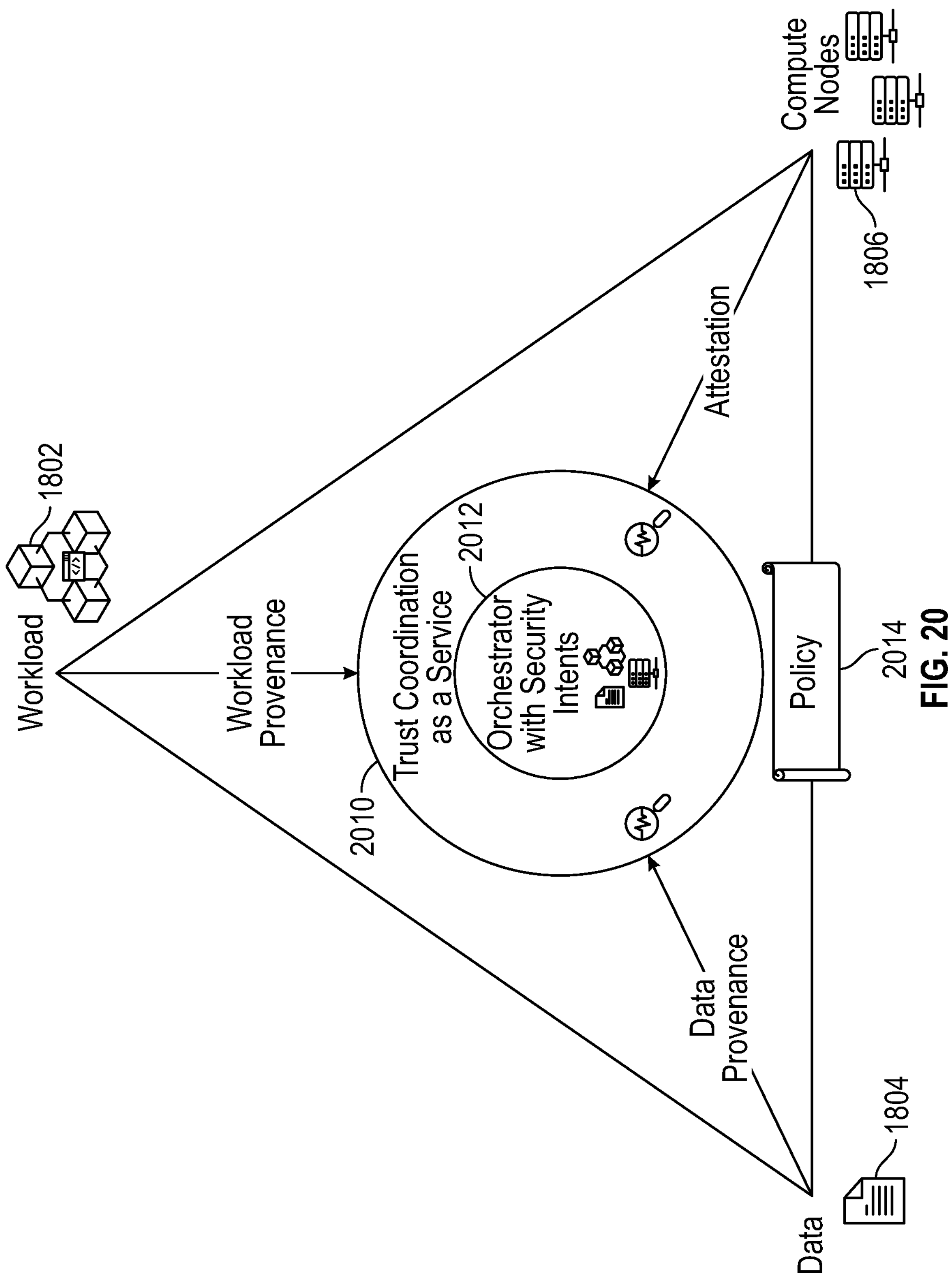
FIG. 20 illustrates the use of a trust coordination as a service, according to an example.

FIG. 20 illustrates the use of a trust coordination as a service, according to an example. This implementation demonstrates trust coordination across heterogenous elements of computing in an C2E framework. Trust Coordination Framework (TCF) can be an implementation that can be presented as a Trust Coordination as a Service (TCaaS) engine 2010 integrated into Cloud-to-Edge Orchestration Solutions. Here, the workload 1802 can be associated with workload provenance characteristics; the data 1804 can be associated with data provenance characteristics; the compute nodes 1806 can be associated with attestation values. The TCaaS engine 2010 may be operated or used by an orchestrator 2012, to consider security intents and other aspects of the policy 2014.

Figure 21:
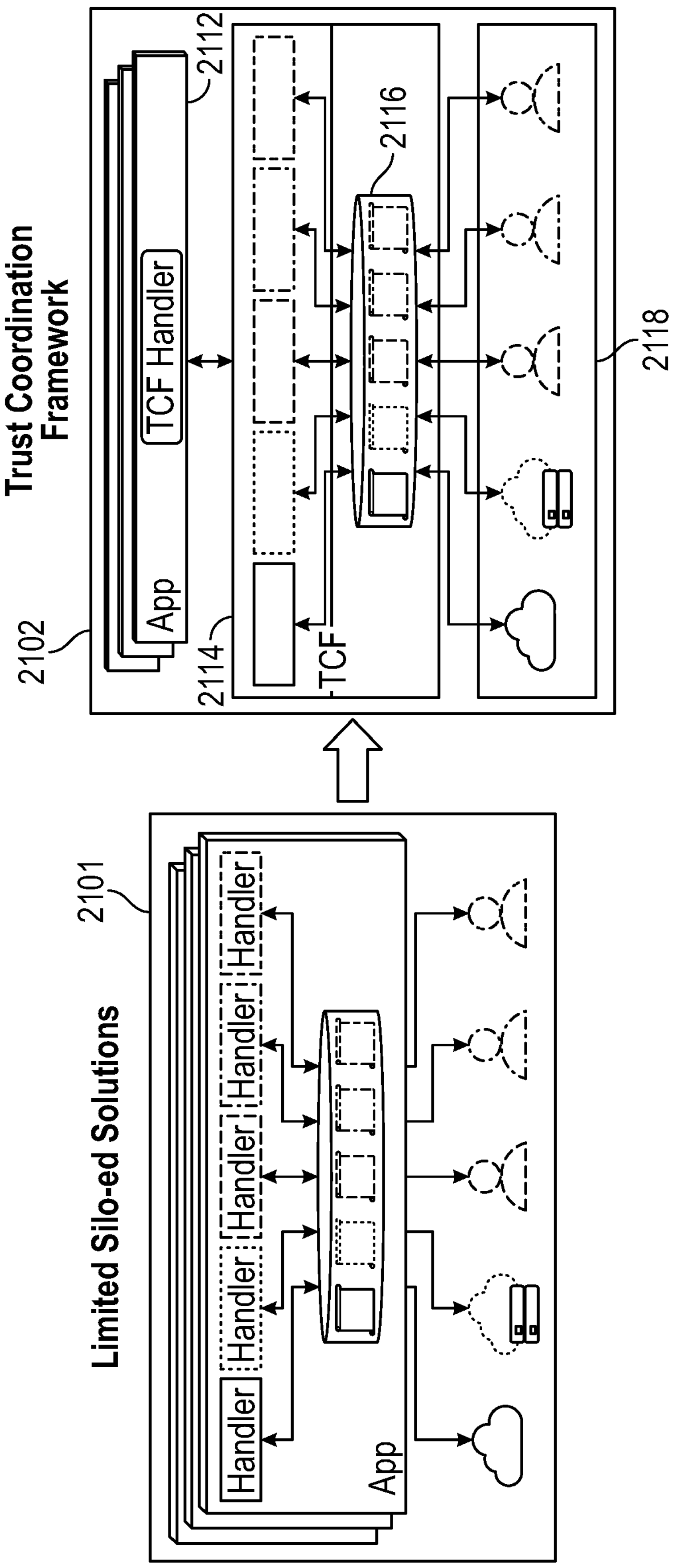
FIG. 21 illustrates existing approaches and the advancement to a trust coordination framework, according to an example.

FIG. 21 illustrates existing siloed approaches as contrasted with an advancement to a trust coordination framework (TCF), according to an example. Current deployments 2101 use metadata collection and analysis on a per-app (per-microservice) basis, and are typically not scalable while being difficult to build and maintain. In contrast, a TCF 2102 acts as an active intermediary to establish trustworthiness based on verifiable information across compute nodes, workloads, and data. The TCF 2102 separates metadata collection, handling, and policy management from apps/microservices 2112. The TCF 2102 provides a single framework for multiple deployment scenarios 21124. The TCF 2102 allows reuse of metadata, handlers, and policies 2116 and enables policy decisions over heterogeneous metadata/technologies and users 2118.

The TCF 2102 simplifies metadata and policy management by relieving "relying" services (e.g., dependent services) from the complexity of handling metadata and policies—in terms of quantity, size, and heterogeneity. For instance, the relying services may include Intel® SGX, Intel® TDX, DICE or TPM attestations (or attestations from a similar secure environment), software supply chain assertions, data provenance assertions, etc. Use of the TCF 2102 also consolidates metadata and policy handling in a single instance for multiple relying services and avoids code maintenance of relying services to update metadata formats and policies.

Figure 22:
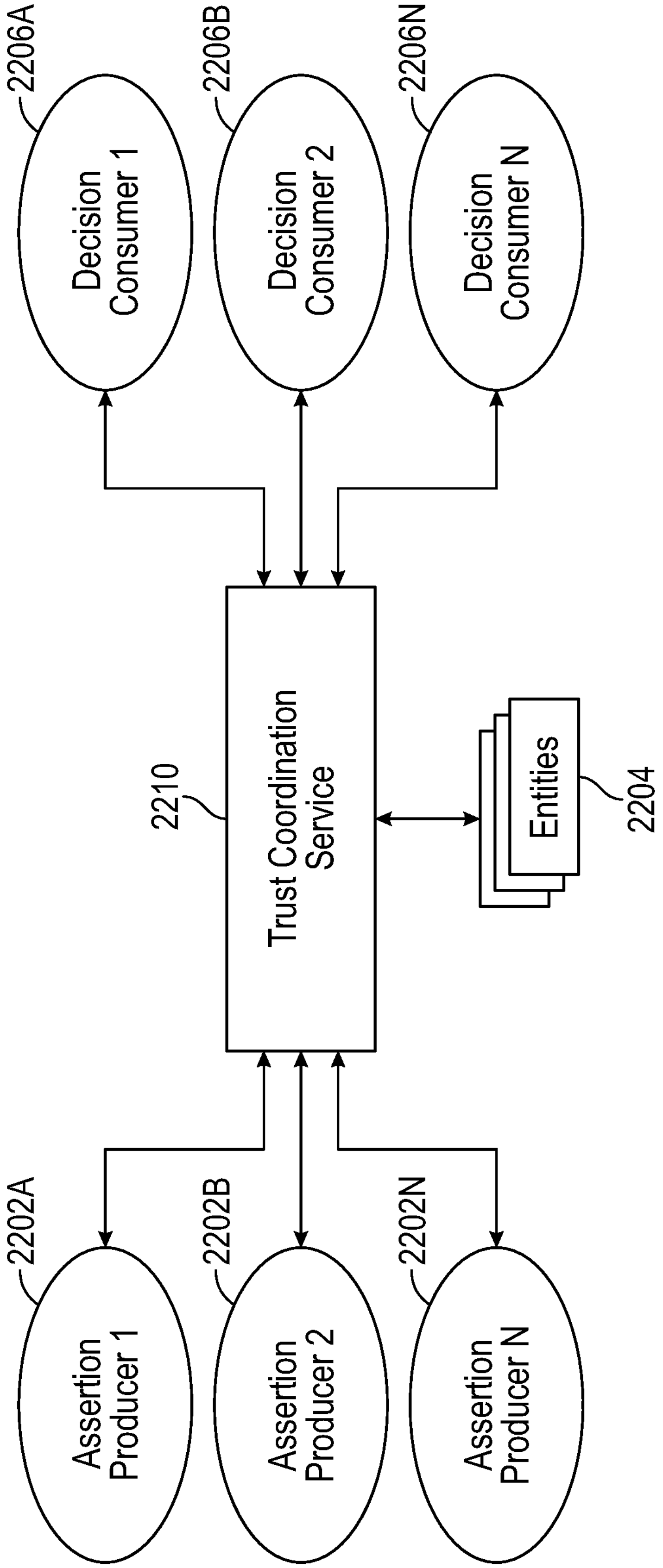
FIG. 22 is a diagram illustrating interoperability of the trust coordination service, according to an example.

FIG. 22 is a diagram illustrating interoperability of a trust coordination service, according to an example. Trust coordination in this scenario includes the following Actors: assertion producers 2202A, 2202B, . . . 2202N, which produces assertion related to the entity capabilities, platform properties, and/or verification results (e.g., related to hardware-based attestations, SW properties, etc.); decision consumers 2206A, 2206B, . . . 2206N, which consumes a policy trustworthiness decision per requested entity; Entities 2204, which are the subject for trustworthiness that present attributes of trustworthiness; and a trust coordination service 2210, which aggregates the metadata and makes decisions based on provided policies.

Figure 23:
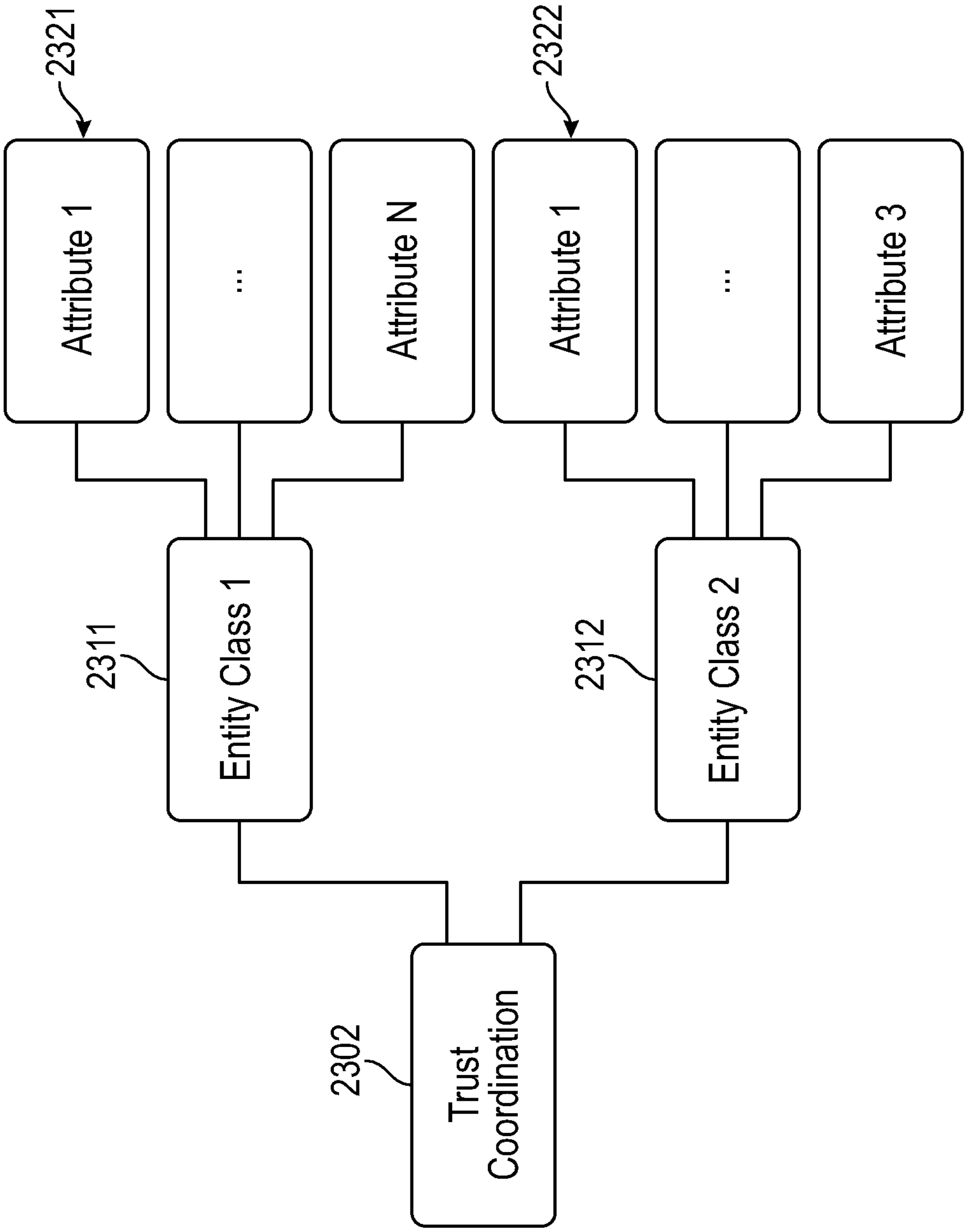
FIG. 23 is a block diagram illustrating a general hierarchy of classes and attributes, according to an example.

FIG. 23 is a block diagram illustrating a general hierarchy of classes and attributes, according to an example. A respective component of the compute continuum can associate trust coordination 2302 with several entity classes (e.g., 2311, 2312). A respective entity class may have associated trustworthiness attributes (e.g., 2321, 2322), such as attestation, provenance, a Software Bill of Material (SBOM) assertion, safety, resiliency, etc.

Figure 24:
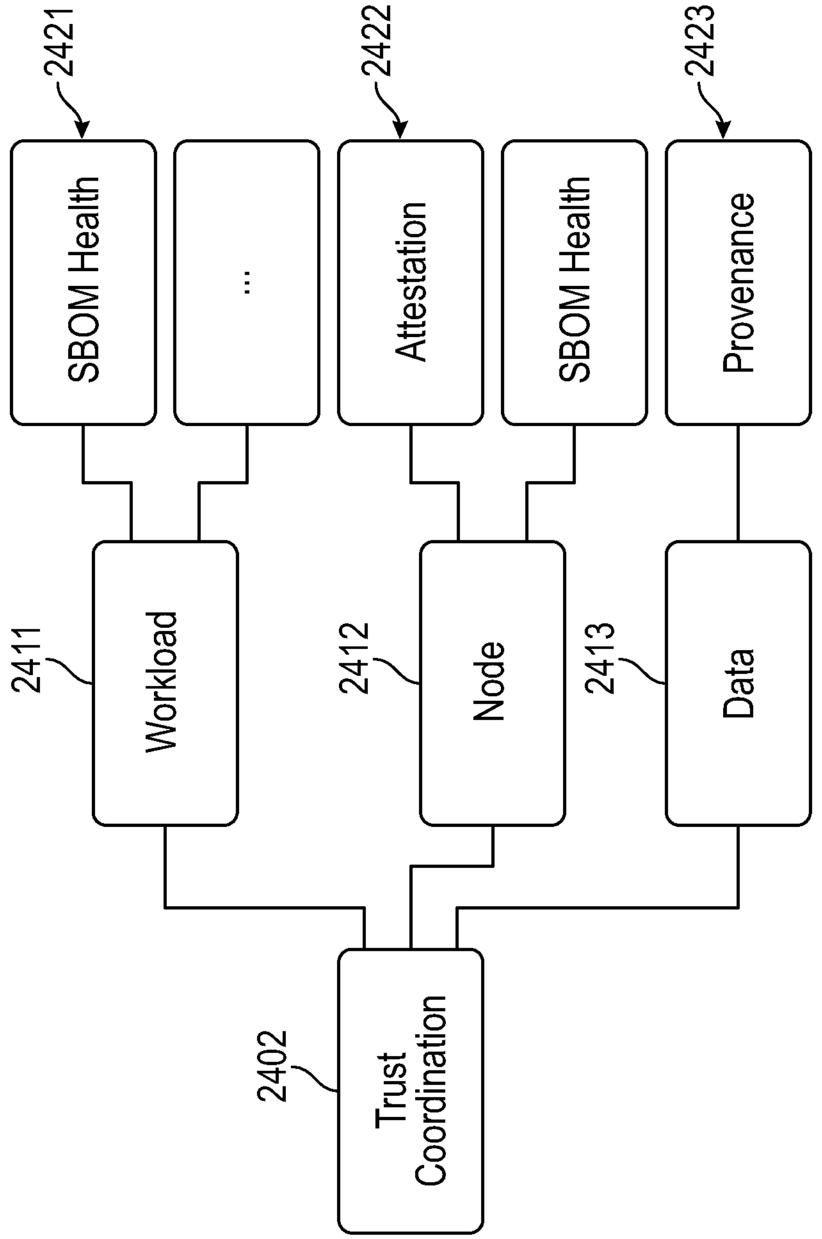
FIG. 24 is a block diagram illustrating a specific hierarchy of classes and attributes, according to an example.

FIG. 24 is a block diagram illustrating a specific hierarchy of classes and attributes, according to an example. Here, there are three classes that are illustrated for trust coordination 2402: workload 2411, associated with attributes 2421 for native workload or containers; node 2412, associated with attributes 2422 for compute resources; and data 2413, associated with attributes 2423 for structured or unstructured data that is generated or consumed.

Figure 25:
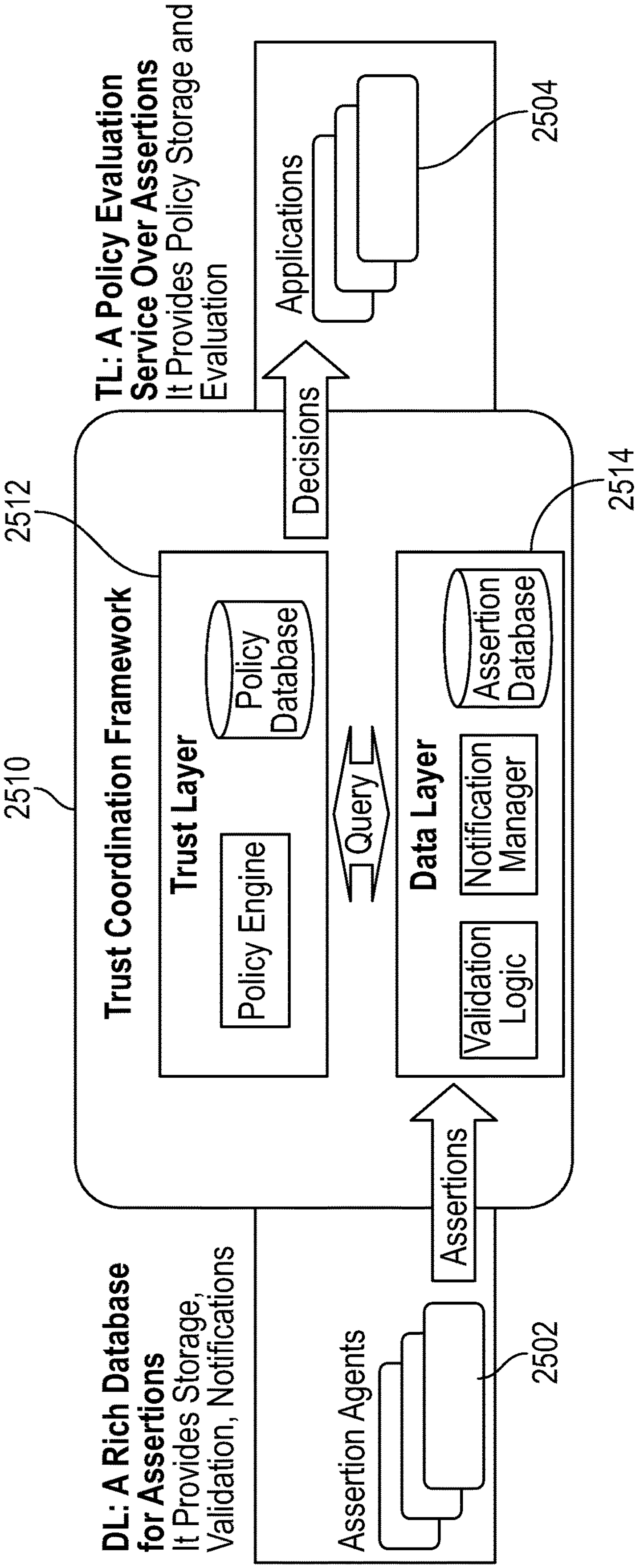
FIG. 25 is a block diagram illustrating a trust coordination framework architecture, according to an example.

FIG. 25 is a block diagram illustrating a trust coordination framework architecture, according to an example. An embodiment of a trust coordination framework 2510 illustrated in FIG. 25 includes two layers. A data layer 2512 is responsible for the assertion validation, collection, storage, and notification. A trust layer 2514 contains a policy engine and provides policy storage and evaluation services. Assertion agents 2502 feed assertions to the data layer. Such assertions are signed for accountability and integrity. The trust layer finally provides policy decisions (evaluated over the assertions in the data layer) to applications 2504 (or relying parties).

Figure 26:
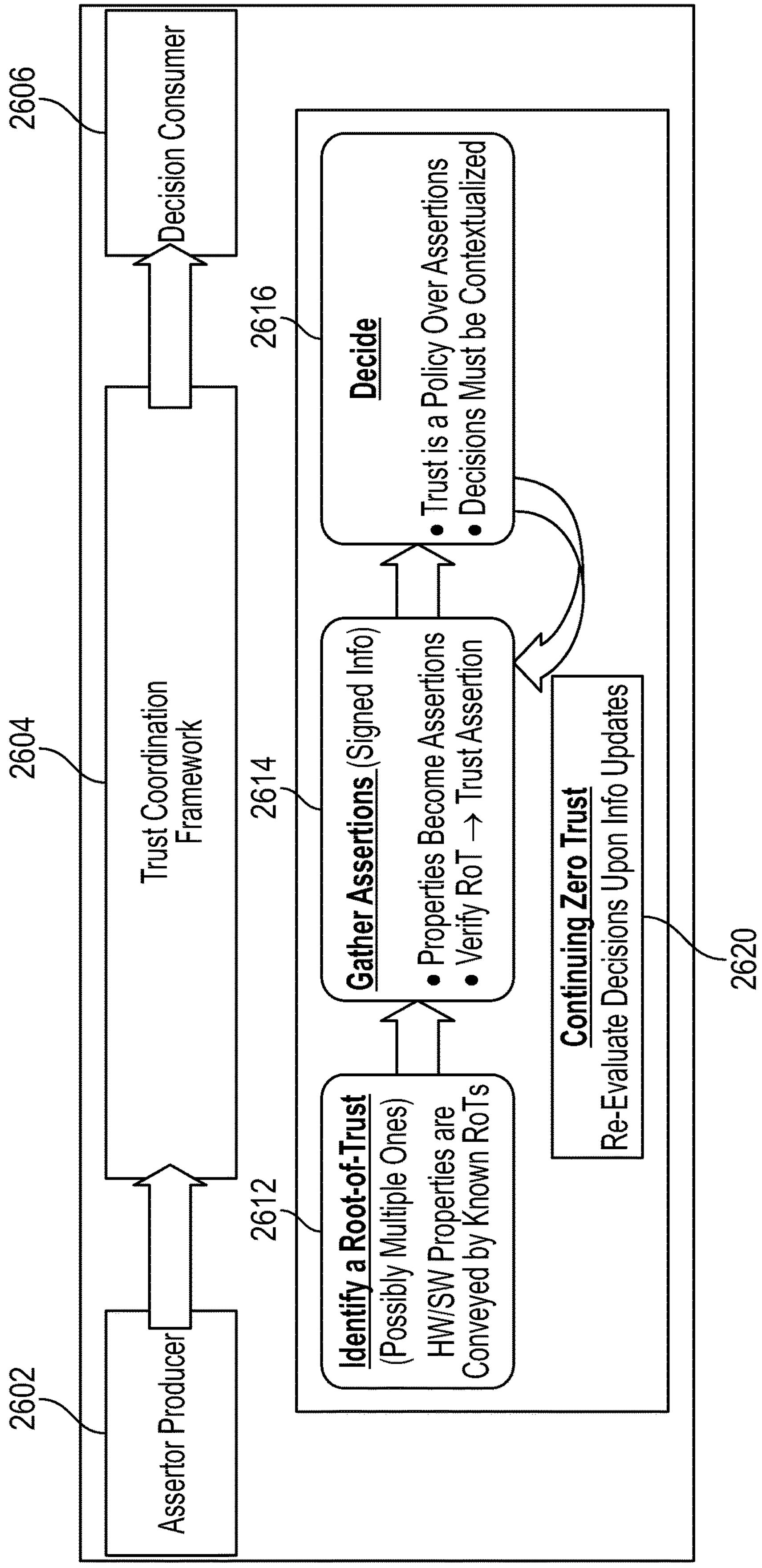
FIG. 26 is a block diagram illustrating high-level operations in a trust coordination framework architecture, according to an example.

FIG. 26 is a block diagram illustrating high-level operations in a trust coordination framework architecture, according to an example. These operations are coordinated among an assertor producer 2602, providing information to a trust coordination framework 2604 for evaluation, which then provides decision information to a decision consumer 2606.

The high-level operations are used to assess the trustworthiness of platforms, software, or workloads. First, the necessary Root-of-Trusts (RoTs) are defined at operation 2612. The RoTs will convey (or will certify other parties who will convey) software and/or hardware features and properties. Second, assertions are collected at operation 2614. Finally, a policy is evaluated at operation 2616 to determine a decision. As the context changes (e.g., new assertions are collected, or previous assertions are updated), policies are (or can be) re-evaluated at operation 2620 to confirm previous decisions, or to trigger contingency actions. In further examples, open-source solutions such as Open Policy Agent (OPA) or another policy engine can be used for policy specification and evaluation.

Figure 27:
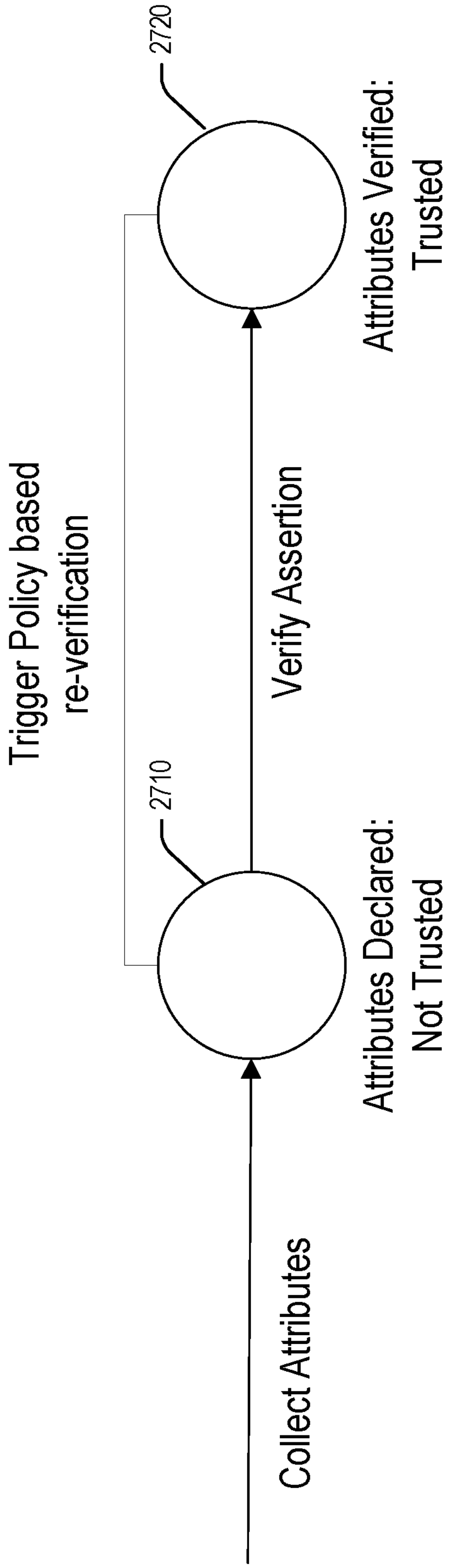
FIG. 27 is a block diagram illustrating state transitions of trustworthiness attributes, according to an example.

FIG. 27 is a block diagram illustrating state transitions of trustworthiness attributes, according to an example. Attributes transition from a non-trusted state 2710 to a trusted state 2720, based on verifying a declared attribute assertion. Subsequent re-verification may be used which triggers a policy. (In practice, the attributes may be continually in a trusted state, but the relying party that is modeling attribute trust may maintain a distinct or separate attribute state machine that models the attribute state transition as a way to achieve trust consistency over a distributed set of nodes).

Figure 28:
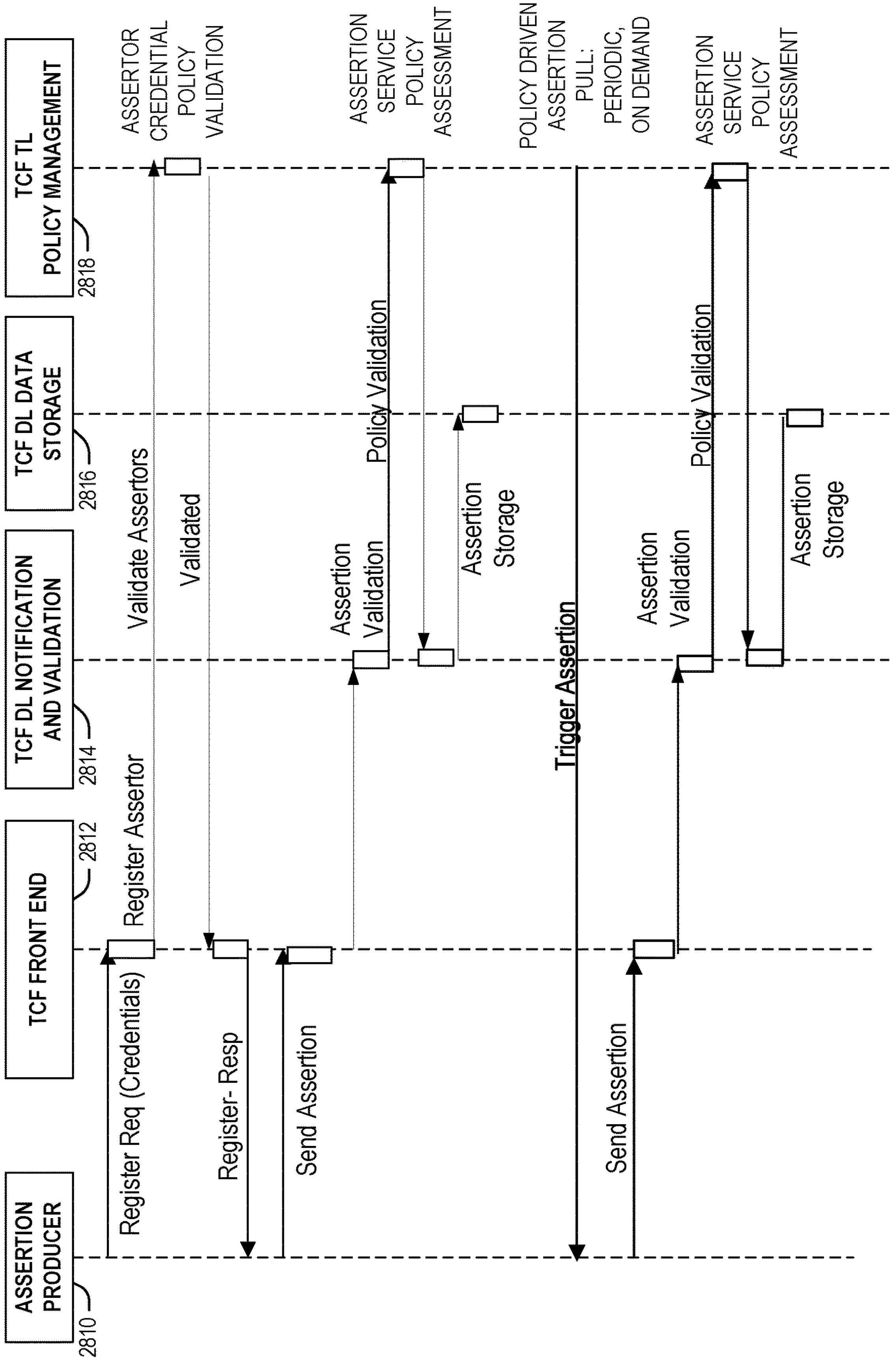
FIGS. 28-30 are swim lane diagrams illustrating interactions between components of a trust coordination framework architecture, according to various examples.
Figure 29:
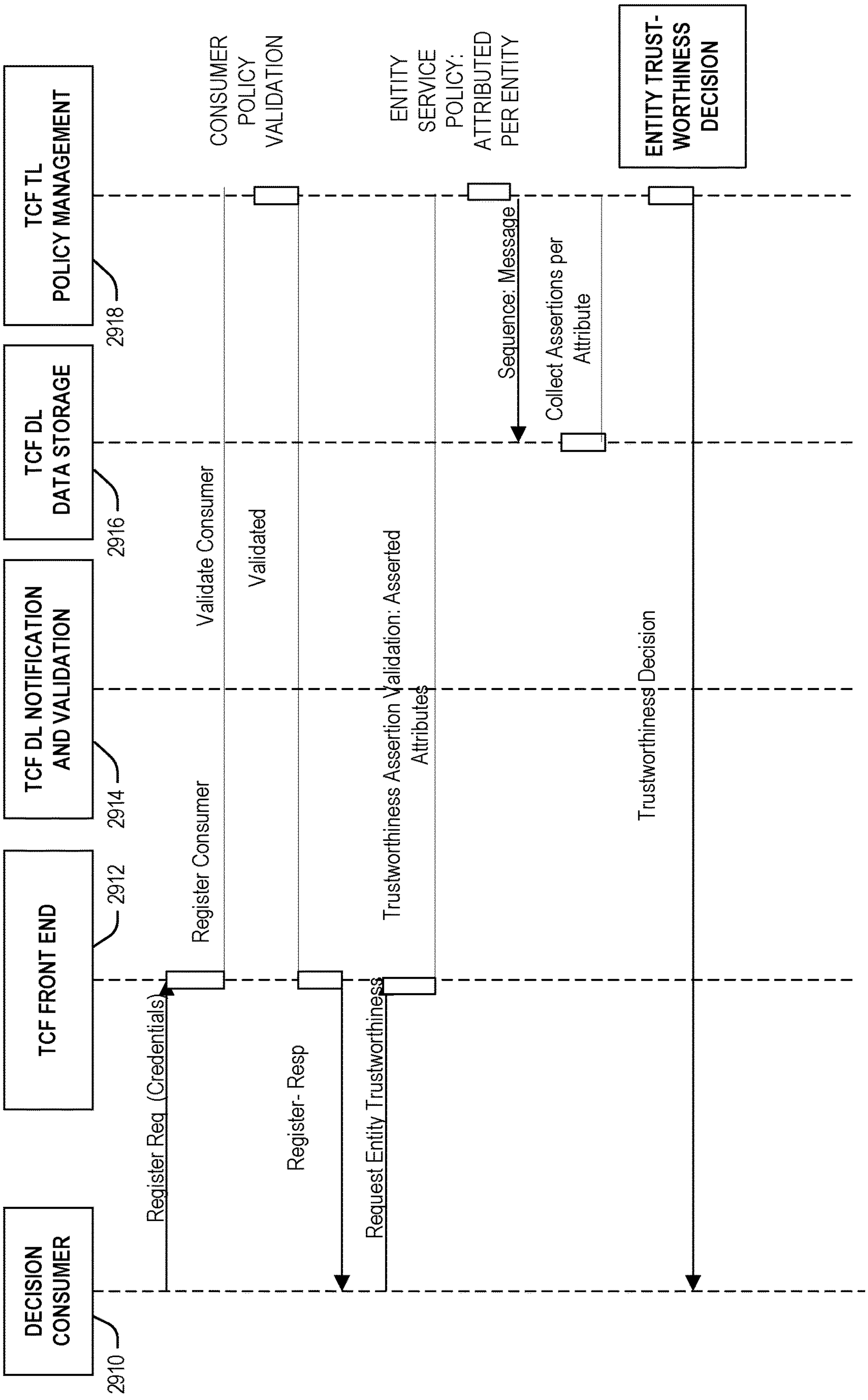
Figure 30:
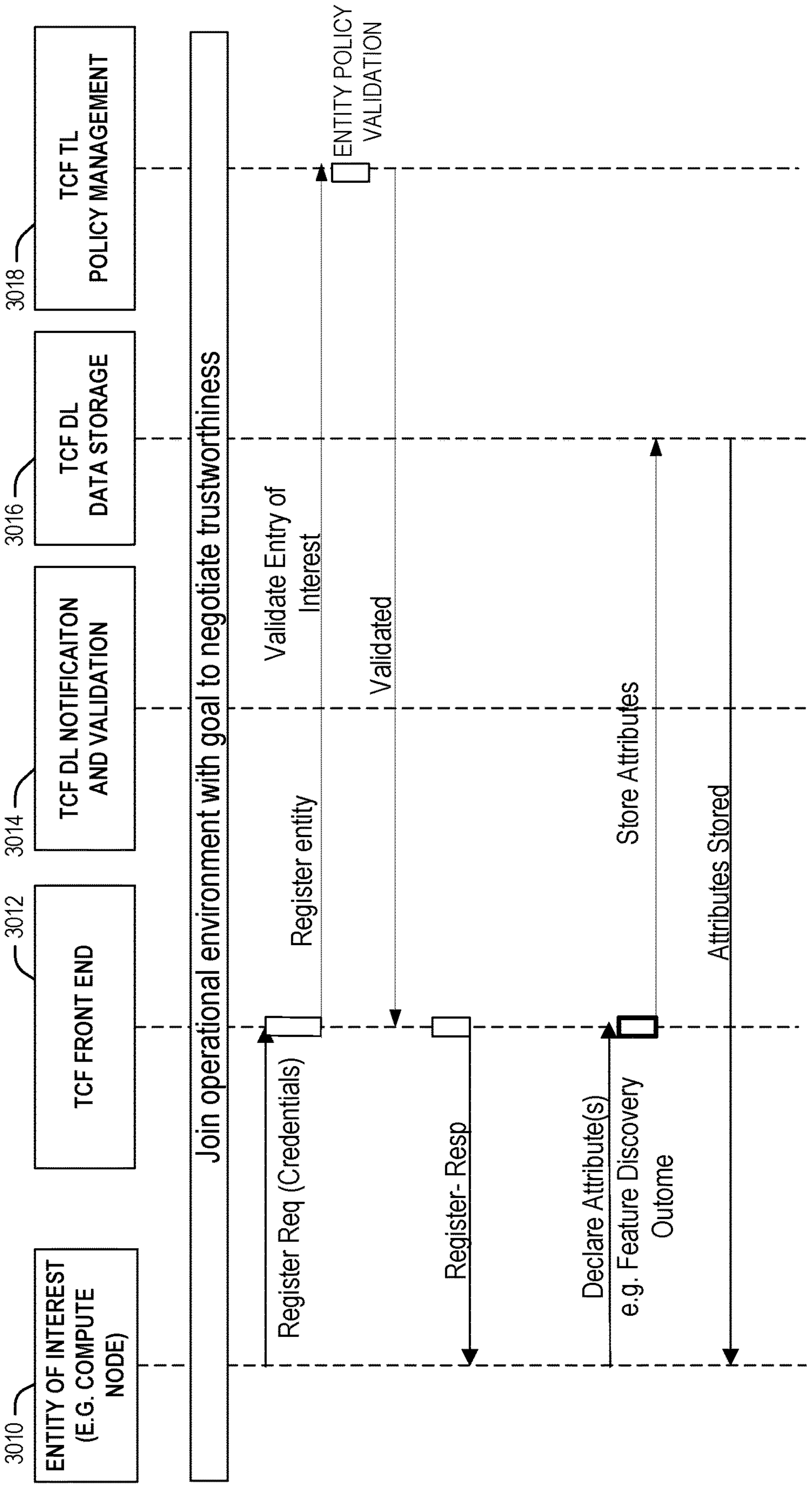

FIGS. 28-30 are swim lane diagrams illustrating interactions between respective components of a trust coordination framework architecture, according to various examples.

In FIG. 28, an assertion producer 2810 provides a request to a trust coordination framework front end 2812. The trust coordination framework data layer (DL) provides notification and validation functions 2814 and data storage functions 2816, whereas the trust coordination framework trust layer (TL) provides policy management functions 2818.

In FIG. 29, a decision consumer 2910 provides a request to a trust coordination framework front end 2912. The trust coordination framework data layer (DL) provides notification and validation functions 2914 and data storage functions 2916, whereas the trust coordination framework trust layer (TL) provides policy management functions 2918.

In FIG. 30, an entity of interest 3010 (such as a compute node) communicates with a trust coordination framework front end 3012 to join the operational environment. The trust coordination framework data layer (DL) provides notification and validation functions 3014 and data storage functions 3016, whereas the trust coordination framework trust layer (TL) provides policy management functions 3018.

Attestation Microservices and Service Mesh for Elastic Workloads

Many attestation services are based on a centralized deployment model where workload nodes request attestation following a passport model. The passport is presented to WL orchestrators who vet the node and schedule the WL as appropriate. In elastic compute scenarios, however, WL nodes are not static. Portions of a WL may be dynamically partitioned where WL partitions are also dynamically provisioned to a microservices hosting node. For instance, consider a scenario where a respective microservice (also referred to as a "μService") obtains a passport (token) from an attestation verification service, which results in O(n log n) to O(n^2) latency overhead; here, n is the number of microservice partitions as a microservice cross-checks the other n microservices. This does not scale well for C2E infrastructures.

Other approaches rely on a cloud service abstraction that centralizes attestation processing as a service abstraction. The cloud services provider may scale the service by adding resources to the server backplane. This approach does not address edge network environments that typically have compute dispersed at different locations with differing compute, connectivity, resource, and latency properties. As noted above, centralized attestation services, e.g., hosted in a cloud, also introduce latency in an edge network.

The following system and methods integrate an attestation mesh into an edge mesh that optimizes edge WLs. In an example, this optimization is provided by co-locating FaaS functions on hardware such as IPUs that are also hosting a distributed WL. The attestation WL is then decomposed into FaaS functions for easy co-location with the other WL/FaaS mesh execution locations. The various stages of attestation processing may rely on attestation inputs, e.g., evidence, reference values, endorsed values, policies, which are supplied by support services but may be cached locally by the hardware (e.g., IPUs) of a mesh node.

This approach allows attestation appraisals to occur within the latency envelope that is appropriate for the edge workload node. More frequent or timely attestation appraisals can be performed because the mesh node with attestation support can cache the various appraisal inputs and manage the cache along with the other mesh-aware WL caching policy.

Figure 31:
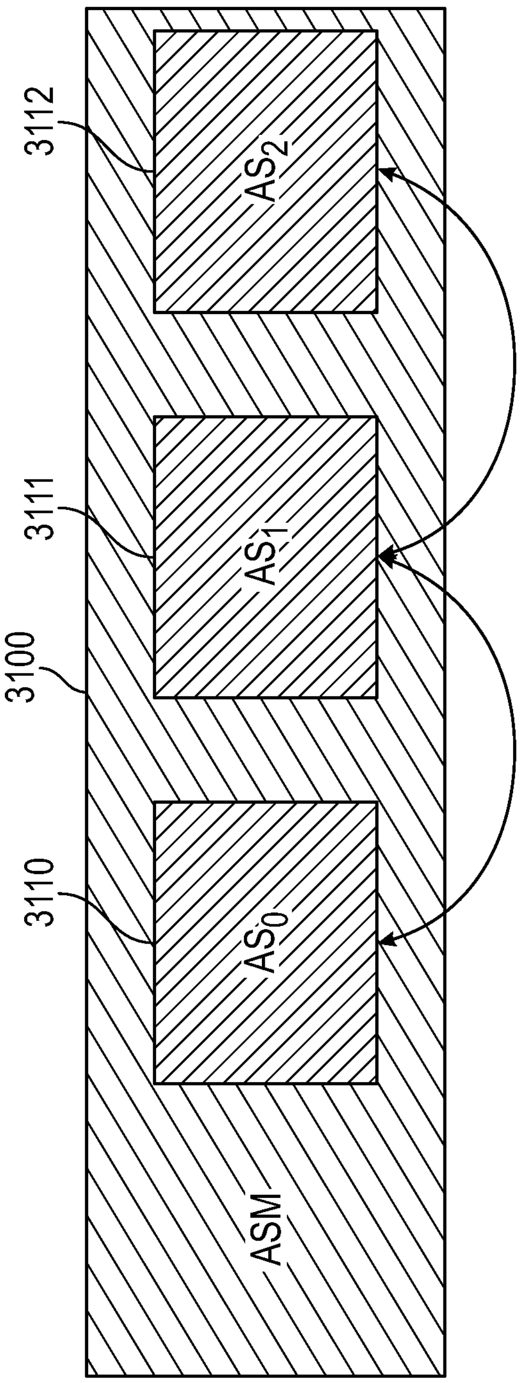
FIG. 31 is a block diagram illustrating attestation load distribution, according to an example.

FIG. 31 is a block diagram illustrating attestation load distribution, according to an example. An attestation service mesh (ASM) 3100 is a cluster of attestation service nodes that cooperate to distribute attestation workloads in a distributed or decentralized elastic WL. A respective Attestation Service (AS) (shown with AS instances 3110, 3111, 3112) may be provided by a microservice that specializes in attestation verification processing. A respective AS may be further divided into FaaS functions that specialize in implementation of an aspect of attestation verification processing (e.g., certificate path construction, RIM location/collection, document signature verification, trust anchor repository access (per tenant), document format decoding, evidence collection, evidence integrity verification, evidence format decoding, tag lifecycle management, appraisal, attestation results creation, attestation results integrity protection, or attestation results creation/passport/token issuance and delivery). As an attestation microservice, these functions can be elastically hosted on/near elastic WL nodes.

The ASM 3100 may be hosted on the same infrastructure nodes used to host (e.g., execute) decentralized elastic WLs. The elastic and ASM WLs are treated as different tenants utilizing hardware and software isolation techniques including OS process isolation, containers, micro-kernels, virtual memory, processor operational modes, virtualization, or physical and virtual segmentation, such as with use of technologies such as Intel® SGX, Intel® TDX, AMD® Secure Encrypted Virtualization (SEV), ARM® TrustZone and so forth. The ASM microservices (AS0, AS1, . . . , ASn, shown with instances 3110, 3111, 3112) are provisioned with cryptographic identities, credentials, and policies that establish them as a trusted group within the ASM 3100. The microservices maintain cross-connections that may be utilized to quickly offload attestation processing functions and to share (cache) various attestation related data including endorsement manifests, reference value manifests, device certificates, device sessions (e.g., SPDM, RA-TLS, Attested TLS, or HTTP-Attest), device decentralized identifiers (DID), tokens (e.g., OAuth2, OpenID-Connect, IETF EAT, IETF JWT, or IETF CWT), D-WL policies such as SLAs, SLOs, trust anchors, security policy, security settings, intermediate attestation results, final attestation results (AR), audit information, telemetry information and any other data that may be generated as a result of operating a robust ASM.

Figure 32:
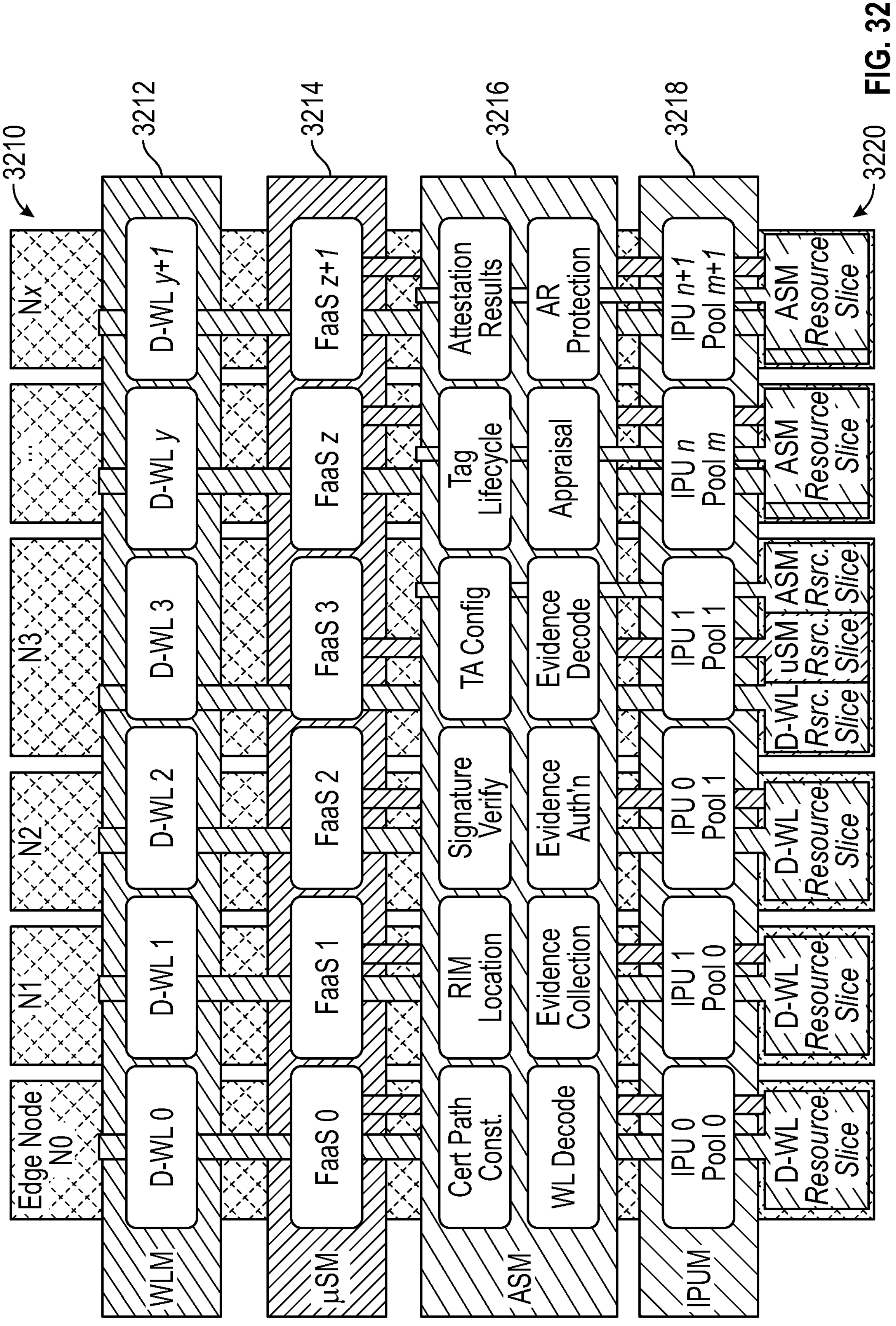
FIG. 32 is a block diagram illustrating an elastic workload mesh architecture, according to an example.

FIG. 32 is a block diagram illustrating an elastic workload mesh architecture, according to an example. The elastic workload may be distributed across multiple nodes 3210 forming a workload mesh 3212 (WLM) that functions as a cohesive WL but is distributed or decentralized in terms of the logical, virtual, or physical processing nodes. The WLM may rely on a set of WL metadata that describes the WL functions, data, partitioning semantics and may have specified quality, performance, trust, security, resiliency, privacy, and availability requirements. The WLM may support multiple WL per infrastructure node using tenant isolation techniques as described herein.

The WLM may interface with a microservice mesh 3214 (uSM) that implements and deploys popular FaaS functions commonly used across multiple WLs. The SM may be implemented on the same infrastructure nodes as other mesh capabilities including WLM, ASM, and so forth. The uSM FaaS functions are isolated using tenant isolation technology as described elsewhere in this document.

The uSM may interface with an attestation service mesh 3216, which may perform a variety of functions for attestation services, as discussed above.

Infrastructure nodes may be hosted by an infrastructure processor mesh 3218 (IPUM) that maintains pools for compute resources configured to host mesh-based workloads (as described above) that are optimized for efficient edge operation. For example, a pool of IPUs may be integrated on a common backplane, rack, cluster, geo-location network, etc., having memory, storage, acceleration, and network connectivity resources readily available for pool IPU consumption. IPU pools may be connected for efficient resource sharing, load balancing, and resiliency, including for respective resource slices 3220.

Figure 33:
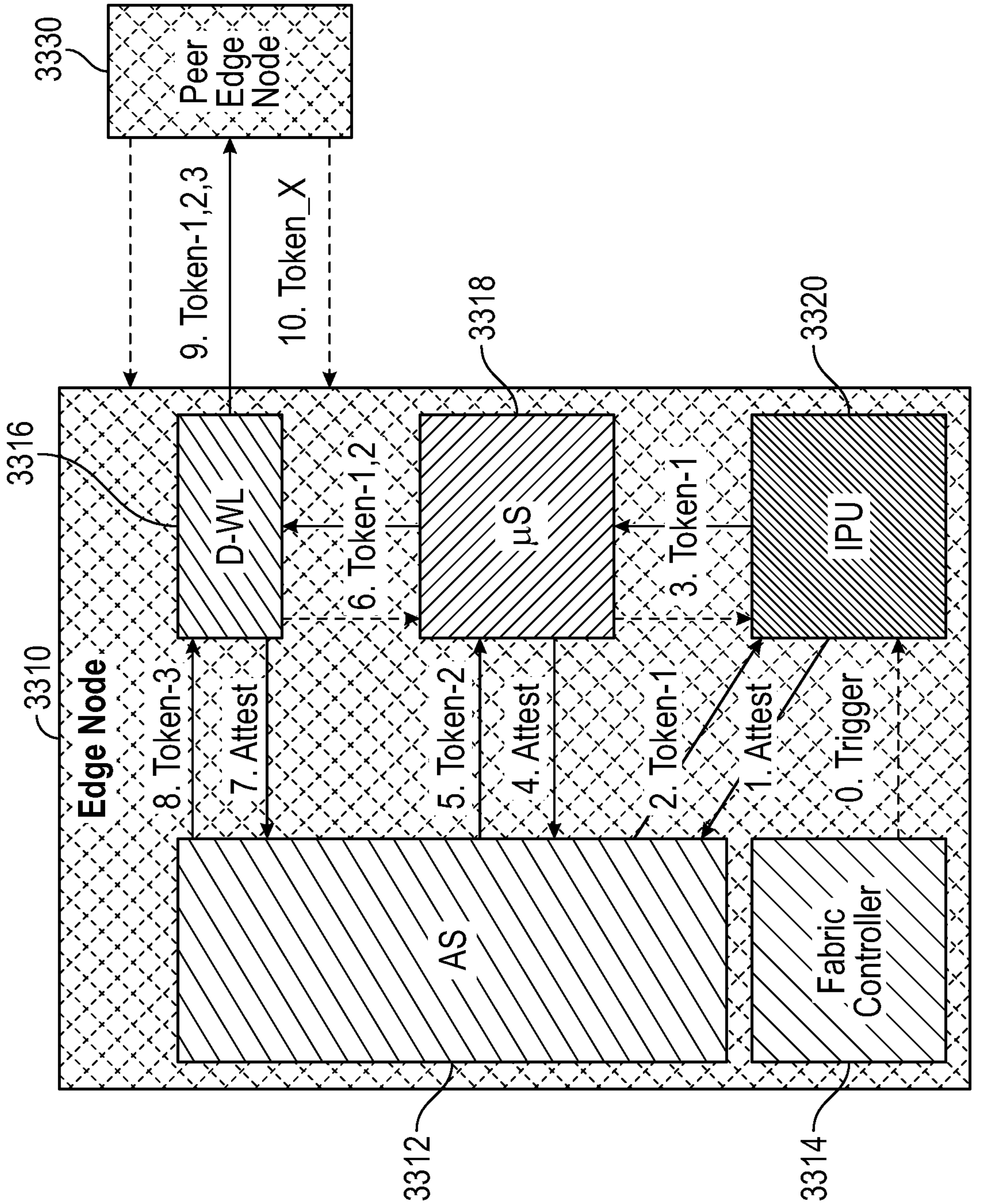
FIG. 33 is a block diagram illustrating attestation of a distributed workload using an attestation mesh, according to an example.

FIG. 33 is a block diagram illustrating attestation of a distributed workload using an attestation mesh, according to an example. A respective cross-section of an edge node 3310 and mesh layer (as illustrated in FIG. 32) may be required to attest the resource to an AS microservice 3312 in the ASM as a condition of participation in the mesh and as a condition of participation in a D-WL vertical stack (as illustrated in FIG. 33). An IPU 3320 (or similar edge processing unit) may utilize a Fabric Controller 3314 (FC) that is responsible for triggering attestation of an IPU resource upon appropriate events such as power reset, system reset, fault or interrupt handling, microcode update, firmware update, failure event, and so forth. The FC trigger results in at least the IPU 3320 requesting attestation by an Attestation Service (AS) (shown in operation 1), such as an AS microservice 3312 that is assigned to the IPU 3320, that results in a verification on the IPU 3320.

An attestation result in the form of an attestation token (shown in operation 2) may utilize industry standard token structures such as CBOR Web Token, JSON Web Token, Concise Evidence, W3C DID/VC, X.509 certificates, Trusted Platform Module etc. or proprietary formats such as Intel® SGX attestation block, etc. The attestation token may be returned to the IPU 3320 upon successful verification and appraisal (e.g., as outlined in an IETF RATS Architecture (RFC9334), which provides an example approach of attestation appraisal). The token may be presented to another mesh layer node such as a WL FaaS µService 3318 in response to a request to obtain IPU resources or in response to other events that bind WL hosting resources. The token (e.g., token-1, shown in operation 3) may contain the AS issue attestation result, a token validity period, policies for proper use, and additional security related attributes including authentication credentials, authorization policies, an audit policy, access control rules and so forth. The token may be evaluated by the µService 3318 to facilitate binding the µService layer resources to the IPU layer resources. It may also be supplied with an attestation payload to an AS microservice 3312 (FIG. 33, operation 4) to request an attestation token describing the µService node. The token-2 (FIG. 33, operation 5) may contain token-1 to form a composite token, Token-1,2 (FIG. 33, operation 6). The composite token may be issued by an AS microservice 3312 by verifying attestation evidence supplied by the µService 3318 and may include evaluation of the lower layer token (e.g., token-1). Verification of token-1 may suffice for establishing attestation properties as a performance optimization that avoids unnecessarily re-attesting the IPU resource. The D-WL 3316 may trigger a FaaS µService attestation as part of a request to perform the u Function. The µService 3318 may return an attestation token (FIG. 33, operation 6) that contains attestation results for the Service 3318 and IPU layered resources to the D-WL 3316 (FIG. 33, operation 7). The D-WL 3316 may be expected to coordinate with a peer D-WL node and where coordination/interaction is contingent on obtaining an attestation token. The D-WL 3316 may obtain an attestation token-3 (FIG. 33, operation 8). The attestation request may include lower layer attestation tokens (token-1,2) in addition to D-WL collected evidence. The AS microservice 3312 may evaluate D-WL evidence and verify the lower layer tokens' attestation results rather than re-attesting lower layers. Although, such re-attestation may be performed if there is reason to questing the validity of the token such as if the token expiration has been exceeded. The D-WL 3316 may receive a token-1,2,3 (FIG. 33, operation 9) that is supplied to a peer Edge node 3330 in response to a request to receive such token or as a parameter to an edge API (such as a RESTful web interface) as a condition of interaction with the peer node. The peer node may be required by the D-WL 3316 (or indirectly by the AS microservice 3312 supporting the D-WL 3316) to attest the peer node (FIG. 32, operation 10). In this manner, bilateral attestation may be accomplished by D-WL nodes.

A WLM may elastically increase/decrease the number of nodes in the distributed workload resulting in inaccurate attestation tokens. However, fully (exhaustively) re-attesting every D-WL and all the layers to the IPU/root-of-trust may not be required. Only the configurations affected by D-WL manipulation need to be re-issued.

Figure 34:
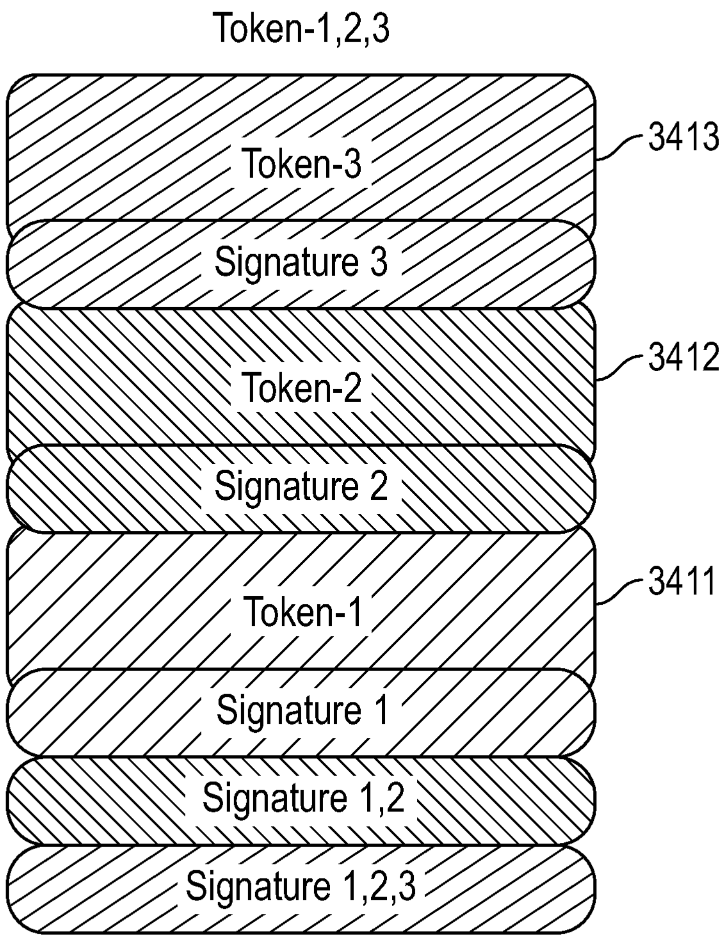
FIG. 34 is a block diagram illustrating an attestation mesh token structure, according to an example.

FIG. 34 is a block diagram illustrating an attestation mesh token structure, according to an example. The token structure contains separate sections 3411, 3412, 3413 for attestation results relating to disparate attestation verification requests where a respective verification is recorded and digitally signed separately. Hence, these results can be dismantled and reconstructed accordingly to represent the current composition (or re-composition) of the WL/D-WL.

For instance, in FIG. 34, first IPU resource attestation results are shown as token-1 3411 with an associated token signature, Signature 1. A second attestation token is shown as token-2 3412 with attestation results for a µService module, and an associated signature, Signature 2. Additionally, a Signature 1,2 is added that establishes the binding between µService and IPU layers. Similarly, for the D-WL layer a token-1,2,3 is represented showing a third layer token as token-3 3413, having a Signature 3, plus a Signature 1,2,3 indicating the binding across the three layers. Signature 1,2 and Signature 1,2,3 may counter-sign signatures 1, 2, or 3 respectively as a way to assert the discrete tokens were verified and processed according to a workflow such as is described by FIG. 33.

Figure 35:
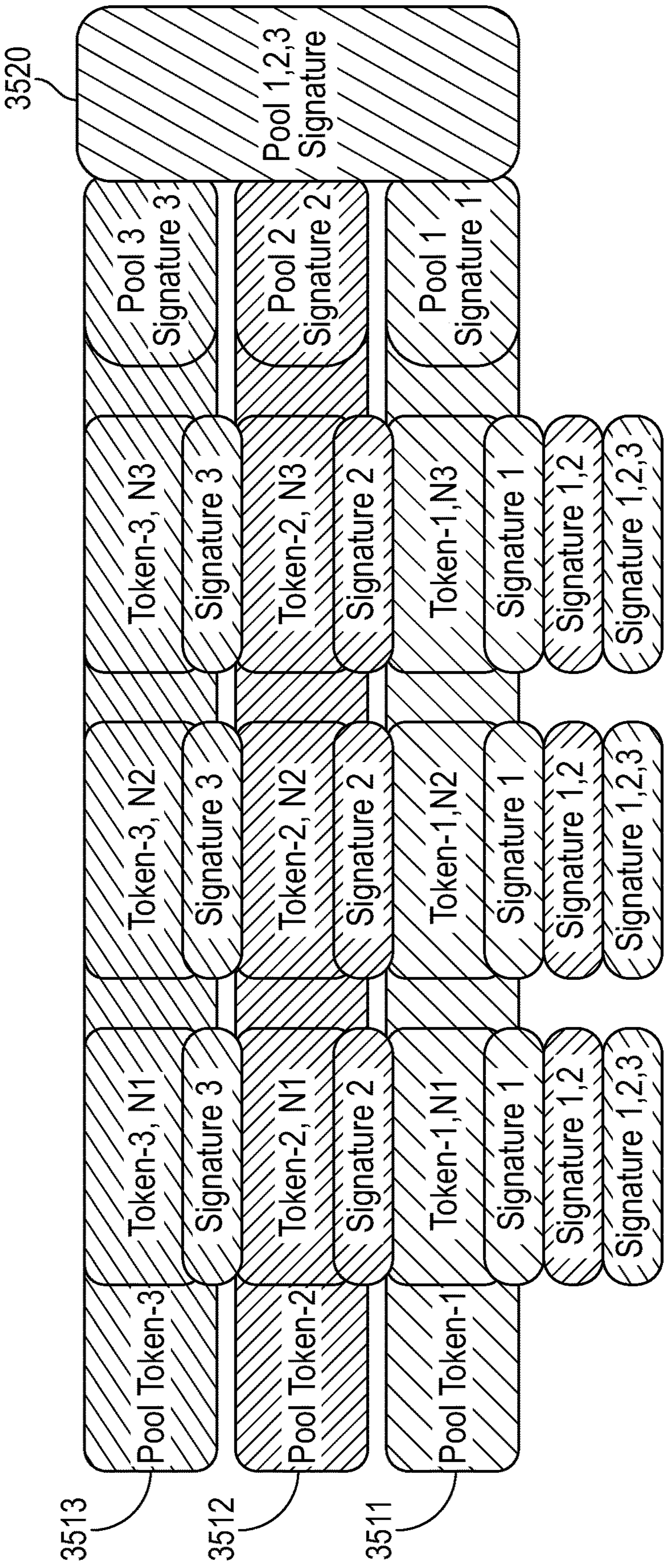
FIG. 35 is a block diagram illustrating a fully articulate attestation mesh token, according to an example.

FIG. 35 is a block diagram illustrating a fully articulate attestation mesh token, according to an example. The WLM, USM, and IPUM mesh layers can function as a pool of resources that may be used in various ways to achieve greater operational efficiency, availability, and resiliency. The attestation token structure supports such scenarios by grouping pools of mesh layer resources having pre-computed attestation results for a respective pool member. For example, an IPU mesh consisting of a first IPU node may have attestation results represented by (token-1,N1). A second IPU node may have attestation results represented by (token-1,N2) and so forth. The pool of attestation results may be authenticated by a pool signature, Pool 1, Signature 1. Similarly, other mesh pools may have pooled tokens following a similar convention. A token may represent fully an attested mesh of a deployed workload as depicted by a token consisting of a Pool 1,2,3 token signed by a signature across the pools 3511, 3512, 3513 (horizontally) and across the layers (vertically) that may be used to efficiently verify a single token signature 3520.

If the mesh deployments are static (do not contain changes that trigger reissuance of any sub-token) then the 'Pool Token 1,2,3' may be reused by any node in the pool/mesh to satisfy attestation checking requirements by checking a single signature and singleton token properties.

The pool-token for attestation (and other token forms) described herein may contain additional attributes for Authentication, Authorization, Audit, or Access control (in addition to Attestation). The token may be referred as an AAAA or "A4" token or "A5" token respectively. As such, the A4/A5 token may be supplied with a variety of network interfaces in Edge, Cloud, DApp deployments having minimal impact to API/interface design. The token may be passed directly over the interface or a reference to the token given where the receiver may obtain the token out-of-band. The token may be realized using existing standard token structures including W3C DID, CWT, JWT, XML-DSIG, CMS, and others.

Inter-Party Master Data Management Service for Elastic Workloads

The term "Master Data" refers to a gold standard, foundational data source of base data. This type of data may be referred to as a "fact" in that it is (relatively) immutable and is known good data. As businesses scale and grow, the number of applications and systems used also grow. Additional databases may sprout up as local repositories of master data. These additional databases cause a fracture in information as they create multiple versions of the same data, and there is no way of pinpointing which version is outdated, incorrect, or incomplete. To resolve this problem, Master Data Management (MDM) ensures the uniformity, accuracy, stewardship, semantic consistency, and accountability of shared master data assets. In short, MDM enables all the employees in a business to stay aligned. Getting a solid MDM implementation requires a strategic mix of data architecture, business process, and data governance.

Master data that is used by multiple parties is fundamentally under the ownership of a single party for each type of master data. For example, cell phone numbers as master data elements are under the ownership of Telco service providers or authorities to whom a Telco service provider assigns a bank of numbers to be managed by the assignees. Similarly master data identifying smart electricity meters or water meters are owned by utility services providers, and master data identifying vehicles (and their license plate information) are owned by departments of motor vehicles.

Although it is conceivable that a person updates their residence and simultaneously changes their Telco provider and simultaneously changes their vehicle registration, this is both a very low likelihood event and one where, should it happen, the records may get updated in three separate update sequences without any impact on the use of master data by an application in a smart city usage scenario. Therefore, we assume that update of a master data record comprises an update of a portion of the record that is owned by one controlling authority; and that if an update spans multiple portions that are owned by separate controlling authority, it is acceptable to treat them as a sequence of separate updates that are performed in an order that is determined ahead of time by agreement among the owning parties.

It is greatly advantageous for master data updates to be logically centralized so that they can be stabilized across the edge infrastructures. By decoupling the controlling authority for each individual update from the controlling authorities for other individual updates, the systems and methods provided here sidestep the all-or-none requirement in which multiple data records must be updated in unison.

MDM systems use strict Master Data Change Management Policies to ensure proper data governance and verification of any data changes. Unlike traditional databases, changes may need to be verified across multiple different referring databases, and this kind of verification generally requires fuzzy matching. This kind of fuzzy matching and decision taking can take considerable time. In the case of edge based, multi-party master data, these change management policies need to be accommodated without substantially delaying the time to committing an update.

Unlike single-party master data, when maintaining compound master data of several owners, it is necessary to be able to maintain continuous trust on part of applications, over master data that is owned by and updated by multiple parties. For this it is essential that lineage metadata (e.g., provenance) be associated, maintained, and readily accessible and available over the original and subsequently augmented and updated master data.

Various MDM principles may be applied to continuous integration and continuous deployment (CI/CD) software management to ensure the integrity of software update images. Using MDM principles, CI/CD is tightly coupled with a transactional update sequence such that all downstream devices and entities move in a lockstep when implementing the update processes, governance, and verification. A time element may be used to enforce timely CI/CD integration. For instance, an application of a software update may be required to be performed within an expect time window or the system will fall back to a known good state. CI/CD also has a provenance element where update images and related CI/CD contexts should be able to prove to other CI/CD components that its origin and integrity are known and in compliance way a provenance policy.

In the context of elastic workload orchestration, distributed elastic workloads may require software updates during deployment. Coalescing a distributed workload to apply a software update undermines a resource-optimized deployment and creates a significant latency and interruption to the progress of the workload.

The present systems and methods implement a master data registration service (MDRS) to be used with elastic workload deployment frameworks. An elastic workload may be partitioned based on workload metadata into fragments. The fragments are bound to resources and deployed. Workloads that use master data may register with the MDRS to get notification of when master data is changed and obtain fresh master data when applicable. Other details are described below.

A distributed elastic workload (WL) is a decomposition of a monolithic workload (WL) that is distributed across multiple hosting nodes of an Edge network. A distributed WL may require support from an MDM system to manage the WL after its data and WL partitioning, distribution, and resource optimization phases.

Elastic WL nodes can be thought of like the UNIX 'initd' process that spawns subprocesses. Based on a WL partitioning scheme, a monolithic workload is decomposed into WL fragments that collectively perform the task of the monolithic WL. Each sub-WL may operate on a different peer node and in its own container environment. When a distributed workload orchestration system performs a lifecycle maintenance operation, such as a software update to a workload, the update image targeting the monolithic WL image must be partitioned according to the elastic WL partitioning schema and distributed such that the fragment of the update corresponds to the fragment of the distributed WL. This implies the update needs to rely on WL metadata that specifies how to partition the update to match the partitioning of the elastic WL. As a result, each respective software update image can be applied to the specific distributed WL component (during execution) so that the software update can be applied seamlessly to an already deployed workload. MDM functions other than software updates may use similar partitioning that apply to the respective MDM operation to the appropriate WL fragments. In this manner, master data repositories may be held in a distributed service-based storage solution.

Figure 36:
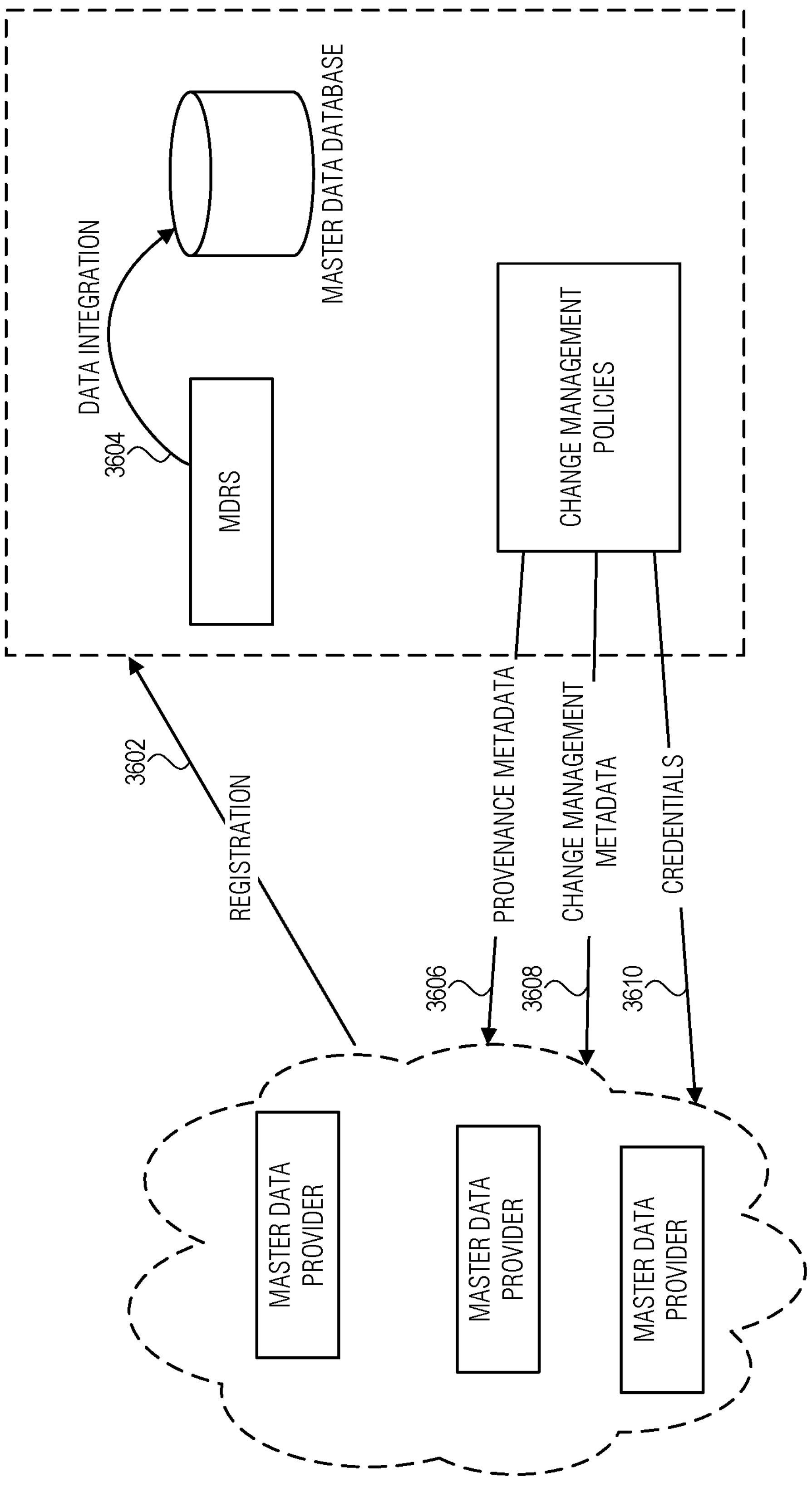
FIG. 36 is a diagram illustrating an onboarding process, according to an embodiment.

FIG. 36 is a diagram illustrating an onboarding process, according to an embodiment. The on-boarding of a new master data provider proceeds through operations shown in FIG. 36. In operation 3602 a master data provider (client) provides information to an inter-party master data registration service (MDRS) that handles master data registration and master data ingestion. A master data provider is one that will serve master data to end users, edge clients, or other master data providers that act as consumers of master data. The master data provider may be the owner of the master data. Alternatively, the master data provider may be a host or administrator of master data but not the owner of the master data itself.

In operation 3604, the MDRS performs a data integration process (e.g., an extract-transform-load (ETL) or extract-load-transform (ELT) process, depending on the implementation of its data integration pipeline), and updates or creates a master data database (MDDB). The MDDB may be stored and cached in a distributed manner by using any applicable distributed data storage technology, e.g., MemcacheDB, Redis-cluster, mongoDB, etc.

In operation 3606, the registration operations create provenance metadata. Provenance metadata may include by reference or by copy, any lineage information that is provided by the master data provider. If the master data provider does not provide any lineage information, then the lineage information starts with the master data as ingested in operations 3602 and 3604. In either case, the lineage information is integrity protected and authenticated by one or more signatures from the MDRS and its ingestion service. Operation 3606 may run in parallel with operation 3602.

The MDRS includes within itself a change management service (CMS) for master data. In general, the CMS may implement multiple change management actions each tailored for different requirements. For example, some types of master data (e.g., non-confidential and easily corroborated data, like addresses and telephone numbers of businesses) may be described by a master data provider as requiring basic integrity checks during a change process flow. Other types of master data may require stringent protections against spoofing and therefore may require proofs, certificates, etc. (e.g., changing a person's recorded birth date used in identity documents). For each change management action, in operation 3608, the metadata describing the change management policies is supplied to all master data providers that are served by the MDRS.

In operation 3610, which may be performed in parallel with operations 3606 or 3608, credentials for use during updates of master data are established between the master data providers and the CMS. The credentials are established upfront at onboarding time so that participating applications can be given the means of verifying the credentials any time during the master data change flow.

Figure 37:
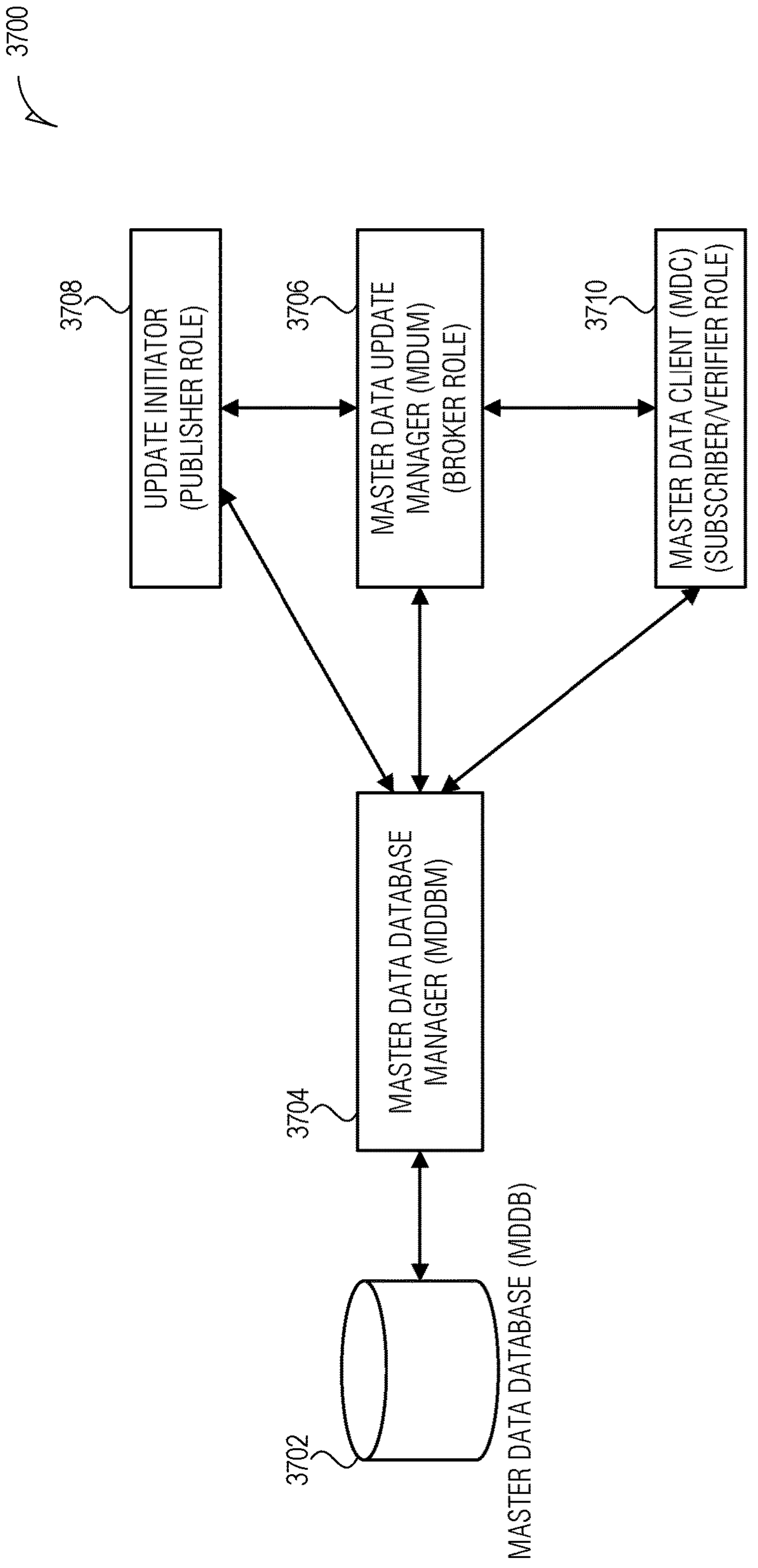
FIG. 37 is a diagram illustrating a master data update management architecture, according to an embodiment.

FIG. 37 is a diagram illustrating a master data update management architecture 3700, according to an embodiment. The master data update management architecture 3700 includes four entities that interact through messaging systems such as publish-subscribe, RESTful exchange, or store-and-forward middleware services. Examples of these mechanisms include but not limited to emails, content delivery networks, high speed file transfer services like IBM Aspera, and others.

A master data database 3702 (MDDB) is managed by a MDDB Manager 3704 (MDDBM). The MDDBM 3704 exposes a messaging interface for interacting with the other system entities. The MDDBM 3704 ensures that database integrity is maintained whether data is updated through the messaging interfaces or by backend processes that may snapshot, replicate, distribute, etc., master data from other sources. Unlike traditional databases, which are designed for transactional consistency (either ACID or BASE models), the MDDBM 3704 is specifically optimized for concurrent read-only accesses. This is because with master data, the updates are rare and coordinated across open-ended sets of subscribers and verifiers.

The master data update management architecture 3700 includes a MD Update Manager 3706 (MDUM). The MDUM 3706 includes a message broker that facilitates the exchange of messages to a subscriber base and a set of verifiers. The MDUM 3706 also facilitates the exchange of master data update messages.

The MDUM 3706 interfaces with an Update Initiator 3708, which is an entity that manages updates to master data typically by interfacing with the master data owner subsystems that manage master data sources (e.g., change of address processing).

One or more master data clients 3710 (MDC) are consumers (e.g., subscriber of the master data feed) or a verifier of the master data. In an elastic workload Edge/Cloud, the MDCs 3710 are the workload processing nodes.

The MDCs 3710 that act as subscribers that use master data in their applications but are not the owners of the data. The MDCs 3710 that act as verifiers are entities engineered or configured for high availability so that they can perform exhaustive tests to verify consistency of other databases which reference information in the master data (e.g., with references, foreign keys, etc.).

Figure 38:
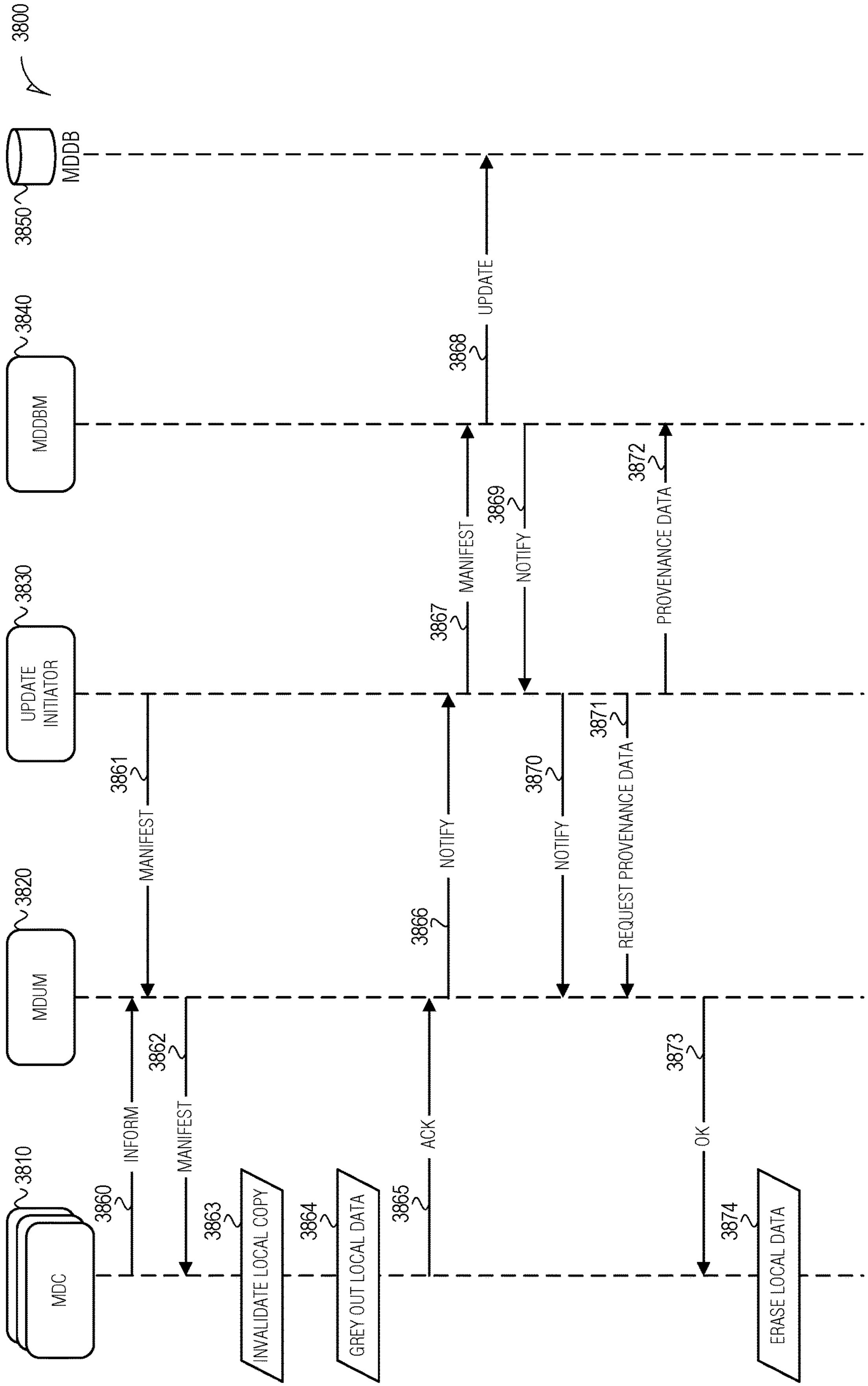
FIG. 38 is a diagram illustrating an update process, according to an embodiment.

FIG. 38 is a diagram illustrating an update process 3800, according to an embodiment. The update process 3800 may be used when the initiator of a master data update considers an update as being relatively small, already well tested, and having a high urgency. For this, the update process 3800 is accelerated by bypassing verification. In this case, because there is no verification operation, the master data clients (MDCs) involved comprise only the subscribers.

The update process 3800 incudes communications and operations performed by one or more master data clients 3810 (MDCs), a master data update manager 3820 (MDUM), an update initiator 3830, and a master data database manager 3840 (MDDBM), which manages a master data database 3850 (MDDB).

The MDCs 3810 include applications that use master data. In operation 3860 the MDCs 3810 inform the MDUM 3820 that they are subscribing to a master data service called the MDDBM 3840. The MDUM 3820 maintains an information base about these subscriber MDCs 3810 and keeps track of which of them are available and reachable through heartbeat messages (e.g., periodic keep-alive messages).

In operation 3861, the update initiator 3830 sends an update manifest to the MDUM 3820. The update manifest identifies the master data elements (e.g., "rows" or "tuples") to be updated by the MDDBM 3840.

In operation 3862, the MDUM 3820 broadcasts the update manifest to the subscriber MDCs 3810 and waits for acknowledgements from those MDCs 3810, while also continuing to monitor for heartbeats.

In operation 3863, the MDCs 3810, having received the update manifest from the MDUM 3820, invalidate their locally cached references and copies of master data records that are covered by the update manifest.

In operation 3864, the MDCs 3810 create and populate a data structure in which the master data covered by the update manifest are identified and tagged as being unavailable. This is referred to as being "greyed-out".

In operation 3865, the MDCs 3810 transmit acknowledgment messages to the MDUM 3820 indicating that operations 3863 and 3864 are completed. The MDUM 3820 waits until all reachable subscribers have acknowledged receipt of the update manifest. When the last acknowledgement arrives, in operation 3866, the MDUM 3820 notifies the update initiator 3830 that all of the reachable MDCs 3810 have acknowledged. A policy may set a time window in which, if the subscribers responding with heartbeats are nevertheless not acknowledging the master data update, then the update initiator 3830 is notified. The lack of update notifications may potentially lead to escalations that depend on the criticality of the update.

In operation 3867, the update initiator 3830 sends the update manifest to the MDDBM 3840, which begins the process of applying the update (operation 3868) to the MDDB 3850 and enforcing referential integrity. The update initiator 3830 waits for the updates to be applied before processing the next operation.

In operation 3869, when the MDDBM 3840 has completed updating the MDDB 3850, it notifies the update initiator 3830. The update initiator 3830, having received an update completion notification, notifies the MDUM 3820 that the MDDB 3850 update is complete (operation 3870).

In operation 3871, the update initiator 3830 requests and obtains provenance metadata from the MDUM 3820. In operation 3872, the update initiator 3830 provides the provenance metadata to the MDDBM 3840, which records the provenance metadata in an auxiliary data structure within the MDDB 3850 that can be accessed (read-only) at any time by anyone (e.g., limited by policy).

In operation 3873, the MDUM 3820 broadcasts to the MDCs 3810 that the update is now complete and stable. The MDCs 3810 proceed to erase the local data structure in which they had marked the records covered by the update manifest as being unavailable (i.e., each subscriber un-greys its own previously created grey listing) (operation 3874). From this point onward, the subscriber MDCs 3810 can continue to perform lookups on the newly updated master data elements in addition to the other non-updated master data elements they were already free to lookup (as the non-updated master data elements were neither purged from MDC caches, nor grayed out).

Figure 39:
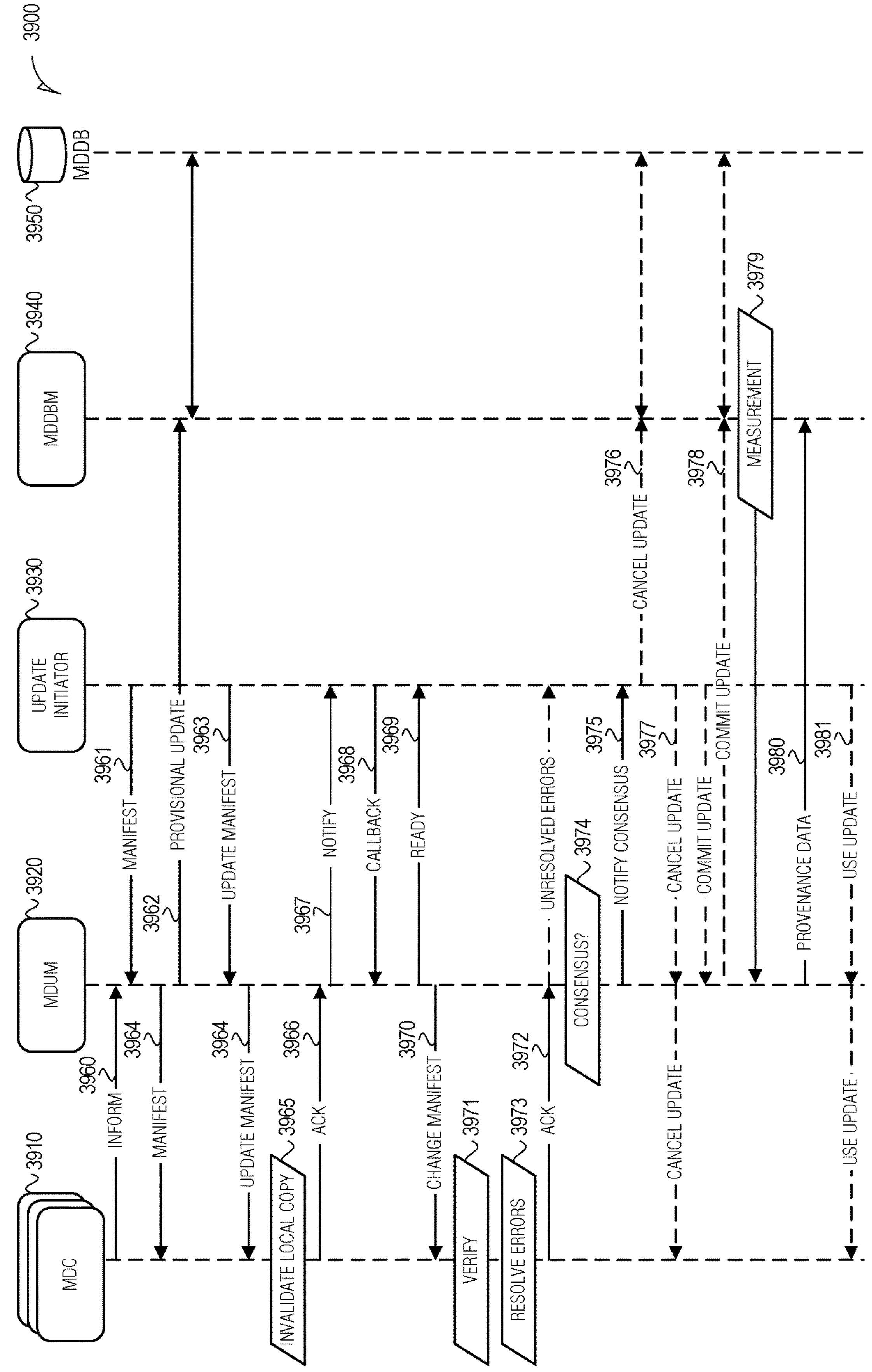
FIG. 39 is a diagram illustrating another update process, according to an embodiment.

FIG. 39 is a diagram illustrating another update process 3900, according to an embodiment. The update process 3900 is a more complex flow than that illustrated in FIG. 38. The update process illustrated in FIG. 38 is streamlined and has the advantage that an initiator can quickly obtain invalidations in all the subscriber caches and then update the master database. To ensure that updated master data getting properly reflected into a resilient and distributed master data database without a long delay, the updates must be small and well tested ahead of time so that no errors arise in the course of validations.

The update process 3900 in FIG. 39 includes verification built into the process. Most master data updates are neither so urgent that they must take effect immediately, nor easily or quickly tested for correctness (e.g., testing that applying the master data change does not produce any ambiguities or null values in some application's database from where there are foreign key references to master data database). Checking that it is indeed safe to apply the master data change may take some non-trivial amount of time. To handle these non-urgent but complex updates, the update process 3900 is provided here.

Logically, a master data update is something that does not happen frequently. However, when it does, there is a need to ensure the integrity of the master data update before propagating it to the MDCs. Here, the master data update is treated like Common Vulnerability Exposure (CVE) process where updates are subject to both security checks and policy function compliance flows (e.g., provenance checks) before they can be committed to the central master data database or a local master data provider's master data database.

At a high level, changing one or more elements in master data is divided into two stages, with the first stages potentially taking a long time and the second stages completing quickly. Despite the first stages requiring potentially longer time, the incoming master data change becomes effective immediately from the standpoint of a MDC's use of master data. To achieve this low latency in first stages, the lookups of entries affected by the incoming master data change may be slowed down to a limited extent, this is because during this time, both the current and the new versions of master data are consulted in a lookup if the lookup is intersecting with the entries affected by the incoming master data changes.

An initiator may choose to make a single element update in master data or may choose to batch multiple element updates in master data for improved efficiency. This choice depends on the nature of the master data being updated and the severity or sensitivity of the update.

The update process 3900 incudes communications and operations performed by one or more master data clients 3910 (MDCs), a master data update manager 3920 (MDUM), an update initiator 3930, and a master data database manager 3940 (MDDBM), which manages a master data database 3950 (MDDB).

The MDCs 3910 include applications that use master data. In operation 3960 the MDCs 3910 inform the MDUM 3920 that they are subscribing to a master data service called the MDDBM 3940. The MDUM 3920 maintains an information base about these subscriber MDCs 3910 and keeps track of which of them are available and reachable through heartbeat messages (e.g., periodic keep-alive messages).

In operation 3961, the update initiator 3930 initiates a master data update with a message to the MDUM 3920. The master data update message may include a manifest with the old master data, the new master data, verification hashes, provenance data, or the like. The MDUM 3920 transmits a provisional update message to the MDDBM 3940 (operation 3962) to apply a provisional master data update to the MDDB 3950 and treat the update as provisional until a later time when it may be either committed or withdrawn. In the interim, the MDDBM maintains both the pre-update and post-update versions of the master data and returns both versions to any lookup requests from MDCs 3910.

In operation 3963, the update initiator 3930 sends an update manifest to the MDUM 3920. The update manifest identifies the master data elements (e.g., "rows" or "tuples") that were provisionally updated by the MDDBM 3940.

In operation 3964, the MDUM 3920 broadcasts the update manifest to the subscriber MDCs 3910 and waits for acknowledgements from those MDCs 3910, while also continuing to monitor for heartbeats.

In operation 3965, the MDCs 3910, having received the update manifest from the MDUM 3920, invalidate their locally cached references and copies of master data records that are covered by the update manifest. Instead of greying out the records, the MDC 3910 subscribers are permitted to perform master data lookups at the MDDB 3950 after they have invalidated their cached elements. This is to allow for the possibility that the update may not commit for a while. Instead, when the MDC 3910 subscriber performs a lookup over a range affected by the update (e.g., the range of elements invalidated in the subscriber's cache), the MDDB 3950 provides both the pre-update and the post-update versions of master data so that the MDC 3910 has both versions of information. The MDC 3910 caches both versions at that point, marking both cached versions as provisional, and uses whichever version is suitable for a given purpose. For "eventual consistency" databases there are many usages where "stale reads" as well as "dirty reads" are permissible. So, if for given a usage, stale reads are acceptable, then the pre-update version may be used, and if dirty reads are needed then a post-update version may be used. If absolute consistency is required in a usage scenario, the MDC 3910 may return errors or retry messages, or provide more than one result to its requestors indicating that more than one alternative is possible for a request that happens to intersect with a master data update.

In operation 3966, the MDCs 3910 transmit acknowledgment messages to the MDUM 3920 indicating that operations 3963 are completed. The MDUM 3920 waits until all reachable subscribers have acknowledged receipt of the update manifest. When the last acknowledgement arrives, in operation 3967, the MDUM 3920 notifies the update initiator 3930 that all of the reachable MDCs 3910 have acknowledged. A policy may set a time window in which, if the subscribers responding with heartbeats are nevertheless not acknowledging the master data update, then the update initiator 3930 is notified. The lack of update notifications may potentially lead to escalations that depend on the criticality of the update.

In operation 3968, the update initiator 3930 sends a request for an update commit callback to the MDUM 3920. It is possible though not probable that multiple master data owners (acting as update initiators) may initiate their updates simultaneously or in an overlapping fashion. To account for this rare possibility, an initiator 3910 requests a callback to begin the commit process in case the MDUM 3920 is busy with coordinating another change flow by another initiator. In most cases, there is no other pending update, so the update process 3900 can continue immediately.

In operation 3969, when the update can be slotted into a schedule (e.g., there is no other pending update being processed), the MDUM 3920 transmits the callback to the update initiator 3910 indicating that it is safe to proceed.

In operation 3970, the MDUM 3920 transmits a change manifest to a set of (verifier) MDCs 3910. The MDCs 3910 that act as verifiers may be selected ahead of time. Alternatively, the MDCs 3910 used as verifiers may be selected when the process reaches this point. The MDCs 3910 that act as verifiers are stable end point services that can be contacted and asked to run extensive validation processes. These validation processes may be similar to those that test software CVEs rigorously in a CI/CD process. The MDC 3910 verifiers have a view of the master data pre-update and post-update, and each runs its own validation processes on behalf of one or more MDCs 3910 that consume master data. The verifier MDCs 3910 may send heartbeat messages to the MDUM 3920 to track any verifier MDCs 3910 that have become unreachable. The MDCs 3910 acting as verifiers perform their verification (operation 3971). At some point, all reachable MDCs 3910 report into the MDUM 3920 that their verifications are complete without any serious errors (operation 3972).

Note, some errors may arise, but they may be rectifiable by making changes to referencing applications, as is common also with software updates, which require changes in various system settings or options to make a software update work correctly. Such errors are not considered reasons for stalling a master data update. As such, concurrently, the MDCs 3910 may attempt to resolve errors and forward a message to the update initiator 3930 of any unresolvable errors (operation 3973).

At operation 3974, the MDUM 3920 calculates whether it has received sufficient verifications to qualify as a majority consensus. Although a simple majority consensus (greater than 50%) is discussed here, it is understood that other consensus algorithms may be used, such as a supermajority (e.g., greater than 60%, 75%, 80%, etc.), unanimity, or the like. The MDUM 3920 notifies the update initiator 3910 that a consensus was reached (operation 3975). The MDUM 3920 may set a time limit within which if a consensus cannot be produced, the update initiator 3910 has to be notified that verification did not succeed.

Once the update initiator 3930 has received a notification that a consensus was reached and that there are no unresolvable errors, the update initiator 3930 is able to proceed into the next stage.

If there are any unresolvable errors reported by the MDCs 3910, the update initiator 3930 may determine whether an error is a critical error or just an inconsistency that is non-critical (e.g., wrong zip code but otherwise correct address may be ok in some cases, and not ok in some other cases where zip code is part of a credit card verification application). At this point, the update initiator 3930 has all the information about verifications and possible errors and whether the errors are important enough to abort. If there are sufficient errors, then the update initiator 3930 may abort the update.

In the rare case where the update initiator 3930 has determined at this point that the master data update cannot move forward, it proceeds with an abort sequence. At operation 3976, the update initiator 3930 directs the MDDBM 3940 to cancel the provisional update, which moves the MDDB 3950 back to its original state. From here on, the MDDBM 3940 responds to lookups in the normal way (e.g., not returning both versions). At operation 3977, the update initiator 3930 broadcasts (via the MDUM 3920) to all MDCs 3910 that they may discard any elements they fetched from the MDDBM 3940 that were from the provisional version. At this point, the update process 3900 completes.

If the update initiator 3930 determines to continue with the update and commit the database change, in operation 3978, the update initiator transmits a commit message to the MDDBM 3940 via the MDUM 3920 to commit the update. The MDDBM 3940 produces a measurement (e.g., a signed hash) over the changes, which it forwards to the MDUM 3920 (operation 3979). The MDUM 3920 adds these changes to the provenance metadata for inclusion into the MDDB 3950 and tagged with the verification messages the MDUM 3920 has received (operation 3980). The verification messages may be used for tracing and auditing purposes in the future. At operation 3981, the update initiator 3930, through the MDUM 3920, informs the MDCs 3910 that they can discard any pre-update versions of master data that they may have stored. The update process 3900 has completed successfully.

A master data update manager (MDUM) may execute in a confidential computing enclave to secure it from any possible spoofing. The MDUM may also sign the update payload that is distributed to all participant nodes (MDCs) and the update initiator, which can verify the signature to ensure that there is no spoofing of the master data update request. Verifier MDCs may be given priority by infrastructure services as orchestrators (e.g., Kubernetes) and schedulers of resources. Further, to reduce latency and provide faster verification, verifier MDCs may be granted reserved resources to complete their assigned tasks. The reserved resources may include virtual machines, containers, network managers, memory managers, memory capacity, network bandwidth allocation, compute cores, and power budgets. The MDUM may execute as a service with a separate network slice made available to it so that it has a redundant network path available to it to all other participants (subscriber and verifier MDCs and update initiators). These virtual pathways in the network slice do not need to be high performance as the amount of data they need to deliver and the speed with which they need to deliver the status updates do not require low latency or high throughput.

Figure 40:
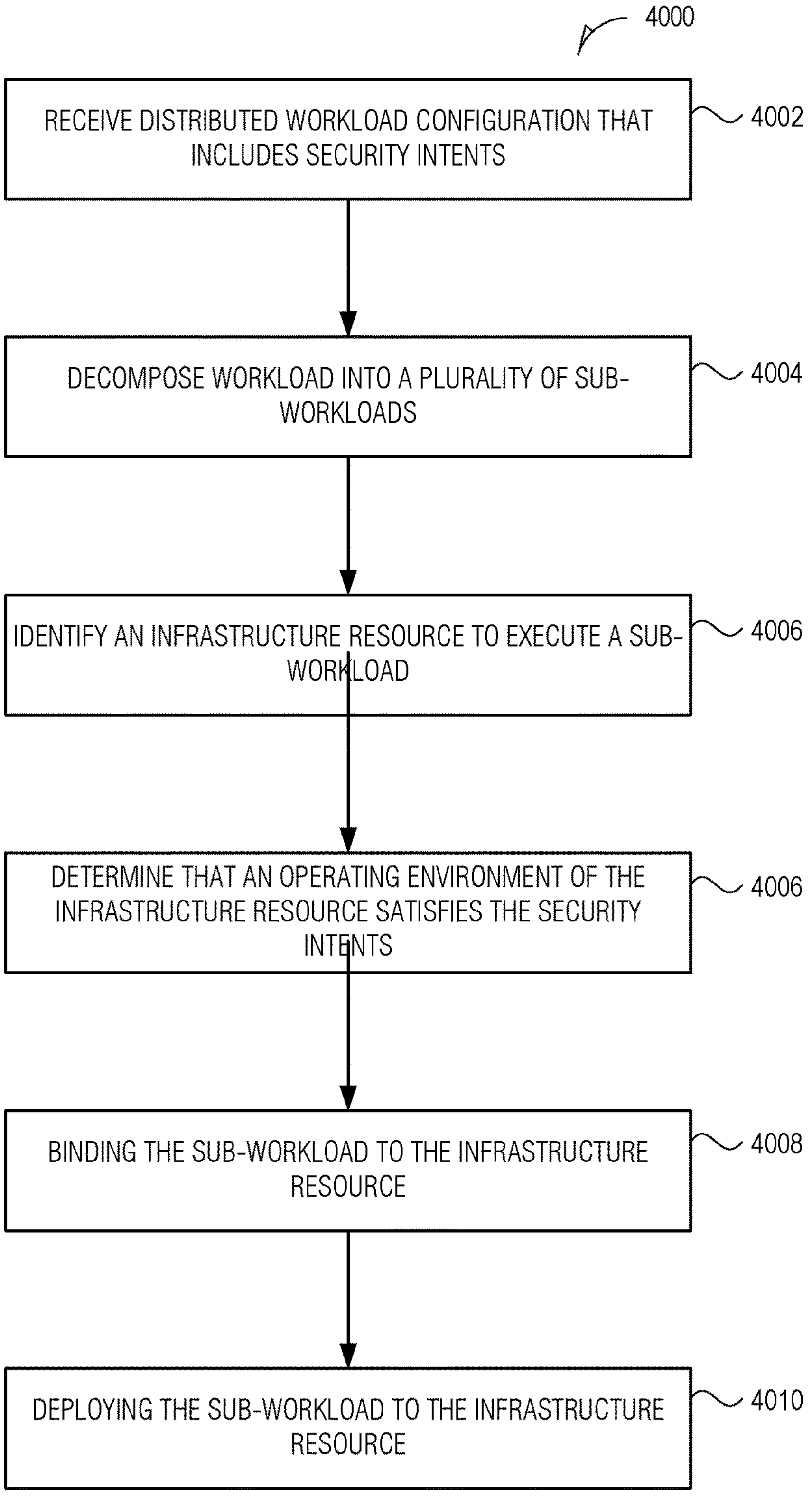
FIG. 40 is a flowchart illustrating a method for providing cloud-to-edge workload orchestration.

FIG. 40 is a flowchart illustrating a method 4000 for providing cloud-to-edge workload orchestration, according to an embodiment.

The method 4000 may be performed by a device, such as computing device like a compute node 4600 or an Edge computing node 4750, acting as an orchestration node for a network of compute nodes. At 4002, the method 4000 includes receiving a distributed workload configuration including security intents. In an embodiment, the security intents define trust requirements for execution of the sub-workload.

At 4004, the method 4000 includes decomposing, based on the distributed workload configuration, a workload into a plurality of sub-workloads.

At 4006, the method 4000 includes identifying an infrastructure resource of a plurality of compute nodes to execute a sub-workload of the plurality of sub-workloads. In an embodiment, the infrastructure resource is hosted in an Infrastructure-as-a-Service (IaaS). In an embodiment, the infrastructure resource includes a trusted execution environment.

At 4008, the method 4000 includes determining that an operating environment of the infrastructure resource satisfies the security intents.

At 4010, the method 4000 includes binding the sub-workload to the infrastructure resource, wherein the binding produces a token that is presented by the sub-workload to the infrastructure resource, and wherein the token is used to ensure trust among framework layers, e.g., CaaS, PaaS, and IaaS, and between C2E framework layering, e.g., CaaS to PaaS, and PaaS to IaaS.

At 4012, the method 4000 includes deploying the sub-workload to the infrastructure resource.

In an embodiment, the method 4000 includes receiving a workload update to apply to the plurality of sub-workloads, identifying a plurality of infrastructure resources that are used to execute the plurality of sub-workloads, creating a set of sub-workload update images that align to a distribution of the plurality of sub-workloads on infrastructure resources, and creating an update distribution plan to distribute the set of sub-workload update images to the plurality of infrastructure resources. In a further embodiment, each of the plurality of infrastructure resources include a manager to store a sub-workload update image corresponding to a sub-workload executing on the infrastructure resource, disable the sub-workload, install the sub-workload update image, and reenable the sub-workload.

In an embodiment, a sub-workload accesses master data from a master data database to obtain the master data. In a further embodiment, the sub-workload is to receive an update to the master data and transmit an update manifest to a master data update manager to update the master data at the master data database, the update manifest including a new value of the master data, the new value of the master data to be used instead of an existing value of the master data. In a further embodiment, the master data update manager is to broadcast the update manifest to a plurality of master data subscriber nodes, where each of the plurality of master data subscriber nodes temporarily invalidate local copies of the master data and refresh the master data from the master data database after the master data is updated based on the update manifest, or revalidate the local copies of the master data after the master data update fails.

In another embodiment, the master data update manager is to initiate a provisional update at the master data database to the new value of the master data, initiate a verification that the new value is valid, and broadcast the update manifest to a plurality of master data subscriber nodes after the verification is complete, wherein each of the plurality of master data subscribers invalidate local copies of the master data and refresh the master data from the master data database after the master data is updated based on the update manifest. In a further embodiment, each of the plurality of master data subscribers obtain the new value and the existing value of the master data when querying for the master data from the master data database. In another embodiment, the verification that the new value is valid is performed by a set of master data verification nodes.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a system, comprising: a plurality of compute nodes; and an orchestration node configured by instructions stored on non-transitory machine-readable, to: receive a distributed workload configuration including security intents; decompose, based on the distributed workload configuration, a workload into a plurality of sub-workloads; identify an infrastructure resource of the plurality of compute nodes to execute a sub-workload of the plurality of sub-workloads; determine that an operating environment of the infrastructure resource satisfies the security intents; bind the sub-workload to the infrastructure resource, wherein the binding produces a token that is presented by the sub-workload to the infrastructure resource, and wherein the token is used to ensure trust among framework layers; and deploy the sub-workload to the infrastructure resource.

In Example 2, the subject matter of Example 1 includes, wherein the security intents define trust requirements for execution of the sub-workload.

In Example 3, the subject matter of Examples 1-2 includes, wherein the infrastructure resource is hosted in an Infrastructure-as-a-Service (IaaS).

In Example 4, the subject matter of Examples 1-3 includes, wherein the infrastructure resource includes a trusted execution environment.

In Example 5, the subject matter of Examples 1-4 includes, wherein the orchestration node is to: receive a workload update to apply to the plurality of sub-workloads; identify a plurality of infrastructure resources that are used to execute the plurality of sub-workloads; create a set of sub-workload update images that align to a distribution of the plurality of sub-workloads on infrastructure resources; and create an update distribution plan to distribute the set of sub-workload update images to the plurality of infrastructure resources.

In Example 6, the subject matter of Example 5 includes, wherein each of the plurality of infrastructure resources include a manager to: store a sub-workload update image corresponding to a sub-workload executing on the infrastructure resource; disable the sub-workload; install the sub-workload update image; and reenable the sub-workload.

In Example 7, the subject matter of Examples 1-6 includes, wherein a sub-workload accesses master data from a master data database to obtain the master data.

In Example 8, the subject matter of Example 7 includes, wherein the sub-workload is to: receive an update to the master data; and transmit an update manifest to a master data update manager to update the master data at the master data database, the update manifest including a new value of the master data, the new value of the master data to be used instead of an existing value of the master data.

In Example 9, the subject matter of Example 8 includes, wherein the master data update manager is to: broadcast the update manifest to a plurality of master data subscriber nodes, wherein each of the plurality of master data subscriber nodes temporarily invalidate local copies of the master data and refresh the master data from the master data database after the master data is updated based on the update manifest, or revalidate the local copies of the master data after the master data update fails.

In Example 10, the subject matter of Examples 8-9 includes, wherein the master data update manager is to: initiate a provisional update at the master data database to the new value of the master data; initiate a verification that the new value is valid; and broadcast the update manifest to a plurality of master data subscriber nodes after the verification is complete, wherein each of the plurality of master data subscribers invalidate local copies of the master data and refresh the master data from the master data database after the master data is updated based on the update manifest.

In Example 11, the subject matter of Example 10 includes, wherein each of the plurality of master data subscribers obtain the new value and the existing value of the master data when querying for the master data from the master data database.

In Example 12, the subject matter of Examples 10-11 includes, wherein the verification that the new value is valid is performed by a set of master data verification nodes.

Example 13 is a method performed by an orchestration node, comprising: receiving a distributed workload configuration including security intents; decomposing, based on the distributed workload configuration, a workload into a plurality of sub-workloads; identifying an infrastructure resource of a plurality of compute nodes to execute a sub-workload of the plurality of sub-workloads; determining that an operating environment of the infrastructure resource satisfies the security intents; binding the sub-workload to the infrastructure resource, wherein the binding produces a token that is presented by the sub-workload to the infrastructure resource, and wherein the token is used to ensure trust among framework layers; and deploying the sub-workload to the infrastructure resource.

In Example 14, the subject matter of Example 13 includes, wherein the security intents define trust requirements for execution of the sub-workload.

In Example 15, the subject matter of Examples 13-14 includes, wherein the infrastructure resource is hosted in an Infrastructure-as-a-Service (IaaS).

In Example 16, the subject matter of Examples 13-15 includes, wherein the infrastructure resource includes a trusted execution environment.

In Example 17, the subject matter of Examples 13-16 includes, receiving a workload update to apply to the plurality of sub-workloads; identifying a plurality of infrastructure resources that are used to execute the plurality of sub-workloads; creating a set of sub-workload update images that align to a distribution of the plurality of sub-workloads on infrastructure resources; and creating an update distribution plan to distribute the set of sub-workload update images to the plurality of infrastructure resources.

In Example 18, the subject matter of Example 17 includes, wherein each of the plurality of infrastructure resources include a manager to: store a sub-workload update image corresponding to a sub-workload executing on the infrastructure resource; disable the sub-workload; install the sub-workload update image; and reenable the sub-workload.

In Example 19, the subject matter of Examples 13-18 includes, wherein a sub-workload accesses master data from a master data database to obtain the master data.

In Example 20, the subject matter of Example 19 includes, wherein the sub-workload is to: receive an update to the master data; and transmit an update manifest to a master data update manager to update the master data at the master data database, the update manifest including a new value of the master data, the new value of the master data to be used instead of an existing value of the master data.

In Example 21, the subject matter of Example 20 includes, wherein the master data update manager is to: broadcast the update manifest to a plurality of master data subscriber nodes, wherein each of the plurality of master data subscriber nodes temporarily invalidate local copies of the master data and refresh the master data from the master data database after the master data is updated based on the update manifest, or revalidate the local copies of the master data after the master data update fails.

In Example 22, the subject matter of Examples 20-21 includes, wherein the master data update manager is to: initiate a provisional update at the master data database to the new value of the master data; initiate a verification that the new value is valid; and broadcast the update manifest to a plurality of master data subscriber nodes after the verification is complete, wherein each of the plurality of master data subscribers invalidate local copies of the master data and refresh the master data from the master data database after the master data is updated based on the update manifest.

In Example 23, the subject matter of Example 22 includes, wherein each of the plurality of master data subscribers obtain the new value and the existing value of the master data when querying for the master data from the master data database.

In Example 24, the subject matter of Examples 22-23 includes, wherein the verification that the new value is valid is performed by a set of master data verification nodes.

Example 25 is at least one non-transitory machine-readable medium including instructions, which when executed by an orchestration node, cause the orchestration node to perform operations comprising: receiving a distributed workload configuration including security intents; decomposing, based on the distributed workload configuration, a workload into a plurality of sub-workloads; identifying an infrastructure resource of a plurality of compute nodes to execute a sub-workload of the plurality of sub-workloads; determining that an operating environment of the infrastructure resource satisfies the security intents; binding the sub-workload to the infrastructure resource, wherein the binding produces a token that is presented by the sub-workload to the infrastructure resource and wherein the token is used to ensure trust among framework layers; and deploying the sub-workload to the infrastructure resource.

In Example 26, the subject matter of Example 25 includes, wherein the security intents define trust requirements for execution of the sub-workload.

In Example 27, the subject matter of Examples 25-26 includes, wherein the infrastructure resource is hosted in an Infrastructure-as-a-Service (IaaS).

In Example 28, the subject matter of Examples 25-27 includes, wherein the infrastructure resource includes a trusted execution environment.

In Example 29, the subject matter of Examples 25-28 includes, wherein the orchestration node is to: receive a workload update to apply to the plurality of sub-workloads; identify a plurality of infrastructure resources that are used to execute the plurality of sub-workloads; create a set of sub-workload update images that align to a distribution of the plurality of sub-workloads on infrastructure resources; and create an update distribution plan to distribute the set of sub-workload update images to the plurality of infrastructure resources.

In Example 30, the subject matter of Example 29 includes, wherein each of the plurality of infrastructure resources include a manager to: store a sub-workload update image corresponding to a sub-workload executing on the infrastructure resource; disable the sub-workload; install the sub-workload update image; and reenable the sub-workload.

In Example 31, the subject matter of Examples 25-30 includes, wherein a sub-workload accesses master data from a master data database to obtain the master data.

In Example 32, the subject matter of Example 31 includes, wherein the sub-workload is to: receive an update to the master data; and transmit an update manifest to a master data update manager to update the master data at the master data database, the update manifest including a new value of the master data, the new value of the master data to be used instead of an existing value of the master data.

In Example 33, the subject matter of Example 32 includes, wherein the master data update manager is to: broadcast the update manifest to a plurality of master data subscriber nodes, wherein each of the plurality of master data subscriber nodes temporarily invalidate local copies of the master data and refresh the master data from the master data database after the master data is updated based on the update manifest, or revalidate the local copies of the master data after the master data update fails.

In Example 34, the subject matter of Examples 32-33 includes, wherein the master data update manager is to: initiate a provisional update at the master data database to the new value of the master data; initiate a verification that the new value is valid; and broadcast the update manifest to a plurality of master data subscriber nodes after the verification is complete, wherein each of the plurality of master data subscribers invalidate local copies of the master data and refresh the master data from the master data database after the master data is updated based on the update manifest.

In Example 35, the subject matter of Example 34 includes, wherein each of the plurality of master data subscribers obtain the new value and the existing value of the master data when querying for the master data from the master data database.

In Example 36, the subject matter of Examples 34-35 includes, wherein the verification that the new value is valid is performed by a set of master data verification nodes.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

Overview of Edge Computing Environments

Figure 41:
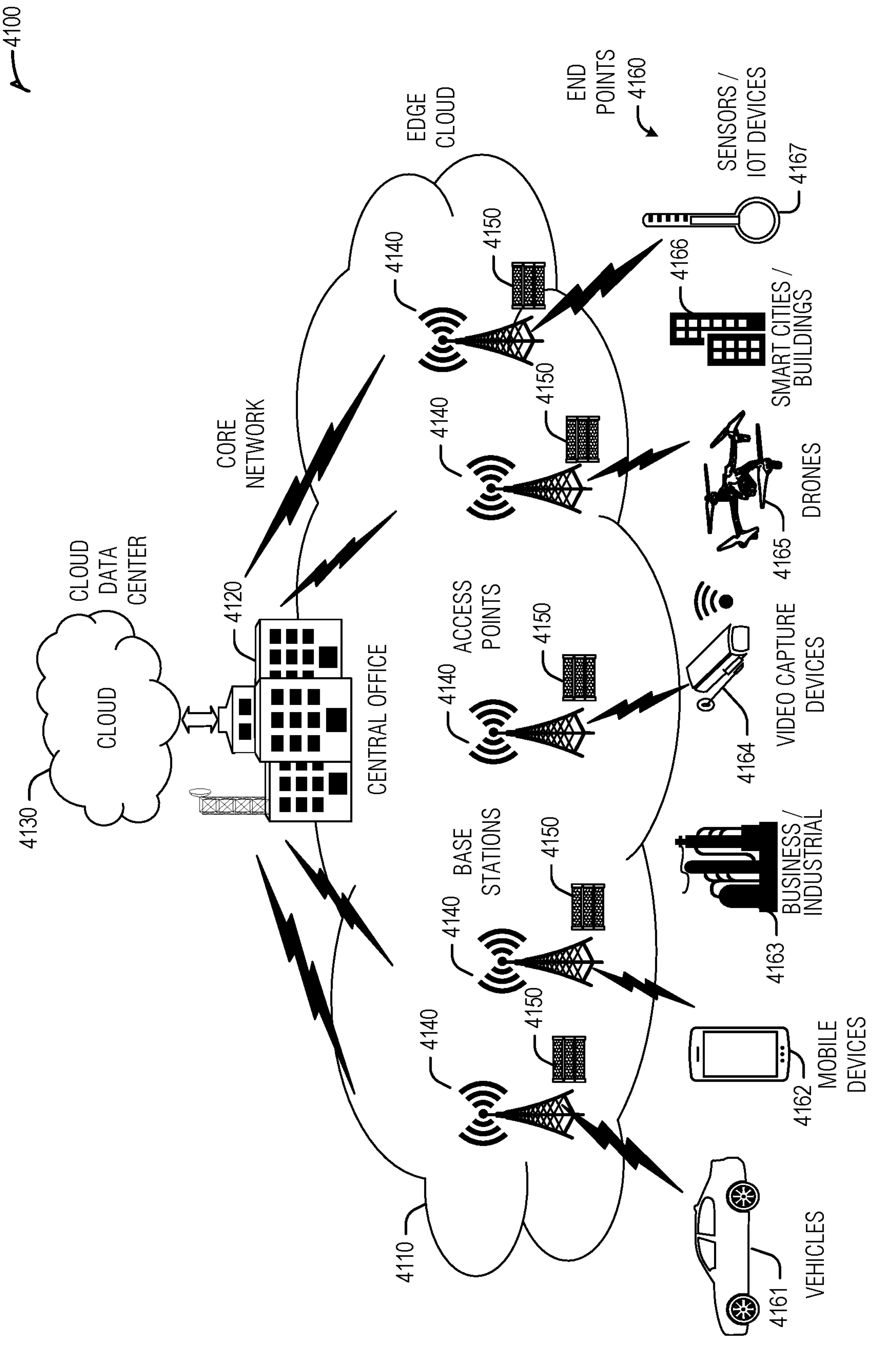
FIG. 41 illustrates an overview of an edge cloud configuration for edge computing, according to an example.

FIG. 41 is a block diagram 4100 showing an overview of a configuration for edge computing, which includes a layer of processing referenced in many of the current examples as an "edge cloud." As shown, the edge cloud 4110 is co-located at an edge location, such as an access point or base station 4140, a local processing hub 4150, or a central office 4120, and thus may include multiple entities, devices, and equipment instances. The edge cloud 4110 is located much closer to the endpoint (consumer and producer) data sources 4160 (e.g., autonomous vehicles 4161, user equipment 4162, business and industrial equipment 4163, video capture devices 4164, mobile vehicles (e.g., drones) 4165, smart cities and building devices 4166, sensors and IoT devices 4167, etc.) than the cloud data center 4130. Compute, memory, and storage resources which are offered at the edges in the edge cloud 4110 are critical to providing ultra-low latency response times for services and functions used by the endpoint data sources 4160 as well as reduce network backhaul traffic from the edge cloud 4110 toward cloud data center 4130 thus improving energy consumption and overall network usages among other benefits.

Compute, memory, and storage are scarce resources, and generally, decrease depending on the edge location (e.g., fewer processing resources being available at consumer end point devices than at a base station or at a central office). However, the closer that the edge location is to the endpoint (e.g., UEs), the more that space and power are constrained. Thus, edge computing, as a general design principle, attempts to minimize the resources needed for network services, through the distribution of more resources which are located closer both geographically and in-network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge," "close edge," "local edge," "middle edge," or "far edge" layers, depending on latency, distance, and timing characteristics.

Edge computing is a developing paradigm where computing is performed at or closer to the "edge" of a network, typically through the use of a compute platform (e.g., x86, AMD or ARM hardware architectures) implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Within edge computing networks, there may be scenarios in services in which the compute resource will be "moved" to the data, as well as scenarios in which the data will be "moved" to the compute resource. Or as an example, base station compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

In contrast to the network architecture of FIG. 41, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage but is not optimal for highly time-varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage, and processing as well as remote cloud data center-based storage and processing. Key performance indicators (KPIs) may be used to identify where sensor data is appropriately transferred and where it is processed or stored. This typically depends on the ISO layer dependency of the data. For example, lower layer (PHY, MAC, routing, etc.) data typically changes quickly and is better handled locally to meet latency requirements. Higher layer data such as Application-Layer data is typically less time-critical and may be stored and processed in a remote cloud data center.

Figure 42:
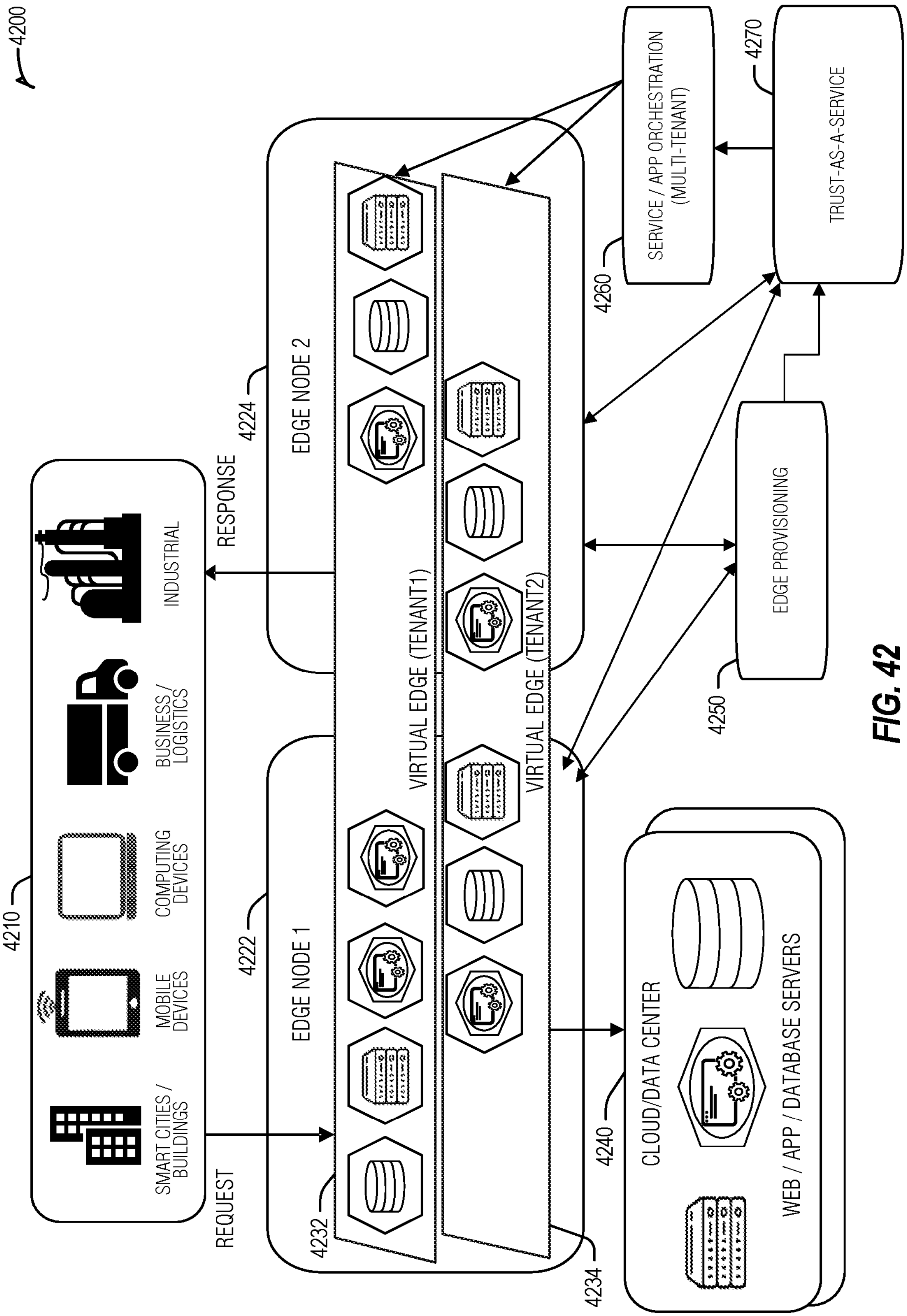
FIG. 42 illustrates deployment and orchestration for virtual edge configurations across an edge-computing system operated among multiple edge nodes and multiple tenants, according to an example.

FIG. 42 illustrates deployment and orchestration for virtual edge configurations across an edge computing system operated among multiple edge nodes and multiple tenants. Specifically, FIG. 42 depicts coordination of a first edge node 4222 and a second edge node 4224 in an edge computing system 4200, to fulfill requests and responses for various client endpoints 4210 (e.g., smart cities/building systems, mobile devices, computing devices, business/logistics systems, industrial systems, etc.), which access various virtual edge instances. The virtual edge instances 4232, 4234 (or virtual edges) provide edge compute capabilities and processing in an edge cloud, with access to a cloud/data center 4240 for higher-latency requests for websites, applications, database servers, etc. Thus, the edge cloud enables coordination of processing among multiple edge nodes for multiple tenants or entities.

In the example of FIG. 42, these virtual edge instances include a first virtual edge 4232, offered to a first tenant (Tenant 1), which offers a first combination of edge storage, computing, and services; and a second virtual edge 4234, offering a second combination of edge storage, computing, and services, to a second tenant (Tenant 2). The virtual edge instances 4232, 4234 are distributed among the edge nodes 4222, 4224, and may include scenarios in which a request and response are fulfilled from the same or different edge nodes. The configuration of the individual edge nodes 4222, 4224 to operate in a distributed yet coordinated fashion occurs based on edge provisioning functions 4250. The functionality of the edge nodes 4222, 4224 to provide coordinated operation for applications and services, among multiple tenants, occurs based on orchestration functions 4260.

It should be understood that some of the devices in 4210 are multi-tenant devices where Tenant1 may function within a Tenant1 'slice' while a Tenant2 may function within a Tenant2 'slice' (and, in further examples, additional or sub-tenants may exist; and a respective tenant may be specifically entitled and transactionally tied to a specific set of features all the way to specific hardware features). A trusted multi-tenant device may further contain a tenant-specific cryptographic key such that the combination of a key and a slice may be considered a "root of trust" (RoT) or tenant-specific RoT. A ROT may further be computed dynamically composed using a compute security architecture, such as a DICE (Device Identity Composition Engine) architecture where a DICE hardware building block is used to construct layered trusted computing base contexts for secured and authenticated layering of device capabilities (such as with use of a Field Programmable Gate Array (FPGA)). The RoT also may be used for a trusted computing context to support respective tenant operations, etc. Use of this ROT and the compute security architecture may be enhanced by the attestation operations further discussed herein.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS (function as a service) engines, servlets, servers, or other computation abstraction may be partitioned according to a DICE layering and fan-out structure to support a RoT context for each. Accordingly, the respective RoTs spanning devices in 4210, 4222, and 4240 may coordinate the establishment of a distributed trusted computing base (DTCB) such that a tenant-specific virtual trusted secure channel linking all elements end-to-end can be established.

Further, it will be understood that a container may have data or workload-specific keys protecting its content from a previous edge node. As part of the migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

As an example, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other compute security functions related to the provisioning and lifecycle of the trusted 'slice' concept in FIG. 42. An orchestrator may use a DICE layering and fan-out construction to create a root of trust context that is tenant specific. Thus, orchestration functions, provided by an orchestrator, may participate as a tenant-specific orchestration provider.

Accordingly, an edge-computing system may be configured to fulfill requests and responses for various client endpoints from multiple virtual edge instances (and, from a cloud or remote data center, not shown). The use of these virtual edge instances supports multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications, latency-sensitive applications, latency-critical applications, user plane applications, networking applications, etc.). The virtual edge instances may also be spanned across systems of multiple owners at different geographic locations (or, respective computing systems and resources which are co-owned or co-managed by multiple owners).

For instance, a respective edge node 4222, 4224 may implement the use of containers, such as with the use of a container "pod" 4226, 4228 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices of virtual edges 4232, 4234 are partitioned according to the needs of a respective container.

With the use of container pods, a pod controller oversees the partitioning and allocation of containers and resources. The pod controller receives instructions from an orchestrator (e.g., performing orchestration functions 4260) that instructs the controller on how to appropriately partition physical resources and for what duration, such as by receiving key performance indicator (KPI) targets based on SLA contracts. The pod controller determines which container uses which resources and for how long to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a compute security role that prevents the assignment of resources until the right tenant authenticates or prevents provisioning of data or a workload to a container until an attestation result is satisfied.

Also, with the use of container pods, tenant boundaries can still exist but in the context of a respective pod of containers. If a respective tenant-specific pod has a tenant-specific pod controller, there may be a shared pod controller that consolidates resource allocation requests to avoid typical resource starvation situations. Further controls may be provided to ensure the attestation and trustworthiness of the pod and pod controller. For instance, the orchestrator 4260 may provision an attestation verification policy to local pod controllers that perform attestation verification. If an attestation satisfies a policy for a first tenant pod controller but not a second tenant pod controller, then the second pod may be migrated to a different edge node that does satisfy it. Alternatively, the first pod may be allowed to execute and then a different shared pod controller is installed and invoked before the second pod executing.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to an individual tenant (aside from the execution of virtualized network functions).

Within the edge cloud, a first edge node 4222 (e.g., operated by a first owner) and a second edge node 4224 (e.g., operated by a second owner) may operate or respond to a container orchestrator to coordinate the execution of various applications within the virtual edge instances offered for respective tenants. For instance, the edge nodes 4222, 4224 may be coordinated based on edge provisioning functions 4250, while the operation of the various applications is coordinated with orchestration functions 4260.

Various system arrangements may provide an architecture that treats VMs, Containers, and Functions equally in terms of application composition (and resulting applications are combinations of these three ingredients). A respective ingredient may involve the use of one or more accelerator (e.g., FPGA, ASIC, cryptographic execution) components as a local backend. In this manner, applications can be split across multiple edge owners, coordinated by an orchestrator.

Figure 43:
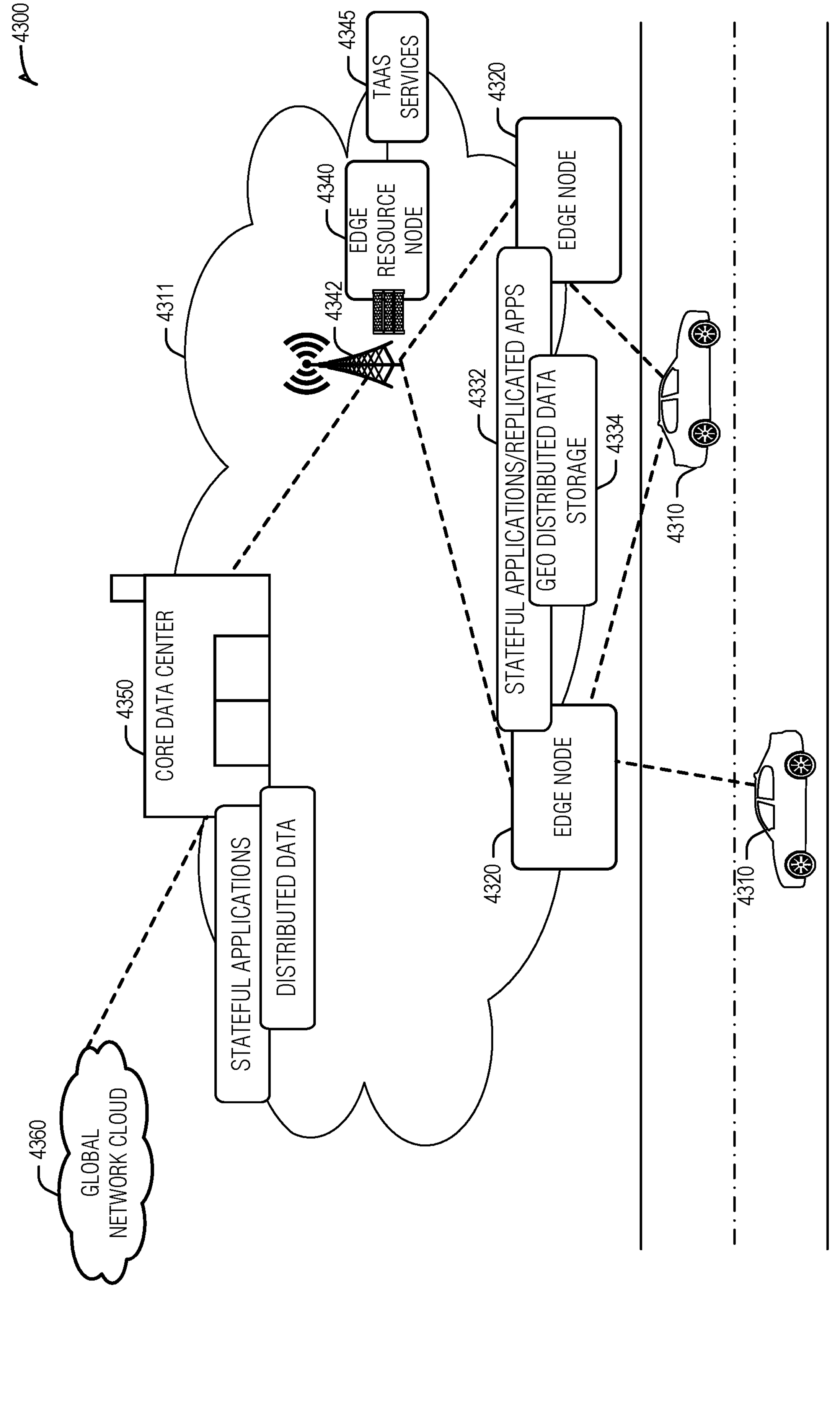
FIG. 43 illustrates a vehicle compute and communication use case involving mobile access to applications in an edge-computing system, according to an example.

It should be appreciated that the edge computing systems and arrangements discussed herein may be applicable in various solutions, services, and/or use cases. As an example, FIG. 43 shows a simplified vehicle compute and communication use case involving mobile access to applications in an edge computing system 4300 that implements an edge cloud 4110 connected to Trust-as-a-Service (TaaS) instances 4345. In this use case, a client compute node 4310 may be embodied as in-vehicle compute systems (e.g., in-vehicle navigation and/or infotainment systems) located in corresponding vehicles that communicate with the edge gateway nodes 4320 during traversal of a roadway. For instance, edge gateway nodes 4320 may be located in roadside cabinets, which may be placed along the roadway, at intersections of the roadway, or other locations near the roadway. As a vehicle traverses along the roadway, the connection between its client compute node 4310 and a particular edge gateway node 4320 may propagate to maintain a consistent connection and context for the client compute node 4310. The respective nodes of the edge gateway nodes 4320 includes some processing and storage capabilities and, as such, some processing and/or storage of data for the client compute nodes 4310 may be performed on one or more of the edge gateway nodes 4320.

A respective node of the edge gateway nodes 4320 may communicate with one or more edge resource nodes 4340, which are illustratively embodied as compute servers, appliances or components located at or in a communication base station 4342 (e.g., a base station of a cellular network). As discussed above, a respective edge resource node 4340 includes some processing and storage capabilities, and, as such, some processing and/or storage of data for the client compute nodes 4310 may be performed on the edge resource node 4340. For example, the processing of data that is less urgent or important may be performed by the edge resource node 4340, while the processing of data that is of a higher urgency or importance may be performed by edge gateway devices or the client nodes themselves (depending on, for example, the capabilities of a respective component). Further, various wired or wireless communication links (e.g., fiber optic wired backhaul, 5G wireless links) may exist among the edge nodes 4320, edge resource node(s) 4340, core data center 4350, and network cloud 4360.

The edge resource node(s) 4340 also communicate with the core data center 4350, which may include compute servers, appliances, and/or other components located in a central location (e.g., a central office of a cellular communication network). The core data center 4350 may provide a gateway to the global network cloud 4360 (e.g., the Internet) for the edge cloud 4110 operations formed by the edge resource node(s) 4340 and the edge gateway nodes 4320. Additionally, in some examples, the core data center 4350 may include an amount of processing and storage capabilities and, as such, some processing and/or storage of data for the client compute devices may be performed on the core data center 4350 (e.g., processing of low urgency or importance, or high complexity). The edge gateway nodes 4320 or the edge resource nodes 4340 may offer the use of stateful applications 4332 and a geographically distributed data storage 4334 (e.g., database, data store, etc.).

In further examples, FIG. 43 may utilize various types of mobile edge nodes, such as an edge node hosted in a vehicle (e.g., car, truck, tram, train, etc.) or other mobile units, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 4320, some others at the edge resource node 4340, and others in the core data center 4350 or the global network cloud 4360.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity (a workload execution environment) such as a process, a Docker or Kubernetes container, a virtual machine, etc. Within the edge computing system, various data center, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example Internet of Things Architectures

Figure 44:
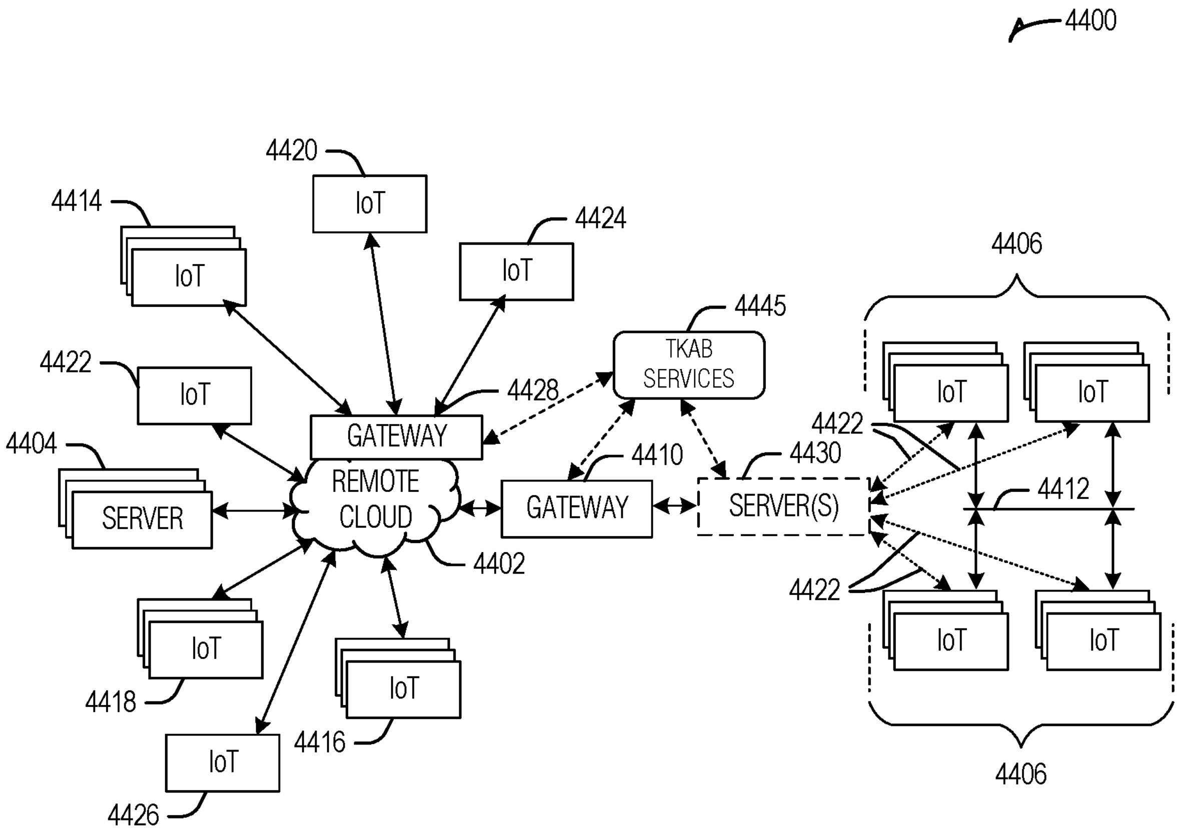
FIG. 44 illustrates a block diagram depicting deployment and communications among several Internet of Things (IoT) devices, according to an example.

As a more detailed illustration of an Internet of Things (IoT) network, FIG. 44 illustrates a drawing of a cloud or edge computing network 4400, in communication with several IoT devices and a TaaS instance 4445. The IoT is a concept in which a large number of computing devices are interconnected with one other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar (or lower) cost compared to the cost of smaller numbers of larger devices. However, an IoT device may be a smartphone, laptop, tablet, or PC, or other larger device. Further, an IoT device may be a virtual device, such as an application on a smartphone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Returning to FIG. 44, the network 4400 may represent portions of the Internet or may include portions of a local area network (LAN), or a wide area network (WAN), such as a proprietary network for a company. The IoT devices may include any number of different types of devices, grouped in various combinations. For example, a traffic control group 4406 may include IoT devices along streets in a city. These IoT devices may include stoplights, traffic flow monitors, cameras, weather sensors, and the like. The traffic control group 4406, or other subgroups, may be in communication within the network 4400 through wired or wireless links 4408, such as LPWA links, optical links, and the like. Further, a wired or wireless sub-network 4412 may allow the IoT devices to communicate with one another, such as through a local area network, a wireless local area network, and the like. The IoT devices may use another device, such as a gateway 4410 or 4428 to communicate with remote locations such as remote cloud 4402; the IoT devices may also use one or more servers 4430 to facilitate communication within the network 4400 or with the gateway 4410. For example, the one or more servers 4430 may operate as an intermediate network node to support a local edge cloud or fog implementation among a local area network. Further, the gateway 4428 that is depicted may operate in a cloud-to-gateway-to-many edge devices configuration, such as with the various IoT devices 4414, 4420, 4424 being constrained or dynamic to an assignment and use of resources in the network 4400.

In an example embodiment, the network 4400 can further include or be communicatively coupled to a Trust-a-a-Service instance or deployment configured to perform trust attestation operations within the network 4400, such as that discussed above.

Other example groups of IoT devices may include remote weather stations 4414, local information terminals 4416, alarm systems 4418, automated teller machines 4420, alarm panels 4422, or moving vehicles, such as emergency vehicles 4424 or other vehicles 4426, among many others. These IoT devices may be in communication with other IoT devices, with servers 4404, with another IoT device or system, another edge computing or "fog" computing system, or a combination therein. The groups of IoT devices may be deployed in various residential, commercial, and industrial settings (including in both private or public environments).

As may be seen from FIG. 44, a large number of IoT devices may be communicating through the network 4400. This may allow different IoT devices to request or provide information to other devices autonomously. For example, a group of IoT devices (e.g., the traffic control group 4406) may request a current weather forecast from a group of remote weather stations 4414, which may provide the forecast without human intervention. Further, an emergency vehicle 4424 may be alerted by an automated teller machine 4420 that a burglary is in progress. As the emergency vehicle 4424 proceeds towards the automated teller machine 4420, it may access the traffic control group 4406 to request clearance to the location, for example, by lights turning red to block cross traffic at an intersection in sufficient time for the emergency vehicle 4424 to have unimpeded access to the intersection.

Clusters of IoT devices may be equipped to communicate with other IoT devices as well as with a cloud network. This may allow the IoT devices to form an ad-hoc network between the devices, allowing them to function as a single device, which may be termed a fog device or system. Clusters of IoT devices, such as may be provided by the remote weather stations 4414 or the traffic control group 4406, may be equipped to communicate with other IoT devices as well as with the network 4400. This may allow the IoT devices to form an ad-hoc network between the devices, allowing them to function as a single device, which also may be termed a fog device or system.

In further examples, a variety of topologies may be used for IoT networks comprising IoT devices, with the IoT networks coupled through backbone links to respective gateways. For example, a number of IoT devices may communicate with a gateway, and with each other through the gateway. The backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/deMUXing components that facilitate the interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide-area (LPWA) network, for example, a LPWA network compatible with the LoRaWan specification promulgated by the LoRa alliance, or an IPV6 over Low Power Wide-Area Networks (LPWAN) network compatible with a specification promulgated by the Internet Engineering Task Force (IETF).

Further, the respective IoT networks may communicate with an outside network provider (e.g., a tier 2 or tier 3 provider) using any number of communications links, such as an LTE cellular link, a LPWA link, or a link based on the IEEE 802.15.4 standard, such as Zigbee®. The respective IoT networks may also operate with the use of a variety of network and internet application protocols such as the Constrained Application Protocol (CoAP). The respective IoT networks may also be integrated with coordinator devices that provide a chain of links that forms a cluster tree of linked devices and networks.

IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration, and quality of service (QoS) based swarming and coordination/combinations of resources.

An IoT network, arranged as a mesh network, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of the assets and resources. Furthermore, the proper components of infrastructure and resource-based trust and service indices may be inserted to improve the data integrity, quality, assurance, and deliver a metric of data confidence.

Example Computing Devices

Figure 45:
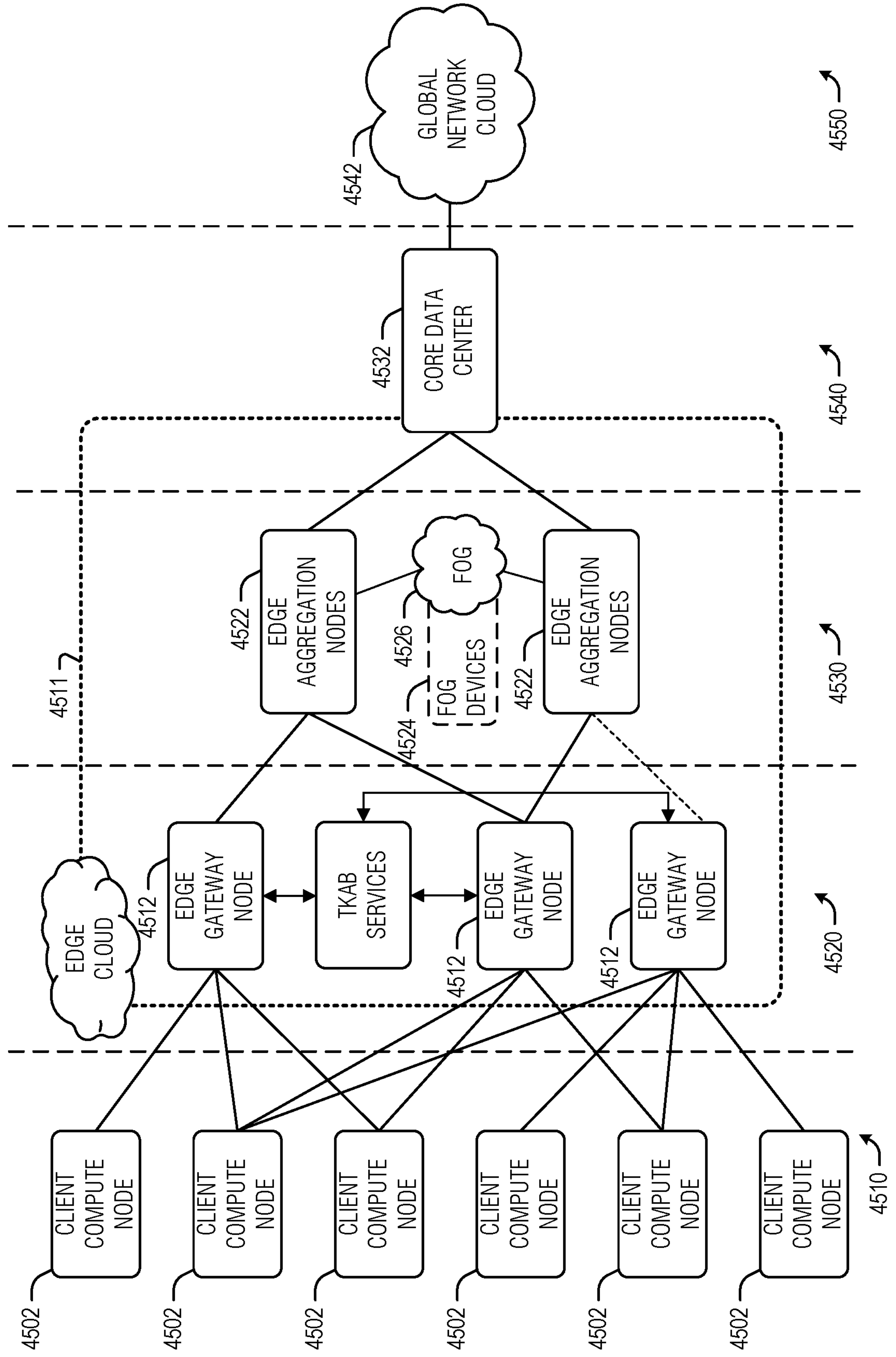
FIG. 45 illustrates an overview of layers of distributed compute deployed among an edge computing system, according to an example.

At a more generic level, an edge computing system may be described to encompass any number of deployments operating in the edge cloud 4110, which provide coordination from client and distributed computing devices. FIG. 45 provides a further abstracted overview of layers of distributed compute deployed among an edge computing environment for purposes of illustration.

FIG. 45 generically depicts an edge computing system for providing edge services and applications to multi-stakeholder entities, as distributed among one or more client compute nodes 4502, one or more edge gateway nodes 4512, one or more edge aggregation nodes 4522, one or more core data centers 4532, and a global network cloud 4542, as distributed across layers of the network. The implementation of the edge computing system may be provided at or on behalf of a telecommunication service provider ("telco" or "TSP"), internet-of-things service provider, a cloud service provider (CSP), enterprise entity, or any other number of entities. Various forms of wired or wireless connections may be configured to establish connectivity among the nodes 4502, 4512, 4522, 4532, including interconnections among such nodes (e.g., connections among edge gateway nodes 4512, and connections among edge aggregation nodes 4522). Such connectivity and federation of these nodes may be assisted with the use of TaaS services 4560 and service instances, as discussed herein.

A respective node or device of the edge computing system is located at a particular layer corresponding to layers 4510, 4520, 4530, 4540, and 4550. For example, the client compute nodes 4502 are located at an endpoint layer 4510, while the edge gateway nodes 4512 are located at an edge devices layer 4520 (local level) of the edge computing system. Additionally, the edge aggregation nodes 4522 (and/or fog devices 4524, if arranged or operated with or among a fog networking configuration 4526) is located at a network access layer 4530 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein apply to fog networks, fogging, and fog configurations. Further, aspects of the edge computing systems discussed herein may be configured as a fog, or aspects of a fog may be integrated into an edge computing architecture.

The core data center 4532 is located at a core network layer 4540 (e.g., a regional or geographically-central level), while the global network cloud 4542 is located at a cloud data center layer 4550 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 4532 may be located within, at, or near the edge cloud 4511 (e.g., edge cloud 4110).

Although an illustrative number of client compute nodes 4502, edge gateway nodes 4512, edge aggregation nodes 4522, core data centers 4532, and global network clouds 4542 are shown in FIG. 45, it should be appreciated that the edge computing system may include more or fewer devices or systems at respective layers. Additionally, as shown in FIG. 45, the number of components of respective layers 4510, 4520, 4530, 4540, and 4550 generally increases at lower levels (e.g., when moving closer to endpoints). As such, one edge gateway node 4512 may service multiple client compute nodes 4502, and one edge aggregation node 4522 may service multiple edge gateway nodes 4512.

Consistent with the examples provided herein, a client compute node 4502 may be embodied as any type of end point component, device, appliance, or "thing" capable of communicating as a producer or consumer of data. Further, the label "node" or "device" as used in the edge computing system 4500 does not necessarily mean that such node or device operates in a client or minion/follower/agent role; rather, any of the nodes or devices in the edge computing system 4500 refer to individual entities, nodes, or subsystems which include discrete or connected hardware or software configurations to facilitate or use the edge cloud 4511.

As such, the edge cloud 4511 is formed from network components and functional features operated by and within the edge gateway nodes 4512 and the edge aggregation nodes 4522 of layers 4520, 4530, respectively. The edge cloud 4511 may be embodied as any type of network that provides edge computing and/or storage resources which are proximately located to radio access network (RAN) capable endpoint devices (e.g., mobile computing devices, IoT devices, smart devices, etc.), which are shown in FIG. 45 as the client compute nodes 4502. In other words, the edge cloud 4511 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 4511 may form a portion of or otherwise provide an ingress point into or across a fog networking configuration 4526 (e.g., a network of fog devices 4524, not shown in detail), which may be embodied as a system-level horizontal and distributed architecture that distributes resources and services to perform a specific function. For instance, a coordinated and distributed network of fog devices 4524 may perform computing, storage, control, or networking aspects in the context of an IoT system arrangement. Other networked, aggregated, and distributed functions may exist in the edge cloud 4511 between the cloud data center layer 4550 and the client endpoints (e.g., client compute nodes 4502). Some of these are discussed in the following sections in the context of network functions or service virtualization, including the use of virtual edges and virtual services which are orchestrated for multiple stakeholders.

The edge gateway nodes 4512 and the edge aggregation nodes 4522 cooperate to provide various edge services and compute security features to the client compute nodes 4502. Furthermore, because an individual client compute node 4502 may be stationary or mobile, a respective edge gateway node 4512 may cooperate with other edge gateway devices to propagate presently provided edge services and compute security features as the corresponding client compute node 4502 moves about a region. To do so, respective nodes of the edge gateway nodes 4512 and/or edge aggregation nodes 4522 may support multiple tenancies and multiple stakeholder configurations, in which services from (or hosted for) multiple service providers and multiple consumers may be supported and coordinated across a single or multiple compute devices.

In further examples, any of the compute nodes or devices discussed with reference to the present edge computing systems and environment may be fulfilled based on the components depicted in FIGS. 46 and 47. An edge compute node may be embodied as a type of device, appliance, computer, or other "thing" capable of communicating with other edge, networking, or endpoint components. For example, an edge compute device may be embodied as a personal computer, a server, smartphone, a mobile compute device, a smart appliance, an in-vehicle compute system (e.g., a navigation system), a self-contained device having an outer case, shell, etc., or other devices or systems capable of performing the described functions.

Figure 46:
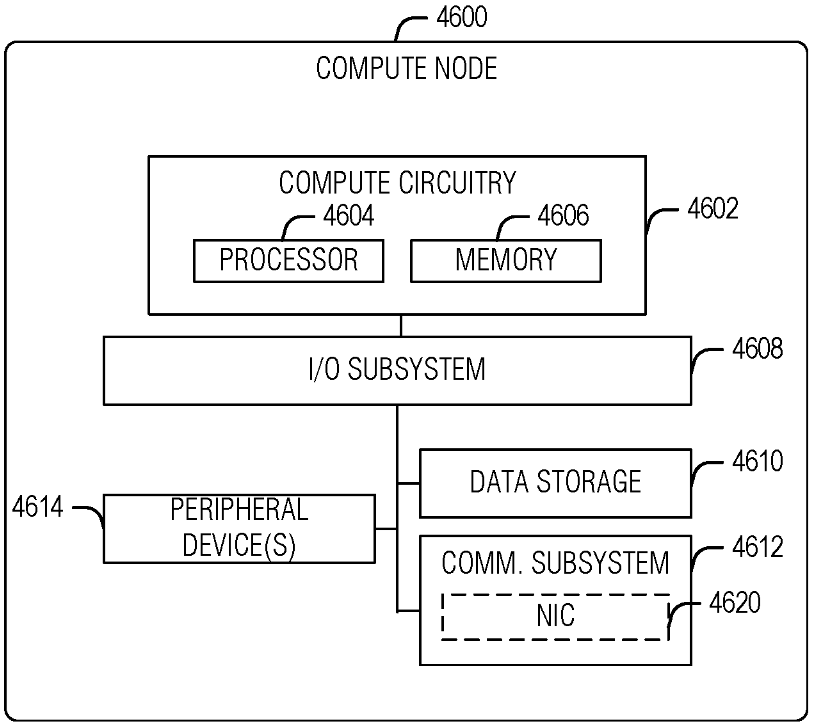
FIG. 46 illustrates an overview of example components deployed at a compute node system, according to an example.

In the simplified example depicted in FIG. 46, an edge compute node 4600 includes a compute engine (also referred to herein as "compute circuitry") 4602, an input/output (I/O) subsystem 4608, data storage 4610, a communication circuitry subsystem 4612, and, optionally, one or more peripheral devices 4614. In other examples, a respective compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 4600 may be embodied as any type of engine, device, or collection of devices capable of performing various compute functions. In some examples, the compute node 4600 may be embodied as a single device such as an integrated circuit, an embedded system, a field-programmable gate array (FPGA), a system-on-a-chip (SOC), or other integrated system or device. In the illustrative example, the compute node 4600 includes or is embodied as a processor 4604 and a memory 4606. The processor 4604 may be embodied as any type of processor capable of performing the functions described herein (e.g., executing an application). For example, the processor 4604 may be embodied as a multi-core processor(s), a microcontroller, a processing unit, a specialized or special purpose processing unit, or other processor or processing/controlling circuit. In some examples, the processor 4604 may be embodied as, include, or be coupled to an FPGA, an application-specific integrated circuit (ASIC), reconfigurable hardware or hardware circuitry, or other specialized hardware to facilitate performance of the functions described herein. Also in some examples, the processor 4604 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), dedicated compute circuitry, storage devices, or AI or specialized hardware (e.g., GPUs, programmed FPGAs, Network Processing Units (NPUs), Infrastructure Processing Units (IPUs), Storage Processing Units (SPUs), AI Processors (APUs), Data Processing Units (DPUs), Edge Processing Units (EPUs), or other specialized compute units such as a cryptographic processing unit/accelerator). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. Thus, any of the C2E techniques described herein and their accompanying attestation, trust, security, provisioning, testing, simulation, or orchestration functions may be coordinated by an xPU. However, it will be understood that an xPU, a SOC, a CPU, and other variations of the processor 4604 may work in coordination with each other to execute many types of operations and instructions within and on behalf of the compute node 4600.

The main memory 4606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel® 3D XPoint™ memory), or other byte-addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable crosspoint architecture in which memory cells sit at the intersection of word lines and bit lines and are individually addressable and in which bit storage is based on a change in bulk resistance. In some examples, all or a portion of the main memory 4606 may be integrated into the processor 4604. The main memory 4606 may store various software and data used during operation such as one or more applications, data operated on by the application(s), libraries, and drivers.

The compute circuitry 4602 is communicatively coupled to other components of the compute node 4600 via the I/O subsystem 4608, which may be embodied as circuitry and/or components to facilitate input/output operations with the compute circuitry 4602 (e.g., with the processor 4604 and/or the main memory 4606) and other components of the compute circuitry 4602. For example, the I/O subsystem 4608 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 4608 may form a portion of a system-on-a-chip (SoC) and be incorporated, along with one or more of the processor 4604, the main memory 4606, and other components of the compute circuitry 4602, into the compute circuitry 4602.

The one or more illustrative data storage devices 4610 may be embodied as any type of device configured for short-term or long-term storage of data such as, for example, memory devices and circuits, memory cards, hard disk drives, solid-state drives, or other data storage devices. A respective data storage device 4610 may include a system partition that stores data and firmware code for the data storage device 4610. A respective data storage device 4610 may also include one or more operating system partitions that store data files and executables for operating systems depending on, for example, the type of compute node 4600.

The communication circuitry 4612 may be embodied as any communication circuit, device, or collection thereof, capable of enabling communications over a network between the compute circuitry 4602 and another compute device (e.g., an edge gateway node 4512 of the edge computing system 4500). The communication circuitry 4612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LPWAN) or low-power wide-area (LPWA) protocols, etc.) to effect such communication.

The illustrative communication circuitry 4612 includes a network interface controller (NIC) 4620, which may also be referred to as a host fabric interface (HFI). The NIC 4620 may be embodied as one or more add-in-boards, daughter cards, network interface cards, controller chips, chipsets, or other devices that may be used by the compute node 4600 to connect with another compute device (e.g., an edge gateway node 4512). In some examples, the NIC 4620 may be embodied as part of a system-on-a-chip (SoC) that includes one or more processors or included on a multichip package that also contains one or more processors. In some examples, the NIC 4620 may include a local processor (not shown) and/or a local memory and storage (not shown) that are local to the NIC 4620. In such examples, the local processor of the NIC 4620 (which can include general-purpose accelerators or specific accelerators) may be capable of performing one or more of the functions of the compute circuitry 4602 described herein. Additionally, or alternatively, the local memory of the NIC 4620 may be integrated into one or more components of the client compute node at the board level, socket level, chip level, and/or other levels.

Additionally, in some examples, a respective compute node 4600 may include one or more peripheral devices 4614. Such peripheral devices 4614 may include any type of peripheral device found in a compute device or server such as audio input devices, a display, other input/output devices, interface devices, and/or other peripheral devices, depending on the particular type of the compute node 4600. In further examples, the compute node 4600 may be embodied by a respective edge compute node in an edge computing system (e.g., client compute node 4502, edge gateway node 4512, edge aggregation node 4522) or like forms of appliances, computers, subsystems, circuitry, or other components.

Figure 47:
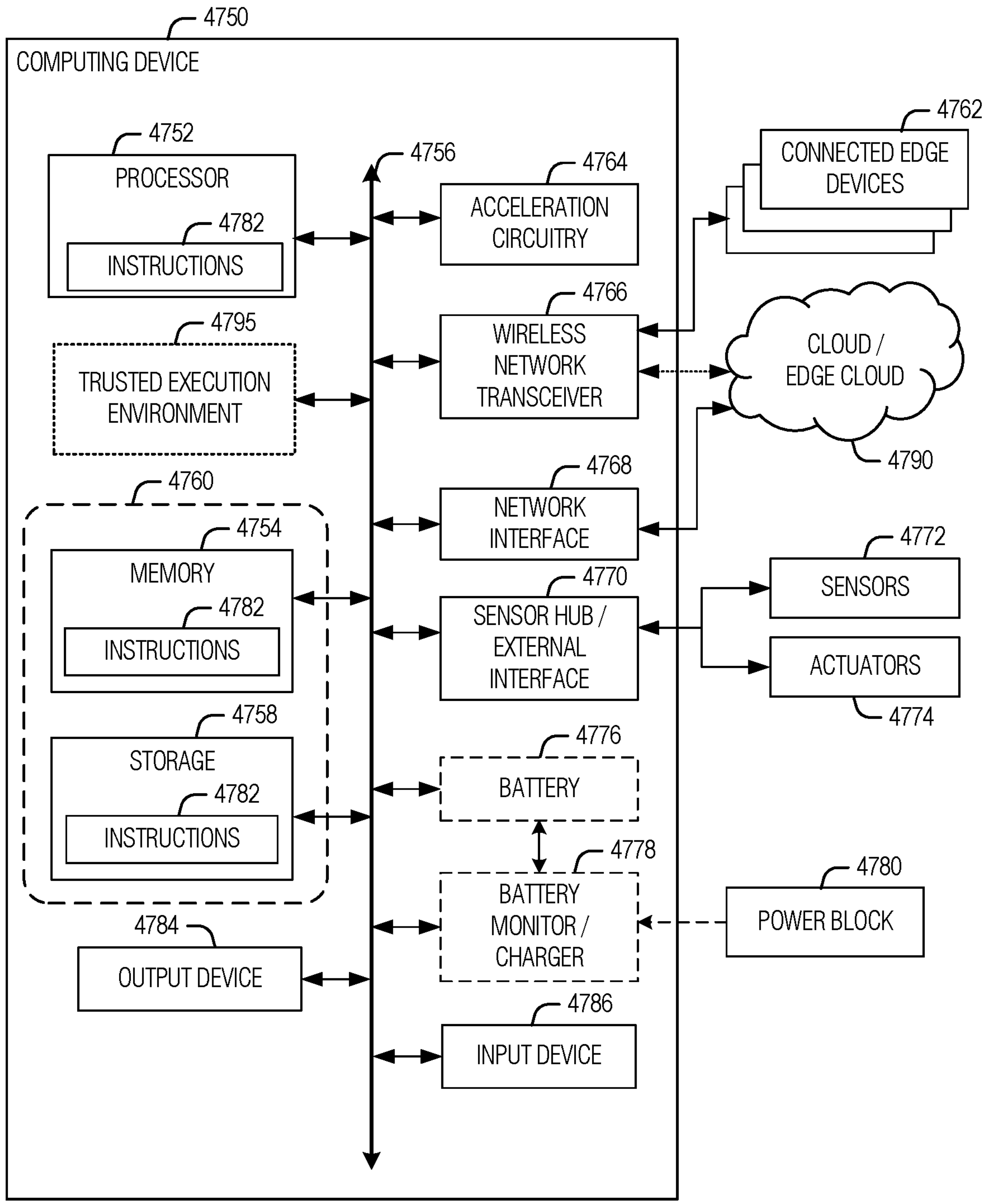
FIG. 47 illustrates a further overview of example components within a computing device, according to an example.

In a more detailed example, FIG. 47 illustrates a block diagram of an example of components that may be present in an edge computing device (or node) 4750 for implementing the techniques (e.g., operations, processes, methods, and methodologies) described herein. The edge computing node 4750 provides a closer view of the respective components of node 4600 when implemented as or as part of a computing device (e.g., as a mobile device, a base station, server, gateway, etc.). The edge computing node 4750 may include any combinations of the components referenced above, and it may include any device usable with an edge communication network or a combination of such networks. The components may be implemented as integrated circuits (ICs), portions thereof, discrete electronic devices, or other modules, logic, instruction sets, programmable logic or algorithms, hardware, hardware accelerators, software, firmware, or a combination thereof adapted in the edge computing node 4750, or as components otherwise incorporated within a chassis of a larger system.

The edge computing node 4750 may include processing circuitry in the form of a processor 4752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 4752 may be a part of a system on a chip (SoC) in which the processor 4752 and other components are formed into a single integrated circuit, or a single package, such as the Edison™ or Galileo™ SoC boards from Intel Corporation, Santa Clara, California. As an example, the processor 4752 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc. The processor 4752 and accompanying circuitry may be provided in a single socket form factor, multiple socket form factor, or a variety of other formats, including in limited hardware configurations or configurations that include fewer than all elements shown in FIG. 47.

The processor 4752 may communicate with a system memory 4754 over an interconnect 4756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 4758 may also couple to the processor 4752 via the interconnect 4756. In an example, the storage 4758 may be implemented via a solid-state disk drive (SSDD). Other devices that may be used for the storage 4758 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low power implementations, the storage 4758 may be on-die memory or registers associated with the processor 4752. However, in some examples, the storage 4758 may be implemented using a micro hard disk drive (HDD) or solid-state drive (SSD). Further, any number of new technologies may be used for the storage 4758 in addition to, or instead of, the technologies described, such resistance change memories, phase change memories, holographic memories, or chemical memories, among others.

The components may communicate over the interconnect 4756. The interconnect 4756 may include any number of technologies, including industry-standard architecture (ISA), extended ISA (EISA), peripheral component interconnect (PCI), peripheral component interconnect extended (PCI-X), PCI express (PCIe), or any number of other technologies. The interconnect 4756 may be a proprietary bus, for example, used in an SoC based system. Other bus systems may be included, such as an I2C interface, an SPI interface, point to point interfaces, and a power bus, among others.

The interconnect 4756 may couple the processor 4752 to a transceiver 4766, for communications with the connected edge devices 4762. The transceiver 4766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 4762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 4766 (or multiple transceivers) may communicate using multiple standards or radios for communications at a different range. For example, the edge computing node 4750 may communicate with close devices, e.g., within about 10 meters, using a local transceiver based on BLE, or another low power radio, to save power. More distant connected edge devices 4762, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee®.

A wireless network transceiver 4766 (e.g., a radio transceiver) may be included to communicate with devices or services in the edge cloud 4790 via local or wide area network protocols. The wireless network transceiver 4766 may be an LPWA transceiver that follows the IEEE 802.15.4, or IEEE 802.15.4g standards, among others. The edge computing node 4750 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 4766, as described herein. For example, the transceiver 4766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 4766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 4768 may be included to provide a wired communication to nodes of the edge cloud 4790 or other devices, such as the connected edge devices 4762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, Time Sensitive Networks (TSN), among many others. An additional NIC 4768 may be included to enable connecting to a second network, for example, a first NIC 4768 providing communications to the cloud over Ethernet, and a second NIC 4768 providing communications to other devices over another type of network.

Given the variety of types of applicable communications from the device to another component or network, applicable communications circuitry used by the device may include or be embodied by any one or more of components 4764, 4766, 4768, or 4770. Accordingly, in various examples, applicable means for communicating (e.g., receiving, transmitting, etc.) may be embodied by such communications circuitry.

The edge computing node 4750 may include or be coupled to acceleration circuitry 4764, which may be embodied by one or more AI accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 4756 may couple the processor 4752 to a sensor hub or external interface 4770 that is used to connect additional devices or subsystems. The devices may include sensors 4772, such as accelerometers, level sensors, flow sensors, optical light sensors, camera sensors, temperature sensors, a global navigation system (e.g., GPS) sensors, pressure sensors, barometric pressure sensors, and the like. The hub or interface 4770 further may be used to connect the edge computing node 4750 to actuators 4774, such as power switches, valve actuators, an audible sound generator, a visual warning device, and the like.

In some optional examples, various input/output (I/O) devices may be present within or connected to, the edge computing node 4750. For example, a display or other output device 4784 may be included to show information, such as sensor readings or actuator position. An input device 4786, such as a touch screen or keypad may be included to accept input. An output device 4784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 4750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 4776 may power the edge computing node 4750, although, in examples in which the edge computing node 4750 is mounted in a fixed location, it may have a power supply coupled to an electrical grid, or the battery may be used as a backup or for temporary capabilities. The battery 4776 may be a lithium-ion battery, or a metal-air battery, such as a zinc-air battery, an aluminum-air battery, a lithium-air battery, and the like.

A battery monitor/charger 4778 may be included in the edge computing node 4750 to track the state of charge (SoCh) of the battery 4776. The battery monitor/charger 4778 may be used to monitor other parameters of the battery 4776 to provide failure predictions, such as the state of health (SoH) and the state of function (SoF) of the battery 4776. The battery monitor/charger 4778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 4778 may communicate the information on the battery 4776 to the processor 4752 over the interconnect 4756. The battery monitor/charger 4778 may also include an analog-to-digital (ADC) converter that enables the processor 4752 to directly monitor the voltage of the battery 4776 or the current flow from the battery 4776. The battery parameters may be used to determine actions that the edge computing node 4750 may perform, such as transmission frequency, mesh network operation, sensing frequency, and the like.

A power block 4780, or other power supply coupled to a grid, may be coupled with the battery monitor/charger 4778 to charge the battery 4776. In some examples, the power block 4780 may be replaced with a wireless power receiver to obtain the power wirelessly, for example, through a loop antenna in the edge computing node 4750. A wireless battery charging circuit, such as an LTC4020 chip from Linear Technologies of Milpitas, California, among others, may be included in the battery monitor/charger 4778. The specific charging circuits may be selected based on the size of the battery 4776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 4758 may include instructions 4782 in the form of software, firmware, or hardware commands to implement the techniques described herein. Although such instructions 4782 are shown as code blocks included in the memory 4754 and the storage 4758, it may be understood that any of the code blocks may be replaced with hardwired circuits, for example, built into an application-specific integrated circuit (ASIC).

Also in a specific example, the instructions 4782 on the processor 4752 (separately, or in combination with the instructions 4782 of the machine readable medium 4760) may configure execution or operation of a trusted execution environment (TEE) 4795. In an example, the TEE 4795 operates as a protected area accessible to the processor 4752 for secure execution of instructions and secure access to data. Various implementations of the TEE 4795, and an accompanying secure area in the processor 4752 or the memory 4754 may be provided, for instance, through use of Intel® Software Guard Extensions (SGX), AMD® Secure Encrypted Virtualization (SEV), or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the edge computing node 4750 through the TEE 4795 and the processor 4752.

In an example, the instructions 4782 provided via memory 4754, the storage 4758, or the processor 4752 may be embodied as a non-transitory, machine-readable medium 4760 including code to direct the processor 4752 to perform electronic operations in the edge computing node 4750. The processor 4752 may access the non-transitory, machine-readable medium 4760 over the interconnect 4756. For instance, the non-transitory, machine-readable medium 4760 may be embodied by devices described for the storage 4758 or may include specific storage units such as optical disks, flash drives, or any number of other hardware devices. The non-transitory, machine-readable medium 4760 may include instructions to direct the processor 4752 to perform a specific sequence or flow of actions, for example, as described with respect to the flowchart(s) and block diagram(s) of operations and functionality depicted above. As used herein, the terms "machine-readable medium," "computer-readable medium," "machine-readable storage," and "computer-readable storage" are interchangeable.

In an example embodiment, the edge computing node 4750 can be implemented using components/modules/blocks 4752-4786 which are configured as IP Blocks. An individual IP Block may contain a hardware RoT (e.g., device identifier composition engine, or DICE), where a DICE key may be used to identify and attest the IP Block firmware to a peer IP Block or remotely to one or more of components/modules/blocks 4762-4780. Thus, it will be understood that the node 4750 itself may be implemented as a SoC or standalone hardware package.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The block diagrams of FIGS. 46 and 47 are intended to depict a high-level view of components of a device, subsystem, or arrangement of an edge computing node. However, it will be understood that some of the components shown may be omitted, additional components may be present, and a different arrangement of the components shown may occur in other implementations.

Figure 48:
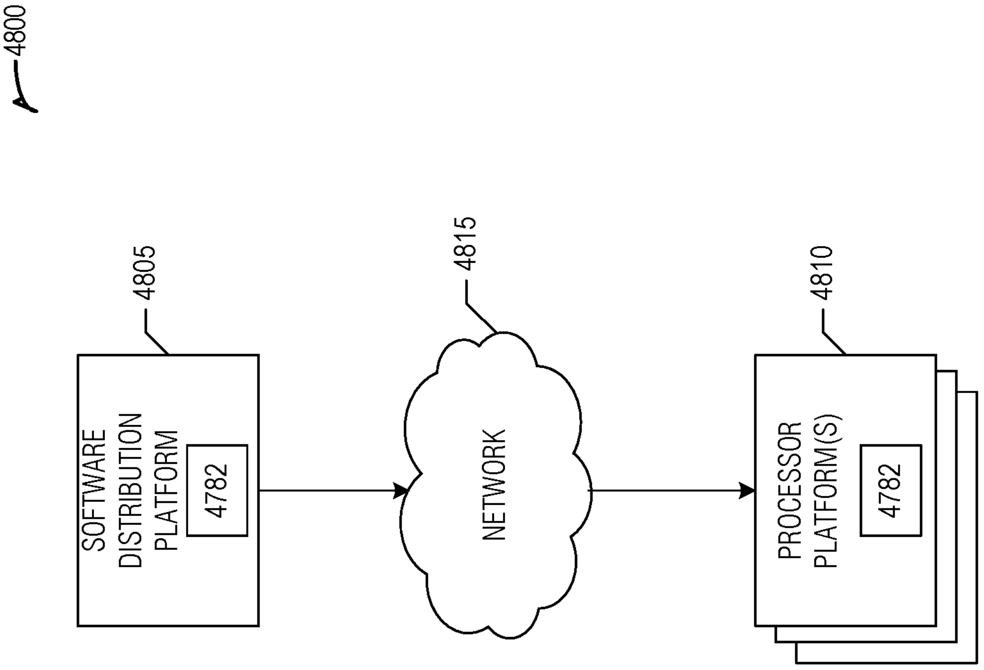
FIG. 48 illustrates a software distribution platform to distribute software instructions and derivatives, according to an example.

FIG. 48 illustrates an example software distribution platform 4805 to distribute software, such as the example computer readable instructions 4782 of FIG. 47, to one or more devices, such as example processor platform(s) 48 and/or other example connected edge devices or systems discussed herein. The example software distribution platform 4805 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 4805). Example connected edge devices may operate in commercial and/or home automation environments. In some examples, a third party is a developer, a seller, and/or a licensor of software such as the example computer readable instructions 4782 of FIG. 47. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 48, the software distribution platform 4805 includes one or more servers and one or more storage devices that store the computer readable instructions 4782. The one or more servers of the example software distribution platform 4805 are in communication with a network 4815, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 4782 from the software distribution platform 4805. For example, the software, which may correspond to example computer readable instructions, may be downloaded to the example processor platform(s), which is/are to execute the computer readable instructions 4782. In some examples, one or more servers of the software distribution platform 4805 are communicatively connected to one or more security domains and/or security devices through which requests and transmissions of the example computer readable instructions 4782 must pass. In some examples, one or more servers of the software distribution platform 4805 periodically offer, transmit, and/or force updates to the software (e.g., the example computer readable instructions 4782 of FIG. 47) to ensure improvements, patches, updates, etc. are distributed and applied to the software at the end user devices.

In the illustrated example of FIG. 48, the computer readable instructions 4782 are stored on storage devices of the software distribution platform 4805 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 4782 stored in the software distribution platform 4805 are in a first format when transmitted to the example processor platform(s) 4810. In some examples, the first format is an executable binary in which particular types of the processor platform(s) 4810 can execute. However, in some examples, the first format is uncompiled code that requires one or more preparation tasks to transform the first format to a second format to enable execution on the example processor platform(s) 4810. For instance, the receiving processor platform(s) 4800 may need to compile the computer readable instructions 4782 in the first format to generate executable code in a second format that is capable of being executed on the processor platform(s) 4710. In still other examples, the first format is interpreted code that, upon reaching the processor platform(s) 4810, is interpreted by an interpreter to facilitate execution of instructions.

Implementation of the preceding techniques may be accomplished through any number of specifications, configurations, or example deployments of hardware and software. It should be understood that the functional units or capabilities described in this specification may have been referred to or labeled as components or modules, to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis)

may take place on a different processing system (e.g., in a computer in a data center), than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

In the above Detailed Description, various features may be grouped to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A system, comprising:
- a plurality of compute nodes; and
- an orchestration node configured by instructions stored on non-transitory machine-readable media, to:
  - receive a distributed workload configuration including security intents;
  - decompose, based on the distributed workload configuration, a workload into a plurality of sub-workloads;
  - identify an infrastructure resource of the plurality of compute nodes to execute a sub-workload of the plurality of sub-workloads;
  - determine that an operating environment of the infrastructure resource satisfies the security intents;
  - bind the sub-workload to the infrastructure resource, wherein the binding produces a token that is presented by the sub-workload to the infrastructure resource, and wherein the token is used to ensure trust among framework layers; and
  - deploy the sub-workload to the infrastructure resource.

2. The system of claim 1, wherein the security intents define trust requirements for execution of the sub-workload.

3. The system of claim 1, wherein the infrastructure resource includes a trusted execution environment.

4. The system of claim 1, wherein the orchestration node is to:
- receive a workload update to apply to the plurality of sub-workloads;
- identify a plurality of infrastructure resources that are used to execute the plurality of sub-workloads;
- create a set of sub-workload update images that align to a distribution of the plurality of sub-workloads on infrastructure resources; and
- create an update distribution plan to distribute the set of sub-workload update images to the plurality of infrastructure resources.

5. The system of claim 4, wherein each of the plurality of infrastructure resources include a manager to:
- store a sub-workload update image corresponding to a sub-workload executing on the infrastructure resource;
- disable the sub-workload;
- install the sub-workload update image; and
- reenable the sub-workload.

6. The system of claim 1, wherein a sub-workload accesses master data from a master data database to obtain the master data.

7. The system of claim 6, wherein the sub-workload is to:
- receive an update to the master data; and
- transmit an update manifest to a master data update manager to update the master data at the master data database, the update manifest including a new value of the master data, the new value of the master data to be used instead of an existing value of the master data.

8. The system of claim 7, wherein the master data update manager is to:
- broadcast the update manifest to a plurality of master data subscriber nodes, wherein each of the plurality of master data subscriber nodes temporarily invalidate local copies of the master data and refresh the master data from the master data database after the master data is updated based on the update manifest, or revalidate the local copies of the master data after the master data update fails.

9. The system of claim 7, wherein the master data update manager is to:
- initiate a provisional update at the master data database to the new value of the master data from an old value;
- initiate a verification that the new value is valid; and
- broadcast the update manifest to a plurality of master data subscriber nodes after the verification is complete, wherein each of the plurality of master data subscriber nodes invalidate local copies of the master data and refresh the master data from the master data database after the master data is updated based on the update manifest.

10. The system of claim 9, wherein each of the plurality of master data subscriber nodes obtain the new value and the existing value of the master data when querying for the master data from the master data database.

11. The system of claim 9, wherein the verification that the new value is valid is performed by a set of master data verification nodes.

12. A method performed by an orchestration node, comprising:
- receiving a distributed workload configuration including security intents;
- decomposing, based on the distributed workload configuration, a workload into a plurality of sub-workloads;
- identifying an infrastructure resource of a plurality of compute nodes to execute a sub-workload of the plurality of sub-workloads;
- determining that an operating environment of the infrastructure resource satisfies the security intents;
- binding the sub-workload to the infrastructure resource, wherein the binding produces a token that is presented by the sub-workload to the infrastructure resource, and wherein the token is used to ensure trust among framework layers; and
- deploying the sub-workload to the infrastructure resource.

13. The method of claim 12, wherein the security intents define trust requirements for execution of the sub-workload.

14. The method of claim 12, comprising:
- receiving a workload update to apply to the plurality of sub-workloads;
- identifying a plurality of infrastructure resources that are used to execute the plurality of sub-workloads;
- creating a set of sub-workload update images that align to a distribution of the plurality of sub-workloads on infrastructure resources; and
- creating an update distribution plan to distribute the set of sub-workload update images to the plurality of infrastructure resources.

15. The method of claim 14, wherein each of the plurality of infrastructure resources include a manager to:

store a sub-workload update image corresponding to a sub-workload executing on the infrastructure resource;

disable the sub-workload;

install the sub-workload update image; and reenable the sub-workload.

16. At least one non-transitory machine-readable medium including instructions, which when executed by an orchestration node, cause the orchestration node to perform operations comprising:

receiving a distributed workload configuration including security intents;

decomposing, based on the distributed workload configuration, a workload into a plurality of sub-workloads;

identifying an infrastructure resource of a plurality of compute nodes to execute a sub-workload of the plurality of sub-workloads;

determining that an operating environment of the infrastructure resource satisfies the security intents;

binding the sub-workload to the infrastructure resource, wherein the binding produces a token that is presented by the sub-workload to the infrastructure resource and wherein the token is used to ensure trust among framework layers; and deploying the sub-workload to the infrastructure resource.

17. The machine-readable medium of claim 16, wherein the security intents define trust requirements for execution of the sub-workload.

18. The system of claim 1, wherein the token is presented by the sub-workload to the infrastructure resource upon access to the infrastructure resource, and is evaluated by the infrastructure resource to verify that the binding has taken place.

19. The system of claim 1, wherein to bind the sub-workload to the infrastructure resource, the binding is performed in response to determining that the operating environment of the infrastructure resource satisfies the security intents.

20. The system of claim 1, wherein the framework layers include a Container-as-a-Service (CaaS) layer, a Platform-as-a-Service (PaaS) layer, and an Infrastructure-as-a-Service (IaaS) layer, the token being used to maintain trust between the CaaS layer and the PaaS layer and between the PaaS layer and the IaaS layer.

* * * * *